United States Patent [19]

Asano et al.

[11] Patent Number: 5,038,092

[45] Date of Patent: Aug. 6, 1991

[54] CURRENT CONTROL SYSTEM FOR INVERTER

[75] Inventors: Katsuhiro Asano; Yuzuru Tsunehiro, both of Aichi, Japan

[73] Assignee: Kabushiki Kaisha Toyota Chuo Kenkyusho, Aichi, Japan

[21] Appl. No.: 475,310

[22] Filed: Feb. 5, 1990

[30] Foreign Application Priority Data

Feb. 16, 1989 [JP] Japan .................. 1-37136

[51] Int. Cl.$^5$ .......................................... H02P 1/26
[52] U.S. Cl. .................................. 318/811; 318/799; 318/806; 318/809; 318/805
[58] Field of Search ............... 318/799, 801, 808, 809, 318/810, 811, 805, 800, 803, 806

[56] References Cited

U.S. PATENT DOCUMENTS

| | | | |
|---|---|---|---|
| 4,267,499 | 5/1981 | Kurosawa | 318/800 |
| 4,456,868 | 6/1984 | Yamamura et al. | 318/806 |
| 4,792,791 | 12/1988 | Matsuo et al. | 318/805 |
| 4,808,903 | 2/1989 | Matsui et al. | 318/800 |
| 4,814,683 | 3/1989 | Okamoto et al. | 318/803 |
| 4,843,296 | 6/1989 | Tanaka | 318/800 |
| 4,926,105 | 5/1990 | Mischenko et al. | 318/800 |
| 9,724,373 | 2/1988 | Lipo | 318/806 |

OTHER PUBLICATIONS

Perc 88 Record, Apr. 1988, pp. 207-218, H. Hashimoto, et al., "Practical Variable Structure Approach for Brushless Servo Motor Control—Practical Implemention of DSP—".

*Primary Examiner*—William M. Shoop, Jr.
*Assistant Examiner*—John W. Cabeca
*Attorney, Agent, or Firm*—Oblon, Spivak, McClelland, Maier & Neustadt

[57] ABSTRACT

A current component, in which a phase angle is different by a predetermined reference angle from a magnetic flux occurring in an inductive load, is brought to a q-axis current. The q-axis current is computed on the basis of phase current. A phase angle of the magnetic flux is detected. A q-axis-current control phase and a reference potential phase are determined on the basis of the result of pulse-width-modulation computation and the phase angle. The q-axis-current control phase is controlled in a pulse-width-modulation manner. A potential of the remaining reference potential phase if fixed to a reference potential. Thus, interference among the phases is prevented to reduce current ripple.

23 Claims, 12 Drawing Sheets

CURRENT CONTROL SYSTEM FOR INVERTER

BACKGROUND OF THE INVENTION

1. Field of the Invention

The present invention relates to current control systems for an inverter which drives an inductive load such as an alternating-current motor, a linear motor or the like, by means of a pulse-width modulation (PWM) system and, more particularly, to a current control system for an inverter, which accurately follows a current command value even when a current actual value is at steady state with respect to the current command value and even when the current actual value is at transition state with respect to the current command value.

2. Description of the Related Art

Generally, an alternating-current motor 9 is driven by a voltage-type inverter 8 as shown in FIG. 1 of the attached drawings. A speed controller 1 computes and outputs current command values $i_q^*$ and $i_d^*$ of respective q-axis and d-axis on the basis of a differential value of a rotational angle $\theta$ detected by a rotational-angle sensor 13 which is mounted to the alternating-current motor 9, that is, a deviation between a rotational speed $\omega$ and a command value $\omega^*$ of the rotational speed. A transformer 2 obtains current command values $i_u^*$, $i_v^*$ and $i_w^*$ of respective u-, v- and w-phases on the basis of the current command values $i_q^*$ and $i_d^*$, and outputs the current command values to a current control unit 3. A pair of current detectors 10 and 11 detect phase current of the alternating-current motor 9. Further, an adder 12 obtains the remaining phase current. These various phase currents are fedback to the current control unit 3. At the current control unit 3, three comparators 4, 5 and 6 obtain deviations $\Delta i_u$ through $\Delta i_w$ between the current command values $i_u^*$ through $i_w^*$ and current detecting values $i_u$ through $i_w$. A PWM controller 7 computes output potential commands for the respective phases on the basis of the deviations. The inverter 8 is PWM-controlled on the basis of the output potential commands for the respective phases, to control current of the alternating-current motor 9.

In such system, the current control unit 3 is an important component which influences or affects the control performance. Considered as the prior art are an instantaneous-value current control system, a mean-value current control system, a control system on the basis of a d-q axis, or the like.

FIG. 2 shows a hysteresis comparator system which represents the instantaneous-value current control system. In this hysteresis comparator system, a deviation $\Delta i_u$ between the current command value $i_u^*$ and the current detecting value $i_u$ is obtained by a comparator 21. On the basis of the deviation $\Delta i_u$, the respective phases of the inverter are controlled in an ON-OFF manner by a hysteresis comparator 22. That is, when the deviation $\Delta i_u$ increases above a positive threshold, an output from the hysteresis comparator 22 is brought to a HIGH level. On the other hand, when the deviation $\Delta i_u$ decreases below the threshold value of the deviation $\Delta i_u$, the output from the hysteresis comparator 22 is brought to a LOW level. Such treatment or processing is effected independently of the respective v-phase and w-phase. In case of this system, the kaleidoscopic current detecting value is monitored, and the ON-OFF control is done on the basis of the monitored detecting value. Accordingly, response ability is superior. However, there is such a problem that, in a low speed range, control accuracy is deteriorated so that it is impossible to apply the system to positioning control. Further, a switching frequency $f_s$ largely varies dependent upon the operating condition and, particularly, increases abruptly during low speed. For this reason, it is required that the switching frequency $f_s$ during the low speed is set to a value equal to or less than an upper-limit value which is permitted or allowed by the inverter. The switching frequency $f_s$ is restrained to a considerably low value as a whole. As a result, a reduction in the current control accuracy is led with respect also to a high speed range. Moreover, noises are also large, and tone also varies dependent upon the operational condition, so that a feeling of unpleasant is given to a third person. The cause of this can be described as follows. That is, since voltage capable of being outputted by the inverter is determined in combination at the time the u-phase, the v-phase and the w-phase select the HIGH level or the LOW level, the voltage is expressed in terms of voltage vectors of $2^3 = 8$. If the output levels are expressed in order of the u-phase level, the v-phase level and the w-phase level with the HIGH level being 1 and with the LOW level being 0, there are obtained (000), (001) ... (111). If the binary expression is replaced by a decimal expression so that the voltage vectors are expressed with the value as an affix, there are obtained $V_0$ through $V_7$ as shown in FIG. 1. Here, for example, it is assumed that a desirable output voltage $V_x$ is in such a phase relationship that the desirable output voltage $V_x$ is brought to the following equation as shown in FIG. 1:

voltage of the v-phase
> voltage of the u-phase
> voltage of the w-phase

Then, since the direction of $V_x$ is approximate to the directions of $V_2$ and $V_6$, it is possible to efficiently control the desirable output voltage $V_x$, if $V_2$ and $V_7$ corresponding respectively to the zero vectors and $V_6$ and $V_0$ are alternately selected. In case of the hysteresis comparator system, however, each phase freely determines the output voltage. Accordingly, $V_0$ through $V_7$ are disorderly selected, and a time mean value of $V_0$ through $V_7$ is controlled so as to be brought to $V_x$. In this manner, the eight voltage vectors are selected non-uniformly, and the voltage vectors, that is, $V_1$ and $V_5$ in this case, totally opposite in direction to the desirable voltage $V_x$ are selected. This is the cause of a reduction in the control accuracy and an increase in the noise.

On the other hand, FIG. 3 shows a fundamental or basic circuit for the mean-value current control system. The circuit is constructed by the comparator 21, an amplifier 23 whose gain is $K_p$, an amplifier 24 whose gain is $K_i$, an integrator 25, an adder 26, a comparator 27, a polarity decider 28, and a triangular-wave generator comprising an integrator 29, and a hysteresis comparator 30. In this system, a voltage command value $v_u^*$ is obtained as follows. That is, a value, in which an error $\Delta i_u$ between the current command value $i_u^*$ and the current detecting value $i_u$ is multiplied by the proportional gain $K_p$, is added to a value, in which the error $\Delta i_u$ is multiplied by the proportional gain $K_i$ and is integrated, thereby obtaining the voltage command value $v_u^*$, as represented by the following equation:

$$v_u^* = K_p \cdot \Delta i_u + K_i \int \Delta i_u dt \tag{1}$$

where $\Delta i_u = i_u{}^* - i_u$.

The voltage command value $v_u{}^*$ is compared with a triangular wave $e_t$ by the comparator 27. A polarity of the comparison result is judged or decided by the code decider 28. Control is done such that, when $v_u{}^* \geq e_t$, the output voltage is brought to the HIGH level, while, when $v_u{}^* < e_t$, the output voltage is brought to the LOW level. If such PWM control is effected for each of the u-phase, the v-phase and the w-phase, a timelike mean value of the output voltage from the inverter is into agreement with the voltage command values $v_u{}^*$ through $v_w{}^*$. In this connection, the triangular wave $e_t$ is obtained such that the output from the integrator 29 is compared by the hysteresis comparator 30, and the compared value is inverted and fed-back to the integrator 29.

FIG. 3 illustrates only the u-phase. However, the same triangular wave $e_t$ is used to perform the similar control with respect also to each of the v-phase and the w-phase. For this reason, the voltage vector selected at that time is limited only to the voltage vector which is optimum at the point of time. In this connection, if the desirable output voltage $V_x$ is in a direction as shown in FIG. 1, $v_v{}^* > v_u{}^* > v_w{}^*$. From a magnitude relationship between $v_u{}^*$ through $v_w{}^*$ and the triangular wave $e_t$, the voltage vector selected is limited only to $V_2$ and $V_6$ whose directions are the same as $V_x$, and $V_0$ and $V_7$ which correspond to the zero vector. The voltage vector in the opposite direction is not selected. In order to cause the current detecting value $i_u$ to follow the current command value $i_u{}^*$, however, it is required that $\Delta i_u = 0$ in the above equation (1). Accordingly, the following relationship holds:

$$v_u{}^* = K_1 \int \Delta i_u dt \quad (2)$$

Thus, it will be required that the output from the integrator 25 follows the voltage to be applied to the motor, that is, the sum of a speed electromotive force at that time and a primary voltage drop. However, the speed electromotive force increases during the high-speed rotation, and a frequency of the speed electromotive force also increases. Accordingly, the integrator 25 cannot follow. As a result, the control accuracy is deteriorated. During the low speed, under a transient condition in which the current command value $i_u{}^*$ varies largely, the output from the integrator 25 cannot respond in accordance with the variation in the current command value $i_u{}^*$. For this reason, the control accuracy is deteriorated.

As described above, the instantaneous-value current control system has problems in the low-speed range, and the mean-value current control system has problems in the high-speed range. These problems are caused by the following facts. First, the potentials of the respective three phases are controlled in spite of the fact that independent variables are two. That is, $i_u + i_v + i_w = 0$ holds and, accordingly, if the currents of the two phases are determined, other one phase is determined unconditionally. Since the three phases are controlled independently of each other, however, interference occurs between the phases. Thus, the control characteristic is deteriorated.

Secondly, in spite of the fact that the current to be controlled originally are the torque current and the exciting current, the phase current is in fact controlled for each phase. The phase current is expressed in terms of trigonometric function based on the torque current, the exciting current and the rotational angle. For this reason, it is impossible to separate the torque current and the exciting current from each other, so that interference occurs between the torque current and the exciting current. This makes it further difficult to improve the control characteristic.

To the contrary, a system for effecting control on the basis of a d-q axis has been considered, as disclosed in "Application to Brushless-Servomotor-Control for Variable Construction System", 1988, National Convention 135 of Electric Institute Industry Division. This method is as follows, as shown in FIG. 4. That is, in a transformation circuit 34, a torque current (q-axis current) $i_q$ and and exciting current (d-axis current) $i_d$ are obtained on the basis of the phase currents $i_u$, $i_v$ and $i_w$. A pair of adders 31 and 32 obtain an error $\Delta i_q$ between a torque-current command value $i_q{}^*$ and the torque current $i_q$, and an error $\Delta i_d$ between an exciting-current command value $i_d{}^*$ and the exciting current $i_d$. A voltage-vector selecting circuit 33 determines an output voltage of each phase on the basis of the torque-current error $\Delta i_q$ and the exciting current error $\Delta i_d$. Here, the output voltage of each phase is determined on the basis of a map shown in FIG. 5. That is, the voltage vector is selected in accordance with the rotational angle of the magnetic flux at that time, on the basis of codes of the torque current error $\Delta i_q$ and the exciting current error $\Delta i_d$ and potentials are outputted correspondingly. At that time, however, the voltage vectors selected are only four types of voltage vectors opposite in direction to each other. These four types of voltage vectors are selected alternately to effect control such that the timelike mean value is brought to a desirable voltage. Originally, in order to obtain a superior control characteristic, two types of voltage vectors identical in direction with the desirable voltage and $V_0$ and $V_7$ corresponding to the zero vector must be selected. From this, it will be seen that this system is the PWM control which is much in current ripple and which is inefficient. Moreover, in case of this system, the PWM control is effected by selection of the voltage vectors. Accordingly, similarly to the instantaneous-value current control system and the mean-value current control system, it must be considered that the potentials of the three phases are controlled respectively, in spite of the fact that the independent variables are two. The voltage vectors are in combination of the potentials of the three phases, and selection of the voltage vectors are nothing but selection of the potentials of the three phases. Thus, the phases interfere with each other. As a result, the voltage vector in the opposite direction is selected so that the control is brought to the PWM control which is much in current ripple and which is inefficient. In addition, one voltage vector is selected on the basis of the codes of the torque current error $\Delta i_q$ and the exciting current error $\Delta i_d$. Accordingly, at a stage in which the voltage vector is selected, control is effected under such a condition that the torque current and the exciting current are composed with each other. Thus, in the strict sense of the word, the torque current and the exciting current are not brought to non-interference. This also causes deterioration of the control characteristic which is much in current ripple.

SUMMARY OF THE INVENTION

The present invention has been done in order to solve the above-discussed problems of the prior art. In the conventional method, the three phases are controlled independently of each other, in spite of the fact that there are two independent variables of the current control. Accordingly, interference occurs between the phases, making the control characteristic inferior. In addition, the phase current expressed by the torque current, the exciting current and the trigonometric function is controlled in each phase. Thus, interference also exists between the torque current and the exciting current. This makes an improvement in the control characteristic further difficult.

It is therefore an object of the invention to provide the following current control system. That is, torque current, which determines motion characteristic of an electric motor and so on, is obtained by transformation. Further, each phase arm of an inverter is divided in a mode manner into a torque current control phase and a reference potential phase. The reference potential phase is fixed to a reference potential. The torque current is controlled directly by the torque current control phase. Accordingly, non-interference between the phases and non-interference between the torque current and the exciting current are realized. Thus, the current control system is high in accurate and high in rapid response ability in not only the electric motor, but also in general inductive loads. Furthermore, it is an object of the invention to provide the following current control system. That is, as a method of controlling not only the torque current, but also the exciting current, the torque current and the exciting current are obtained by transformation. Further, each phase arm of the inverter is divided in a mode manner into a torque-current control phase, an exciting-current control phase, and a reference potential phase. The reference potential phase is fixed to a reference potential. The torque current is controlled directly by the torque-current control phase. The exciting current is controlled directly by the exciting-current control phase. Accordingly, non-interference between the phases and non-interference between the torque current and the exciting current are realized. Thus, the current control system is high in accuracy and high in rapid response ability in not only the electric motor, but also in general inductive loads. Moreover, it is an object of the invention to provide a current control system which is high in control accuracy and high in response ability, with attention being paid to the facts that dead time $T_d$ for prevention of short circuit in an electric power source with respect to operational delay of a semiconductor device is restricted to the utmost, that switching loss and driving loss of the semiconductor device are reduced, that noises are reduced, that digitalization by means of a computer is possible, and that the current control system is applicable to any electric motors such as alternating-current motors such as induction motors, synchronous motors and so on, linear motors in which a linear motion output is obtained, and so on.

To attain the above-described objects, according to the first invention, there is provided a current control system for an inverter having a plurality of series circuits formed by series-connecting electric valves each formed by connecting a semiconductor device and a diode in an inverted parallel relation to each other, each of the series circuits having its both ends connected respectively to a positive side and a negative side of a direct-current power source, wherein an inductive load is connected to the series connecting point of the electric valves, and current flowing through the inductive load is controlled in a pulse-width-modulation (PWM) manner, the current control system comprising:

current-command computing means for computing a q-axis current command in accordance with an operational command with respect to the load;

current detecting means for detecting an actual q-axis current flowing through the load;

q-axis-current error computing means for computing a q-axis current error which is a difference between the q-axis current command and the q-axis-current detecting value;

q-axis-current control computing means for performing pulse-width-modulation control computation of the q-axis current on the basis of the q-axis current error;

magnetic-flux phase-angle detecting means for detecting or computing a phase angle of a magnetic flux; and control-phase potential computing means for determining a q-axis-current control phase and a reference potential phase on the basis of a computation result of the q-axis-current control computing means and a magnetic-flux rotational angle, to control a potential in each phase, wherein, in connection with the above, a direction, in which the phase angle is different by a predetermined reference angle from the magnetic flux occurring in the load, is defined as the q-axis, and a current component in the q-axis direction is defined as the q-axis current.

With the above arrangement of the invention, when the output current from the inverter follows the current command, the q-axis current command is computed in accordance with the operational command with respect to the load. Further, the actual current in each phase is detected, and is transformed, whereby the q-axis current that is the current component in the q-axis direction is obtained. The q-axis-current command value and the q-axis-current detecting value are compared with each other whereby the q-axis current error is obtained. Subsequently, the q-axis-current control computation means performs PWM control computation of the q-axis current on the basis of the q-axis current error. Thus, q-axis-current PWM control information of the q-axis current and reference potential-phase information are obtained. The phase angle of the magnetic flux is detected or computed. In the control-phase potential computing means, the q-axis-current control phase and the reference potential phase are determined on the basis of the magnetic flux phase angle. The q-axis-current control phase controls the output potential on the basis of the q-axis-current PWM control information. The reference potential phase is fixed to the reference potential on the basis of the reference potential-phase information. In this connection, the computation by the q-axis-current control computation means corresponds to obtain of the PWM control information and a polarity of the voltage to be applied when the load is assumed to be an inductive load of a single phase through which the q-axis current flows, and when the inductive load is PWM-controlled by the inverter of a single phase. On the other hand, in the computation by the control-phase potential computation means, the obtained PWM control information of the inverter of the single phase and the voltage polarity to be applied are developed to control information of an inverter of multiple phases.

As described above, in the invention, the output potential of the q-axis-current control phase is controlled on the basis of the q-axis current error. The output potential of the remaining reference potential phase is fixed to the reference potential. The number of the phase PWM-controlled is a single phase. For this reason, interference does not occur between the phases, unlike the conventional system. To be able to obtain such advantages is in a point in which the PWM control computation, which is important in the current control, is performed in terms of a model of the single-phase inverter. Thus, the PWM control computation is made simple and extremely easy, and it is possible to restrain response delay and occurrence of errors to the utmost.

Further, since the q-axis current is controlled directly, no interference occurs also between the q-axis current and a d-axis current corresponding to the exciting current, unlike control of current in each phase.

Moreover, the q-axis current is direct current unlike alternating current in each phase. Thus, it is possible to remove ripple by means of a simple low-pass filter. That is, it is possible to control a mean value of the q-axis current without affection of the ripple based on the PWM. Furthermore, since the q-axis current is coupled directly to an equation of motion on the side of the load, motion control is made extremely easy, and it is possible to construct a control circuit extremely simply and easily.

As will be seen from the above, it is possible to considerably improve current control accuracy and response ability which are important in overall the current control.

In case where the first invention is applied to the current control of the alternating-current motor, the q-axis current should be treated as torque current, the d-axis current should be treated as exciting current, and the phase angle should be treated as a rotational angle. Accordingly, there is provided the following current control system in which an alternating-current motor is connected to the series connecting point of a voltage-type inverter in which an electric valve having a semiconductor device and a diode connected in inverted parallel relation to each other is connected in series, and both ends of a series circuit of the electric valve are connected respectively to the positive side and the negative side of a direct-current power source, and current flowing through the alternating-current motor is controlled in a manner of pulse width modulation. That is, the current control system comprises current-command computing means for computing a torque-current command, current detecting means for detecting torque current, torque-current error computing means for computing a torque-current error between the torque-current command and the torque current, torque-current control computing means for computing the torque current in a manner of PWM control on the basis of the torque-current error, magnetic-flux rotational-angle detecting means for detecting a rotational angle of a magnetic flux, and control-phase potential computing means for determining a torque-current control phase and a reference potential phase on the basis of the results of computation of the torque-current control and the magnetic-flux rotational angle, to control the potential in each phase.

With the above arrangement, when the output current from the inverter follows a desirable current command value, the torque current command is computed, and current in each phase is detected and transformed, whereby the torque current is obtained. The torque-current command value and the torque-current detecting value are compared with each other, whereby a torque-current error is obtained. The torque-current control computing means performs PWM control computation of the torque current on the basis of the torque-current error. The rotational angle of the magnetic flux is detected. The control-phase potential computing means determines the torque-current control phase and the reference potential phase on the basis of the result of the torque-current control computation and the magnetic-flux rotational angle. The torque-current control phase controls the output potential on the basis of the result of the torque-current control computation. The reference potential phase is fixed to the reference potential.

In this manner, the output potential of the torque-current control phase is controlled on the basis of the torque-current error. The output potential of the remaining reference potential phase is fixed to the reference potential. Thus, the number of the phase PWM-controlled is a single phase. For this reason, no interference occurs between the phases, unlike the conventional system. Further, since the torque current is controlled directly, no interference occurs also between the torque current and the exciting current, unlike control of each phase current. As a result, an improvement in the current control accuracy and control high in rapid response ability are made possible.

According to the second aspect of the invention, there is provided a current control system for an inverter having a plurality of series circuits formed by series-connecting electric valves each formed by connecting a semiconductor device and a diode in an inverted parallel relation to each other, each of the series circuits having its both ends connected respectively to a positive side and a negative side of a direct-current power source, wherein an inductive load is connected to the series connecting point of the electric valves, and current flowing through the inductive load is controlled in a pulse-width-modulation manner, the current control system comprising:

current-command computing means for computing a q-axis current command and a d-axis current command in accordance with an operational command with respect to the load;

current detecting means for detecting an actual q-axis current and an actual d-axis current which flow through the load;

q-axis-current error computing means for computing a q-axis current error which is a difference between the q-axis-current command and the q-axis-current detecting value;

d-axis-current error computing means for computing a d-axis current error which is a difference between the d-axis-current command and the d-axis-current detecting value;

q-axis-current control computing means for performing pulse-width-modulation control computation of the q-axis current on the basis of the q-axis current error;

d-axis-current control computing means for performing pulse-width-modulation control computation of d-axis current on the basis of the d-axis current error;

magnetic-flux phase-angle detecting means for detecting or computing a phase angle of a magnetic flux; and control-phase potential computing means for determining a q-axis-current control phase, a d-axis-current control phase and a reference potential phase on the basis of a computation result of the q-axis-current control computing means, a computation result of the d- axis-current control computing means and a magnetic-flux phase angle, to control a potential in each phase, wherein, in connection with the above, a direction, in which the phase angle is different by a predetermined reference angle from the magnetic flux occurring in the load, is defined as the q-axis, and a current component in the q-axis direction is defined as the q-axis current, and wherein a direction of the magnetic flux occurring in the load is defined as a d-axis, and a current component in the d-axis direction is defined as the d-axis current.

With the above arrangement of the second embodiment of the invention, when the output current from the inverter follows a desirable current command value, the q-axis-current command and the d-axis-current command are computed, and the current in each phase is detected and transformed, whereby the q-axis current and the d-axis current are obtained. The q-axis-current command value and the q-axis-current detecting value are compared with each other to obtain the q-axis current error. The d-axis-current command value and the d-axis-current detecting value are compared with each other to obtain the d-axis-current error. The q-axis-current control computing means performs PWM control computation of the q-axis current on the basis of the q-axis-current error. The d-axis-current control computing means performs PWM control computation of the d-axis current on the basis of the d-axis-current error. On the other hand, the magnetic-flux phase-angle detecting means detects or computes the phase angle of the magnetic flux. The control-phase potential computing means determines the q-axis-current control phase, the d-axis-current control phase and the reference potential phase on the basis of the computing result at the q-axis-current control computing means, the computing result of the d-axis-current control computing means and the magnetic-flux phase angle. The q-axis-current control phase controls the potential on the basis of the result of the q-axis-current control computation, and the d-axis-current control phase controls the potential on the basis of the result of the d-axis-current control computation. The reference potential phase is fixed to the reference potential.

In this manner, in the second embodiment, the output potential of the q-axis-current control phase is controlled on the basis of the q-axis-current error. In addition, the output potential of the d-axis-current control phase is controlled on the basis of the d-axis-current error. The output potential of the remaining reference potential phase is fixed to the reference potential.

Accordingly, there are two phases which are PWM-controlled two so that the number of the phases is in agreement with the number of the independent variables of the system. Thus, no interference occurs between the phases, unlike the conventional system.

Further, since the q-axis current and the d-axis current are controlled independently of each other, no interference occurs also between the q-axis current and the d-axis current.

As a result, an improvement in the current control accuracy and control high in rapid response ability are made possible.

Moreover, the q-axis-current control phase and the polarity of the q-axis-current control phase, the d-axis-current control phase and a polarity of the d-axis-current control phase, and the reference potential phase and the polarity of the reference potential phase are obtained on the basis of the phase angle of the magnetic flux, the polarity of the q-axis-current control voltage $v_q$ and the polarity of the d-axis-current control voltage $v_d$. Accordingly, in case of the alternating-current motor, it is possible to determine an optimum output potential continuously even under any conditions regardless of adequate four phenomenon motions, that is, regardless of normal/reverse of the rotational direction, and powering/regeneration of the load condition.

BRIEF DESCRIPTION OF THE DRAWINGS

FIG. 17 is a view showing a detailed circuit similar to FIG. 16 but showing the positive and negative triangular input waves.

DESCRIPTION OF THE PREFERRED EMBODIMENTS

Various embodiments of the invention will be described below with reference to the drawings.

A current control system for an inverter, according to a first embodiment of the invention, is characterized in a first invention in that the aforesaid q-axis-current control computing means comprises q-axis-voltage polarity computing means for computing a polarity of q-axis-current control voltage on the basis of the q-axis current error, and q-axis-current pulse-width-modulation computing means for computing a pulse-width-modulation control signal of q-axis current on the basis of the q-axis current error. The aforesaid control-phase potential computing means comprises control-phase computing means for computing q-axis-current control phase and a polarity of the q-axis-current control phase and a reference potential phase and a polarity of the reference potential phase, on the basis of a magnetic-flux phase angle and a polarity of the q-axis-current control voltage, and output-potential control means for controlling a potential of the q-axis-current control phase on the basis of a q-axis-current pulse-width-modulation control signal and a polarity of a q-axis-current control phase and for controlling the potential of the reference voltage phase on the basis of the polarity of the reference potential phase.

Figure 1:
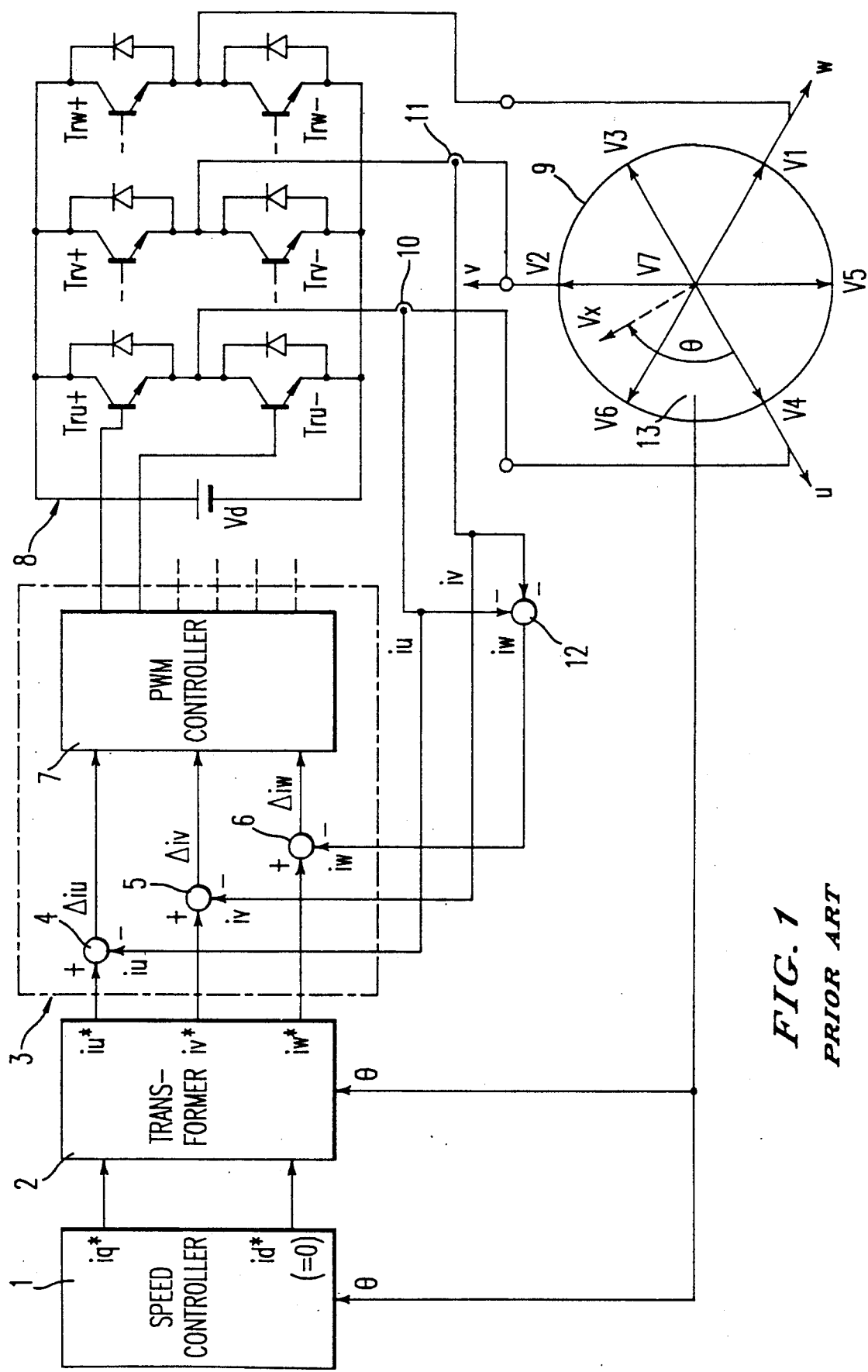
FIG. 1 is a view for explanation of the conventional current control system.
Figure 2:
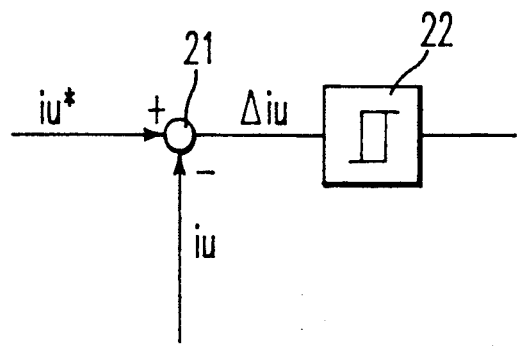
FIG. 2 is a view for explanation of the conventional instantaneous-value current control system.
Figure 3:
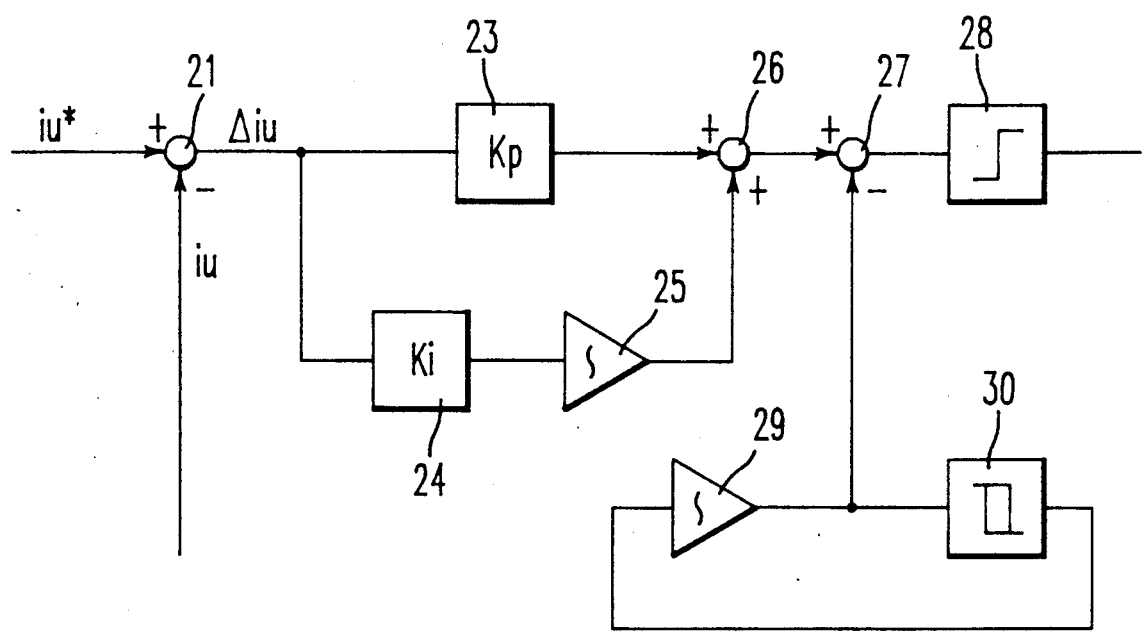
FIG. 3 is a view for explanation of the conventional mean-value current control system.
Figure 4:
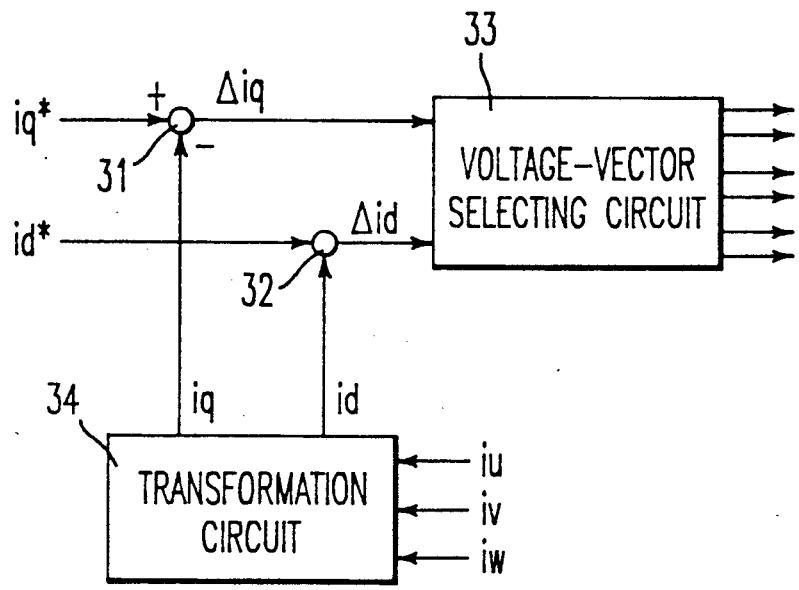
FIG. 4 is a view for explanation of the conventional current control system on a d-q axis.
Figure 5:
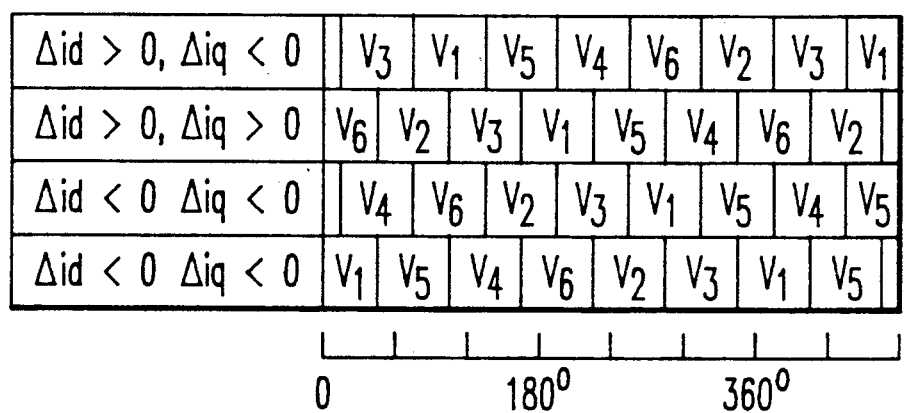
FIG. 5 is a view for explanation of a method of selecting voltage vectors of the conventional current control system on the d-q axis.
Figure 6:
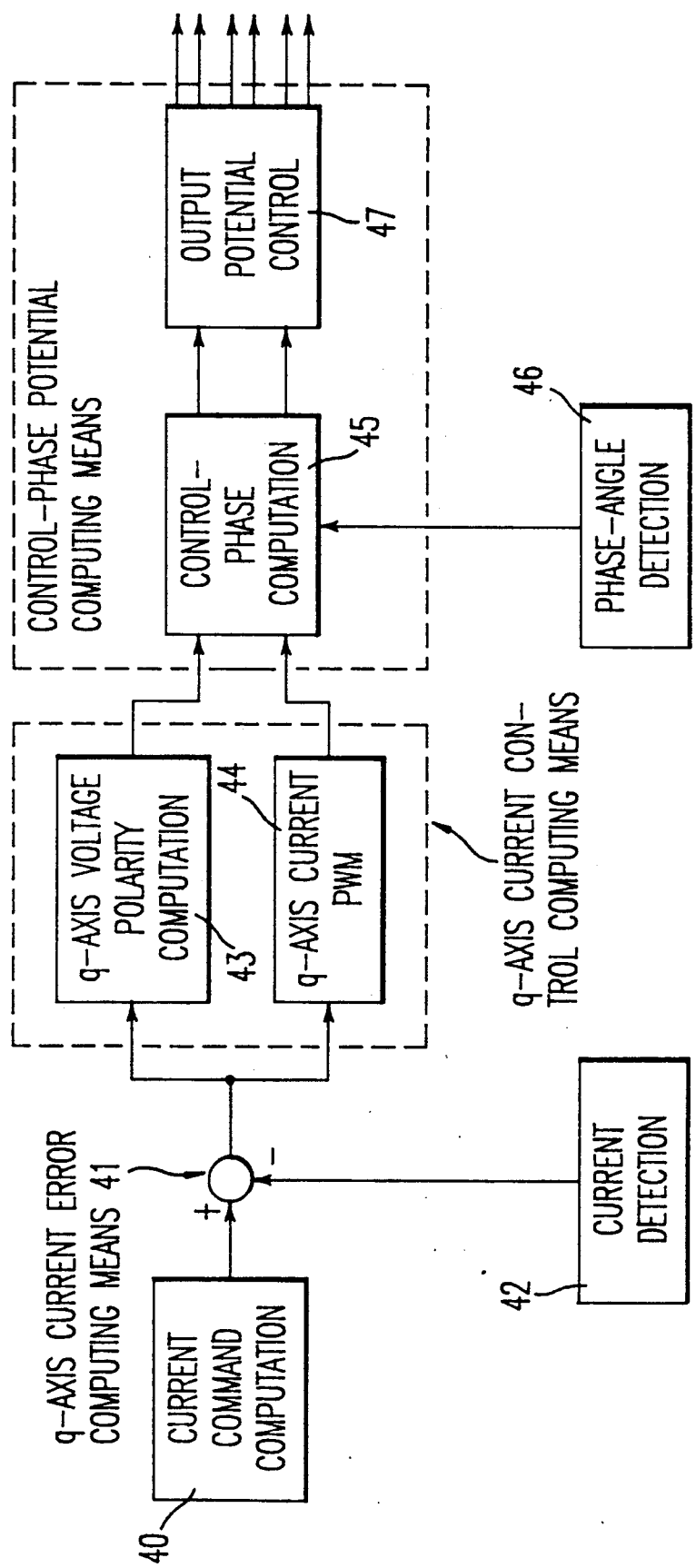
FIG. 6 is a view showing the fundamental or basic concept of a first embodiment of the invention.

If the above-described fundamental or basic principle is expressed by a figure, a basic conceptional figure as shown in FIG. 6 is formed.

In the first embodiment of the invention, with the arrangement described above, when output current from an inverter follows a desirable current command value, current command computing means 40 computes a q-axis-current command. Current detecting means 42 detects current in each phase and the detecting value is transformed whereby q-axis current is obtained. Q-axis-current error computing means 41 compares the q-axis-current command value and the q-axis current detecting value with each other whereby a q-axis current error is obtained. Subsequently, q-axis-voltage polarity computing means 43 obtains a polarity of q-axis-current control voltage on the basis of the q-axis current error. In addition, q-axis-current PWM computing means 44 obtains a q-axis-current PWM control signal on the basis of the q-axis-current error. Further, control-phase computing means 45 obtains a q-axis-current control phase and a polarity of the q-axis-current control phase and a reference potential phase and a polarity of the reference potential phase, on the basis of a phase angle of a magnetic flux detected or computed by phase-angle detecting means 46 and the polarity of the q-axis-current control voltage $v_q$. Output-potential control means 47 determines an output potential of the q-axis-current control phase on the basis of the q-axis-current PWM control signal and the polarity of the q-axis-current control phase and determines an output potential of the reference potential phase on the basis of the polarity of the reference potential phase.

In a manner described above, in the first embodiment, the output potential of the q-axis-current control phase is controlled on the basis of the q-axis current error, and the output potential of the remaining reference potential phase is fixed to any potentials on the basis of the polarity of the reference potential phase.

Accordingly, similarly to the description with reference to the first invention, the number of the phase PWM-controlled is a single phase. For this reason, no interference occurs between the phases, unlike the conventional system. In addition, since the q-axis current is controlled directly, no interference occurs also between the q-axis current and the d-axis current, unlike control of the current in each phase.

As a result, an improvement in current control accuracy and control high in rapid response ability are made possible.

Moreover, the q-axis-current control phase and the polarity of the q-axis-current control phase, and the reference potential phase and the polarity of the reference potential phase are obtained on the basis of the phase angle of the magnetic flux and the polarity of the q-axis-current control voltage $v_q$. Accordingly, in case of the alternating-current motor, it is possible to determine an optimum output potential continuously under any conditions regardless of adequate four phenomenon motions, that is, regardless of normal/reverse of a rotational direction and powering/regeneration of a load condition.

A current control system for an inverter, according to a second embodiment of the invention is characterized in the first invention in that the aforesaid control-phase potential computing means comprises control-phase computing means and output-potential control means. That is, in the control-phase computing means, various amounts such as voltage, current, magnetic flux and so on that are amounts of state expressing a motion condition of a load are treated as vectors on a complex plane. A unit vector is assumed on the complex plane. A direction or orientation of the unit vector, in which a coordinate value of a specific phase is maximized, is selected as a phase direction of a positive polarity of the specific phase. A direction of the unit vector, in which the coordinate value of the specific phase is minimized, is selected as a phase direction of a negative polarity of the specific phase. A phase direction, which is most approximate to the direction of the q-axis, is selected as a phase direction of q-axis control, among the positive phase directions and the negative phase directions of various phases. A phase corresponding to the phase direction of the q-axis control is selected as a q-axis-current control phase. The polarity of the phase direction in the q-axis control is brought to a polarity of the q-axis-current control phase. Two sets of phases except for the q-axis-current control phase is selected as the reference potential phase. A polarity, which is obtained such that the polarity of the q-axis-current control phase and the polarity of the q-axis-current control voltage are multiplied by each other, and the multiplying result is inverted, is brought to the polarity of the reference potential phase. In the output-potential control means, the q-axis-current PWM control signal and the polarity of the q-axis-current control phase are multiplied by each other to obtain the potential of the q-axis-current control phase. The potential of the reference potential phase is obtained on the basis of the polarity of the reference potential phase, to control the potential of each phase.

In this manner, in the second embodiment, the q-axis current is controlled on the basis of the output potential of the q-axis-current control phase, and the output potential of the remaining reference potential phase is fixed to any potentials on the basis of the polarity of the reference potential phase.

Accordingly, similarly to the description with reference to the first invention, the number of the phase PWM-controlled is brought to a single phase, so that no interference occurs between the phases. Further, since the q-axis current is controlled independently, no interference occurs also between the q-axis current and the d-axis current. Moreover, the q-axis-current control phase and the polarity of the q-axis-current control phase, and the reference potential phase and the polarity of the reference potential phase are obtained on the basis of the phase angle of the magnetic flux and the polarity of the q-axis-current control voltage $v_q$. Accordingly, in case of the alternating-current motor, it is possible to decide an optimum output potential continuously under any conditions regardless of four phenomenon motions, that is, regardless of normal/reverse of the rotational direction and powering/regeneration of the load condition.

Further, the above-described algorithm can easily be realized if a logic circuit is used, and it is possible to make the control circuit compact and to reduce the cost of the control circuit.

A current control system for an inverter, according to a third embodiment of the invention is characterized in the second invention in that the aforesaid q-axis-current control computing means comprises q-axis-voltage polarity computing means for computing a polarity of q-axis-current control voltage on the basis of the aforementioned q-axis current error, and q-axis-current pulse-width-modulation computing means for computing a pulse-width-modulation control signal of q-axis current on the basis of the aforementioned q-axis current error. The aforesaid d-axis-current control computing means comprises d-axis-voltage polarity computing means for computing a polarity of the d-axis-current control voltage on the basis of the d-axis current error, and d-axis-current pulse-width-modulation computing means for computing the pulse width modulation of the d-axis current on the basis of the d-axis current error. The aforesaid control-phase potential computing means comprises control-phase computing means for computing the q-axis-current control phase and the polarity of the q-axis-current control phase, the d-axis-current control phase and the polarity of the d-axis-current control phase and the reference potential phase and the polarity of the reference potential phase, on the basis of the polarity of the q-axis-current control voltage, the polarity of the d-axis-current control voltage and the magnetic-flux phase angle, and output-potential control means for controlling a potential of the q-axis-current control phase on the basis of the q-axis-current pulse-width-modulation control signal and the polarity of the q-axis-current control phase, for controlling the potential of the d-axis-current control phase on the basis of the d-axis-current pulse-width-modulation control signal and the polarity of the d-axis-current control phase, and for controlling the potential of the reference potential phase on the basis of the polarity of the reference potential phase.

Figure 7:
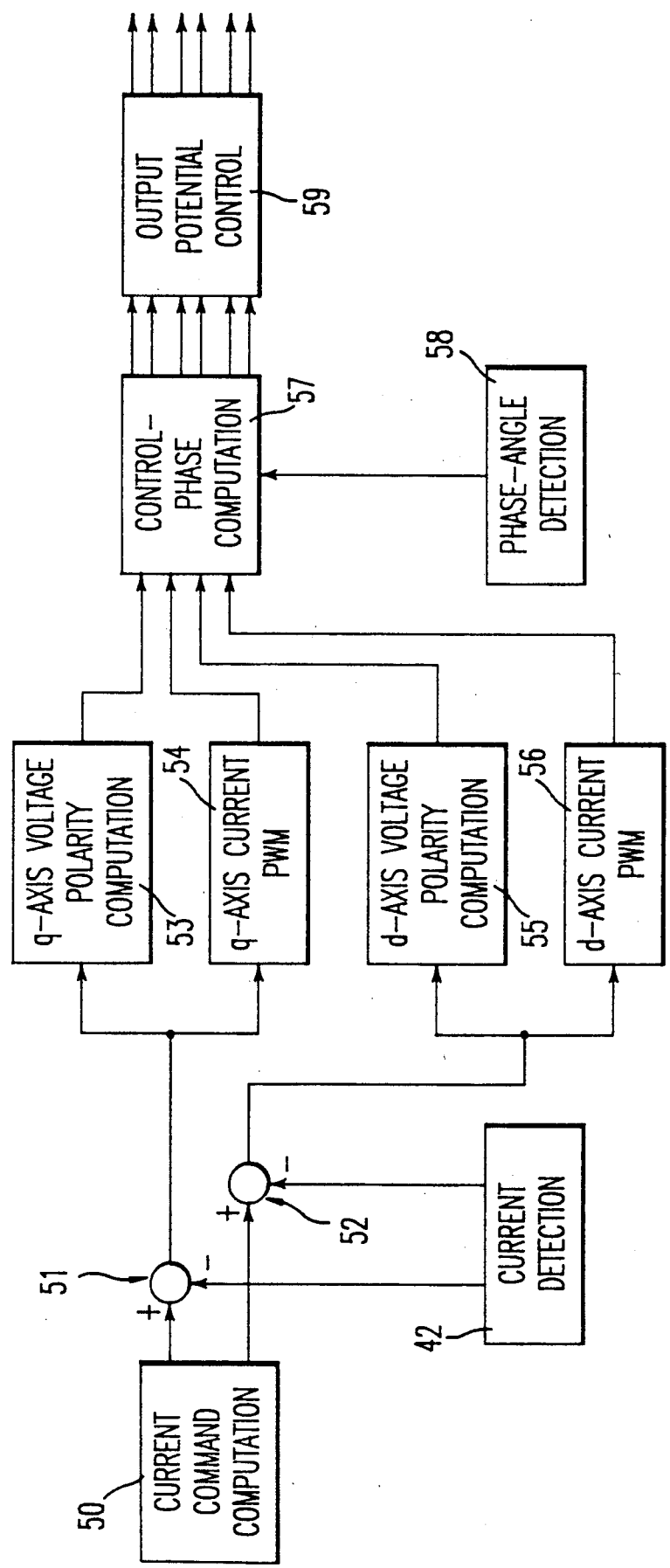
FIG. 7 is a view showing the basic concept of a third embodiment of the invention.

If the fundamental or basic principle described above is expressed in a figure, a basic conceptional figure can be formed as shown in FIG. 7.

In the third embodiment, with the arrangement described above, when the output current of the inverter follows the desirable current command value, current-command computing means 50 computes a q-axis-current command and a d-axis-current command. Further, current detecting means 42 detect current in each phase to transform the detecting value, thereby obtaining q-axis current and d-axis current. Q-axis-current error computing means 51 compares the q-axis current command value and the q-axis current detecting value with each other to obtain a q-axis-current error. D-axis-current error computing means 52 compares the d-axis current command value and the d-axis-current detecting value with each other to obtain a d-axis-current error. Subsequently, q-axis-voltage polarity computing means 53 obtains a polarity of q-axis-current control voltage $v_q$ on the basis of the q-axis current error. Q-axis-current PWM computing means 54 obtains a q-axis-current PWM control signal on the basis of the q-axis current error. Further, d-axis-voltage polarity computing means 55 obtains a polarity of d-axis-current control voltage $v_d$ on the basis of the d-axis current error. D-axis-current PWM computing means 56 obtains a d-axis-current PWM control signal on the basis of the d-axis current error. Moreover, control-phase computing means 57 obtains a q-axis-current control phase and a polarity of the q-axis-current control phase, a d-axis-current control phase and a polarity of the d-axis current control phase, and a reference potential phase and a polarity of the reference potential phase on the basis of the magnetic-flux phase angle detected or computed by the phase angle detecting means 58, the polarity of q-axis-current control voltage $V_q$ and the polarity of d-axis-current control voltage $V_d$. Output-potential control means 59 determines an output potential from the q-axis-current control phase on the basis of the q-axis-current PWM control signal and the polarity of the q-axis-current control phase, determines an output potential of the d-axis-current control phase on the basis of the d-axis-current PWM control signal and the polarity of the d-axis-current control phase, and determines an output potential of a reference potential phase on the basis of the polarity of the reference potential phase.

In this manner, in the third embodiment, the output potential of the q-axis-current control phase is controlled on the basis of the q-axis-current error. Further, the output potential of the d-axis-current control phase is controlled on the basis of the d-axis-current error. The output potential of the remaining reference potential phase is fixed to any potentials on the basis of the polarity of the reference potential phase.

Accordingly, similarly to the description with reference to the second invention, the number of the phases PWM-controlled is brought to two phases, and agrees with the number of the independent variables. Thus, no interference occurs between the phases. Further, since the q-axis current and the d-axis current are controlled independently of each other, no interference occurs also between the q-axis current and the d-axis current. As a result, an improvement in the current control accuracy and control high in rapid response ability are made possible.

Moreover, the following advantages and so on are obtained by the invention. That is, the q-axis-current control phase and the polarity of the q-axis-current control phase, the d-axis-current control phase and the polarity of the d-axis-current control phase, and the reference potential phase and the polarity of the reference potential phase are obtained on the basis of the phase angle of the magnetic flux, the polarity of the q-axis-current control voltage $v_q$ and the polarity of the d-axis-current control voltage $v_d$. Accordingly, in case of the alternating-current motor, it is possible to determine an optimum output potential continuously even under any conditions regardless of the adequate four phenomenon motions, that is, normal/reverse of the rotational direction and powering/regeneration of the load condition. Moreover, since not only the q-axis current, but also the d-axis current is controlled, control of an induction motor and so on is made possible. Furthermore, in case of a synchronous motor in which a magnetic flux is preset, control high in efficiency is also possible.

A current control system for an inverter, according to a fourth embodiment of the invention, is characterized in the second invention in that the aforesaid control-phase potential computing means comprises control-phase computing means and output-potential control means. That is, in the control-phase computing means, various amounts such as voltage, current, magnetic flux and so on that are state amounts expressing a motion condition of a load are treated as vectors on a complex plane. A unit vector is assumed on the complex plane. A direction or orientation of the unit vector, in which a coordinate value of a specific phase is maximized, is selected as a phase direction of a positive polarity of the specific phase. A direction of the unit vector, in which the coordinate value of the specific phase is minimized, is selected as a phase direction of a negative polarity of the specific phase. A phase direction, which is most approximate to the direction of the q-axis, is selected as a phase direction of q-axis control, among the positive phase directions and the negative phase directions of various phases. A phase corresponding to the phase direction of the q-axis control is selected as a q-axis-current control phase. The polarity of the phase direction in the q-axis control is brought to a polarity of the q-axis-current control phase. The polarity of the q-axis-current control phase and the polarity of the q-axis-current control voltage are multiplied by each other, and the multiplication result is inverted to obtain a polarity which is brought to a polarity of the reference potential phase. Of two phases except for the q-axis-current control phase, a phase whose positive phase direction is more approximate to the positive direction of the magnetic flux is brought to a phase which is positive in the polarity of the d-axis current. The remaining one phase is brought to a phase which is negative in the polarity of the d-axis current. In case where the result of multiplication between the polarity of the d-axis-current control voltage and the polarity of the reference potential phase is positive, a phase which is positive in the polarity of the d-axis current is brought to the reference potential phase. The remaining one phase is brought to a d-axis-current control phase. In case where the result of multiplication between the polarity of the d-axis-current control voltage and the polarity of the reference potential phase is negative, a phase which is positive in the polarity of the d-axis current is brought to a d-axis-current control phase. The remaining one phase is brought to a reference potential phase. The polarity of the d-axis current in the d-axis-current control phase is brought to a polarity of the d-axis-current control phase. In the above output-potential control means, the q-axis-current PWM control signal is multiplied by the polarity of the q-axis-current control phase thereby obtaining a potential of the q-axis-current control phase. The d-axis-current PWM control signal is multiplied by the polarity of the d-axis-current control phase thereby obtaining the potential of the d-axis-current control phase. The potential of the reference potential phase is obtained on the basis of the polarity of the reference potential phase, to control the potential in each phase.

In this manner, in the fourth embodiment, the q-axis current is controlled on the basis of the output potential of the q-axis-current control phase, and the d-axis current is controlled on the basis of the output potential of the d-axis-current control phase. The output potential of the remaining reference potential phase is fixed to any potentials on the basis of the polarity of the reference potential phase.

Accordingly, similarly to the description with reference to the third embodiment, the number of the phases PWM-controlled is brought to two phases, and agrees with the number of the independent variables. Accordingly, no interference occurs between the phases. Further, since the q-axis current and the d-axis current are controlled independently of each other, no interference occurs also between the q-axis current and the d-axis current. Moreover, the q-axis-current control phase and the polarity of the q-axis-current control phase, the d-axis current control phase and the polarity of the d-axis-current control phase, and the reference potential phase and the polarity of the reference potential phase are obtained on the basis of the phase angle of the magnetic flux, the polarity of the q-axis-current control voltage $v_q$ and the polarity of the d-axis-current control voltage $v_d$. Accordingly, in case of the alternating-current motor, it is possible to decide an optimum output potential continuously under any conditions regardless of four phenomenon motions, that is, regardless of normal/reverse of the rotational direction and powering/regeneration of the load condition.

Further, the above-described algorithm can easily be realized if a logic circuit is used, and it is possible to make the control circuit compact and to reduce the cost of the control circuit.

Furthermore, the following advantages and so on are obtained by the present embodiment. That is, since not only the q-axis current, but also the d-axis current is controlled, it is possible to control an induction motor and so on. Moreover, in case of a synchronous motor in which the magnetic flux is preset, control high in efficiency is also possible.

A current control system for an inverter, according to a fifth embodiment of the invention, is characterized in the first and second inventions in that the aforesaid q-axis-current control computing means comprises q-axis-voltage polarity computing means for applying the q-axis-current error to a hysteresis comparator to compute a polarity of q-axis-current control voltage, and q-axis-current PWM computing means for applying the q-axis-current error to a hysteresis comparator smaller in hysteresis width than the aforementioned hysteresis comparator to compute a PWM control signal of the q-axis current.

As described above, in the fifth embodiment, an instantaneous value of the q-axis-current error is applied to the hysteresis comparator whereby the q-axis-current PWM control signal is computed such that the instantaneous value of the q-axis-current error remains within a permissible or allowable value. Further, the polarity of the q-axis-current control voltage is also detected by application of the instantaneous value of the q-axis-current error to the hysteresis comparator.

Accordingly, the q-axis-current control high in rapid response ability and detection of the polarity of the q-axis-current control voltage less in delay are made possible. As a result, various gains such as speed control and so on can be set high, and the control accuracy is also improved.

Further, since the fifth embodiment is constructed only by the hysteresis comparator, it can be realized that the control circuit is made compact and the cost of the control circuit is reduced.

A current control system for an inverter, according to a sixth embodiment, is characterized in the second invention in that the aforesaid d-axis-current control computing means comprises d-axis-voltage polarity computing means for applying the d-axis-current error to a hysteresis comparator to compute a polarity of the d-axis-current control voltage, and d-axis-current PWM computing means for applying the d-axis-current error to a hysteresis comparator smaller in hysteresis width than the aforementioned hysteresis comparator to compute a PWM control signal of the d-axis current.

As described above, in the sixth embodiment, an instantaneous value of the d-axis-current error is applied to the hysteresis comparator whereby the d-axis-current PWM control signal is computed such that the instantaneous value of the d-axis-current error remains within a permissible or allowable value. Further, the polarity of the d-axis-current control voltage is also detected by application of the instantaneous value of the d-axis-current error to the hysteresis comparator.

Accordingly, the d-axis-current control high in rapid response ability and detection of the polarity of the d-axis-current control voltage less in delay are made possible. As a result, various gains such as speed control and so on can be set high, and the control accuracy is also improved.

Moreover, since the sixth embodiment is constructed only by the hysteresis comparator, it is possible to make the control circuit compact, and to reduce the cost of the control circuit.

A current control system for an inverter, according to a seventh embodiment, is characterized in the first and second inventions in that the aforesaid q-axis-current control computing means comprises q-axis-voltage polarity computing means and q-axis-current PWM computing means. In the q-axis-voltage polarity computing means, the q-axis-current error is computed in a proportional and integral (P−I) control manner. The result of the proportional and integral control computation is compared with a positive triangular wave whose minimum value is zero and a negative triangular wave whose maximum value is zero. In case where the result of the proportional and integral control computation is larger than the positive triangular wave, the polarity of the q-axis-current control voltage is brought to a positive one. In case where the result of the proportional and integral control computation is smaller than the negative triangular wave, the polarity of the q-axis-current control voltage is brought to a negative one. In case where the result of the proportional and integral control computation is equal to or less than the positive triangular wave and equal to or larger than the negative triangular wave, the polarity of the q-axis-current control voltage is maintained at a polarity until now. In the q-axis-current PWM computing means, when the polarity of the q-axis-current control voltage is positive, the result of comparison between the result of the proportional and integral control computation and the positive triangular wave is brought to the q-axis-current PWM control signal. When the polarity of the q-axis-current control voltage is negative, the result of comparison between the result of the proportional and integral control computation and the negative triangular wave is brought to the q-axis-current PWM control signal.

As described above, in the seventh embodiment, the q-axis-current PWM control signal is obtained on the basis of the result of comparison between the result of the proportional and integral control computation of the q-axis-current error and the triangular wave. Accordingly, a switching frequency of the q-axis-current PWM control agrees with a frequency of the triangular wave. Thus, control or management of the switching frequency of the inverter is made easy. If setting is made to an upper-limit frequency of a semiconductor device which forms the inverter, it is possible to always secure the control accuracy of a limit obtained in this system.

Further, since the proportional and integral control computation of the q-axis-current error have their effectiveness as filtering, there is also obtained such an advantage that the proportional and integral control computation are strong for noises.

A current control system for an inverter, according to an eighth embodiment of the invention, is character-ized in the second invention in that the aforesaid d-axis-current control computing means comprises d-axis-voltage polarity computing means and d-axis-current PWM computing means. In the d-axis-voltage polarity computing means, the d-axis-current error is computed in a proportional and integral (P−I) control manner. The result of the proportional and integral control computation is compared with a positive triangular wave whose minimum value is zero and a negative triangular wave whose maximum value is zero. In case where the result of the proportional and integral control computation is larger than the positive triangular wave, the polarity of the d-axis-current control voltage is made positive. In case where the result of the proportional and integral control computation is smaller than the negative triangular wave, the polarity of the d-axis-current control voltage is made negative. In case where the result of the proportional and integral control computation is equal to or less than the positive triangular wave and equal to or greater than the negative triangular wave, the polarity of the d-axis-current control voltage is maintained at a polarity until now. In the d-axis-current PWM computing means, when the polarity of the d-axis-current control voltage is positive, the result of comparison between the result of the proportional and integral control computation and the positive triangular wave is brought to a d-axis-current PWM control signal. When the polarity of the d-axis-current control voltage is negative, the result of comparison between the result of the proportional and integral control computation and the negative triangular wave is brought to a d-axis-current PWM control signal.

As described above, in the eighth embodiment, since the d-axis-current PWM control signal is obtained on the basis of the result of comparison between the result of the proportional and integral control computation of the d-axis-current error and the triangular wave, the switching frequency of the d-axis-current PWM control agrees with the frequency of the triangular wave. Thus, control or management of the switching frequency of the inverter is made easy. If setting is made to an upper-limit frequency of a semiconductor device which forms the inverter, it is possible to always secure the control accuracy of a limit obtained in this system.

Further, since the proportional and integral control computation of the d-axis-current error have an effect of filtering, there is also obtained such an advantage that the proportional and integral control computation are strong for noises.

A current control system for an inverter, according to a ninth embodiment of the invention, is characterized in the first invention in that the aforesaid control-phase potential computing means comprises output-potential control means. In the output-potential control means, when a q-axis-current command is positive and a polarity of a q-axis-current control phase is positive, a switching element connected to a cathode side of a direct-current power source of the q-axis-current control phase is always turned off. When the q-axis-current command is positive and the polarity of the q-axis-current control phase is negative, a switching element connected to an anode side of the direct-current power source of the q-axis-current control phase is always turned off. When the q-axis-current command is negative and the polarity of the q-axis-current control phase is positive, the switching element connected to the anode side of the direct-current power source of the q-axis-current control phase is always turned off. When the q-axis-current command is negative and the polarity of the q-axis-current control phase is negative, the switching element connected to the cathode side of the direct-current power source of the q-axis-current control phase is always turned off.

As described above, in the ninth embodiment, of upper and lower semiconductor devices of the q-axis-current control phase, the semiconductor device on one side, in which current must not flow, is fixed always to an OFF state. Accordingly, a danger of arm short circuit occurring due to operational delay of the upper and lower semiconductor devices is eliminated so that the necessity of provision of dead time is dispensed with. As a result, the control accuracy and the response ability are improved. Further, it is possible also to reduce an electric power for driving the semiconductor devices to half.

A current control system for an inverter, according to a tenth embodiment of the invention, is characterized in the second invention in that the aforesaid control-phase potential computing means comprises output-potential control means. In the output-potential control means, when a q-axis-current command is positive and a polarity of a q-axis-current control phase is positive, a switching element connected to the anode side of a direct-current power source of a reference potential phase and the d-axis-current control phase is always turned off. When the q-axis-current command is positive and the polarity of the q-axis-current control phase is negative, a switching element connected to the cathode side of the direct-current power source of the reference potential phase and the d-axis-current control phase is always turned off. When the q-axis-current command is negative and the polarity of the q-axis-current control phase is positive, the switching element connected to the cathode side of the direct-current power source of the reference potential phase and the d-axis-current control phase is always turned off. When the q-axis-current command is negative and the polarity of the q-axis-current control phase is negative, the switching element connected to the anode side of the direct-current power source of the reference potential phase and the d-axis-current control phase is always turned off.

As described above, in the tenth embodiment, of the upper and lower semiconductor devices of the reference potential phase and the d-axis-current control phase, the semiconductor device on one side, through which current must not flow, is fixed always to an OFF state. Accordingly, a danger of arm short circuit occurring due to operational delay in the upper and lower semiconductor devices is eliminated so that the necessity of provision of dead time is dispensed with. As a result, the control accuracy and the response ability are improved. Further, an electric power for driving the semiconductor devices can be reduced to half.

A current control system for an inverter, according to an eleventh embodiment of the invention, is characterized in that the hysteresis comparator of the aforesaid q-axis-current control computing means has the hysteresis width which varies dependent upon the operational condition.

As described above, in the eleventh embodiment, the hysteresis width of the hysteresis comparator in the q-axis-current control computation varies dependent upon the operational condition. Accordingly, it is possible to freely set the switching frequency of the q-axis-current PWM control and the detecting speed of the polarity of the q-axis-current control voltage. Thus, if the switching frequency is set to an upper-limit frequency of a semiconductor device which forms the inverter, it is possible to always secure the control accuracy of a limit obtained in this system. Further, it is possible also to set the detecting speed of the polarity of the q-axis-current control voltage to an optimum value which is determined on the basis of the system.

A current control system for an inverter, according to a twelfth embodiment of the invention, is characterized in that the hysteresis comparator of the aforesaid d-axis-current control computing means has the hysteresis width which varies dependent upon the operational condition.

As described above, in the twelfth embodiment, the hysteresis width of the hysteresis comparator in the d-axis-current control computation varies dependent upon the operational condition. Accordingly, it is possible to freely set the switching frequency of the d-axis-current PWM control and the detecting speed of the polarity of the d-axis-current control voltage. Thus, if the switching frequency is set to an upper-limit frequency of a semiconductor device which forms the inverter, it is possible to always secure the control accuracy of a limit which is obtained in that system. Further, it is possible also to set the detecting speed of the polarity of the d-axis-current control voltage to an optimum value which is determined on the basis of the system.

A current control system for an inverter, according to a thirteenth embodiment of the invention, is characterized in that an exciting-current rotational angle of vector control for an induction motor is used as a magnetic-flux phase angle (rotational angle).

As described above, in the thirteenth embodiment, since the exciting-current rotational angle of the vector control for the induction motor is brought to the magnetic-flux phase angle, it is possible to apply the thirteenth embodiment to a motor in which the magnetic-flux phase angle is not determined on the basis of the rotational angle of a rotor or a motor in which it is impossible to detect the magnetic-flux phase angle.

A current control system for an inverter, according to a fourteenth embodiment of the invention, is characterized by the aforesaid control-phase potential computing means which is constructed as follows. That is, between a semiconductor device on the anode side and a semiconductor device on the cathode side in each phase, dead time is provided for one of the semiconductor devices for a predetermined period of time of a change from turning-on to turning-off of the other semiconductor device. In case where the other semiconductor device is maintained at the OFF condition for a period of time equal to or more than the dead time, no dead time is provided for the one semiconductor device.

As described above, in the fourteenth embodiment, in case where, of the upper and lower semiconductor devices with respect to a single arm of the inverter, one of the semiconductor devices is maintained at the OFF condition for a period of time equal to or more than the dead time, no dead time is provided for the other semiconductor device. Accordingly, of the upper and lower semiconductor devices, the semiconductor device on one side, through which current must not flow, is always fixed to the OFF condition, whereby control having no dead time can be made possible. As a result, the control accuracy and the response ability are improved. Further, if, by any chance, the OFF condition is not secured equal to or more than the period of time of the dead time, the dead time is provided for the other semiconductor device for a predetermined period of time of a change from turning-on to turning-off. Accordingly, the safety or security can always be secured.

A current control system for an inverter, according to a fifteenth embodiment of the invention, is characterized by the aforesaid control-phase potential computing means in which, when an output potential from a q-axis-current control phase is in agreement with a potential of a reference potential phase, an output potential from the d-axis-current control phase is also in agreement with the potential of the reference potential phase.

As described above, in the fifteenth embodiment, when the output potential from the q-axis-current control phase is in agreement with the potential of the reference potential phase, the output potential from the d-axis-current control phase is also in agreement with the potential of the reference potential phase. Accordingly, a period of time increases in which zero voltage is applied to a motor. Further, when the output potential from the q-axis-current control phase is in agreement with the potential of the reference potential phase, not the output potential from the d-axis-current control phase alone is different from the potential of the reference potential phase. Thus, selection of a voltage vector is prohibited, in which a phase is largely broken with respect to ideal voltage positioned substantially in the direction of the q-axis current. As a result, a change in a current error is made gentle, and it is possible to improve the current control accuracy.

Figure 8:
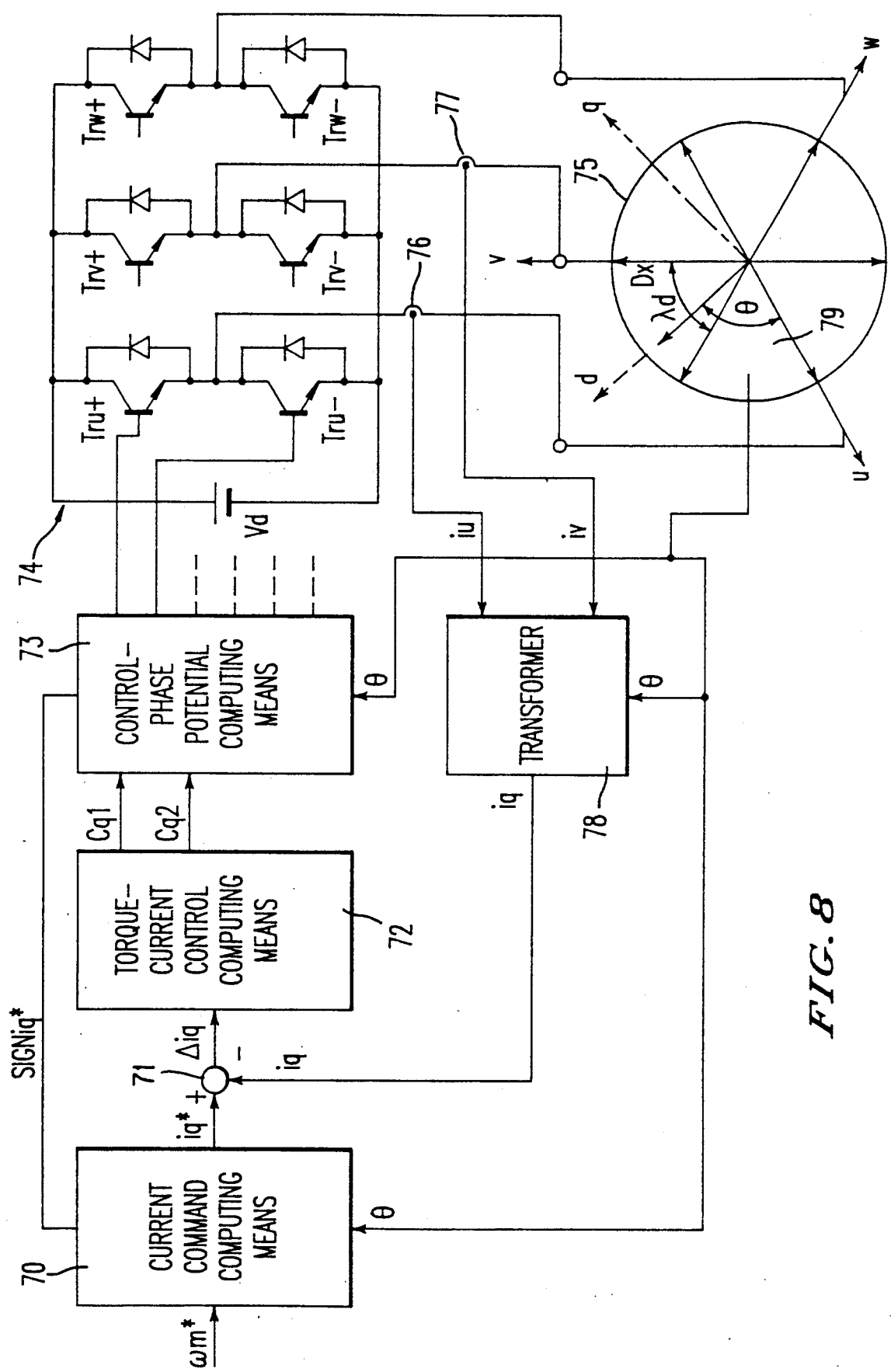
FIG. 8 is a view showing a circuit arrangement according to a sixteenth embodiment of the invention.

Various specific embodiments, in which the aforesaid embodiments are combined with each other, will be described with reference to the drawings. In this connection, in the following description, an alternating-current motor is used which performs rotational motion. Accordingly, description will be made in which q-axis current is torque current, d-axis current is exciting current, a phase angle is a rotational angle, and a direction advanced 90 degrees with respect to the d-axis is a q-axis. FIG. 8 shows a current control system for an inverter, according to a sixteenth embodiment of the invention, in which the first embodiment, the second embodiment, the fifth embodiment, the ninth embodiment and the fourteenth embodiment are combined with each other.

Here, a rotational-speed command $\omega m^*$ and a motor rotational angle $\theta$ are inputted to current-command computing means 70, and $\theta$ is differentiated, whereby a rotational speed $\omega$ is obtained. A torque current command $i_q^*$ and a polarity sign $i_q^*$ of a torque-current command are computed and outputted on the basis of $\omega m^*$ and $\omega$. In torque-current error computing means 71 constituted by a comparator, the torque current command $i_q^*$ is compared with torque current $i_q$ to obtain a torque current error $\Delta i_q$. The torque current error $\Delta i_q$ is inputted to torque-current control computing means 72, and a torque-current PWM control signal $C_{q1}$ and a polarity $C_{q2}$ of torque-current control voltage $v_q$ are computed and outputted. The polarity sign $i_q^*$ of the torque-current command, the torque-current PWM control signal $C_{q1}$ and the polarity $C_{q2}$ of the torque-current control voltage $v_q$ are inputted to control-phase potential computing means 73, and ON/OFF signals of transistors $T_{ru+}$ through $T_{rw-}$ forming an inverter 74 are outputted. The inverter 74 is composed of a voltage-type inverter. In the voltage-type inverter, three series circuits are connected to a positive side and a negative side of a direct-current power source having its voltage $V_d$. In each of the three series circuits, an electric valve, in which a transistor and a diode are connected in inverted parallel relation to each other, is connected in series. The inverter 74 drives an alternating-current motor 75. The alternating-current motor 75 is a synchronous motor having a permanent magnet mounted thereto. Current detecting means comprises a pair of current detectors 76 and 77, and a transformer 78. The current detecting means detects phase currents $i_u$ and $i_v$ and transforms them to obtain torque current $i_q$. Magnetic-flux rotational-angle detecting means 79 is composed of a rotational-angle sensor which is mounted to the alternating-current motor 75, and detects the rotational angle $\theta$ of a magnetic flux $\lambda_d$.

Figure 9:
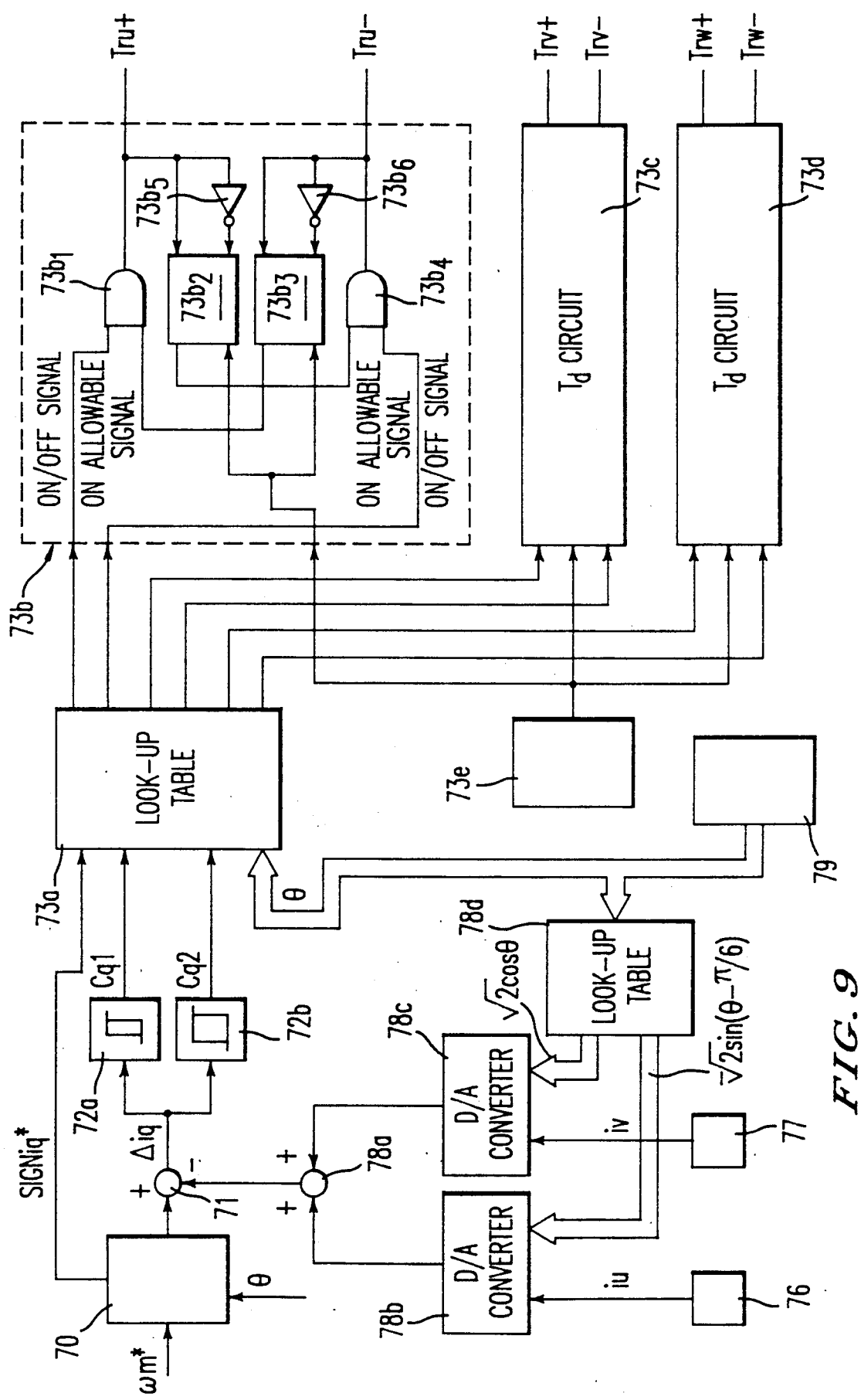
FIG. 9 is a view showing a detailed circuit arrangement according to a sixteenth embodiment of the invention.

FIG. 9 shows a detailed circuit arrangement of the current control system illustrated in FIG. 8. In FIG. 9, components and parts like or similar to those illustrated in FIG. 8 are designated by the same or like reference numerals, and the description of the like or similar components and parts will therefore be omitted to avoid repetition. The torque-current control computing means 72a comprises torque-current PWM computing means 72a and torque-current polarity computing means 72b. The torque-current PWM computing means 72 is composed of a hysteresis comparator whose hysteresis width is $2\Delta H_1$. The torque-current error current $\Delta i_q (=i_q^*-i_q)$ is inputted to the hysteresis comparator, to compute a torque-current PWM control signal $C_{q1}$. Specifically, in case where the torque current $i_q$ is smaller than a threshold $(i_q^*-\Delta H_1)$, that is, in case where $\Delta i_q > \Delta H_1$, the torque-current PWM control signal $C_{q1}$ is brought to 1 or a HIGH level, in order to increase the torque current $i_q$. Conversely, in case where the torque current $i_q$ is larger than the threshold $(i_q^*+\Delta H_1)$, that is, in case where $\Delta i_q < -\Delta H_1$, the torque-current PWM control signal $C_{q1}$ is brought to 0 (zero), that is, to a LOW level, in order to reduce the torque current $i_q$. The torque-current polarity computing means 72b is composed of a hysteresis comparator whose hysteresis width $2\Delta H_2$ is larger than that of the torque-current PWM computing means 72a, that is, $\Delta H_2 > \Delta H_1$. The torque-current error current $\Delta i_q$ is inputted to the hysteresis comparator, to compute a polarity $C_{q2}$ of the torque-current control voltage $v_q$. Specifically, in case where the torque current $i_q$ is smaller than the threshold $(i_q^*-\Delta H_2)$, that is, in case where $\Delta i_q > \Delta H_2$, the polarity $C_{q2}$ of the torque-current control voltage $v_q$ is brought to 1, that is, to the HIGH level, in order to bring the torque-current control voltage $v_q$ to + (positive). Conversely, in case where the torque current $i_q$ is larger than the threshold $(i_q^*+\Delta H_2)$, that is, in case where $\Delta i_q < -\Delta H_2$, the polarity $C_{q2}$ of the torque-current control voltage $v_q$ is brought to 0 (LOW level), in order to bring the torque-current control voltage $v_q$ to − (negative).

The control-phase potential computing means 73 comprises a look-up table 73a, a plurality of $T_d$ (dead time) circuits 73b through 73d and an oscillator 73e.

The look-up table 73a includes control-phase computing means for computing a torque-current control phase and a polarity of the torque-current control phase, and a reference-potential phase and a polarity of the reference-potential phase on the basis of the polarity $C_{q2}$ of the torque-current control voltage $v_q$ and the magnetic-flux rotational angle $\theta$, and a part of output-potential control means for deciding a potential of the torque-current control phase on the basis of the torque-current PWM control signal and the polarity of the torque-current control phase, and deciding the potential of the reference potential phase on the basis of the polarity of the reference potential phase.

Figure 10:
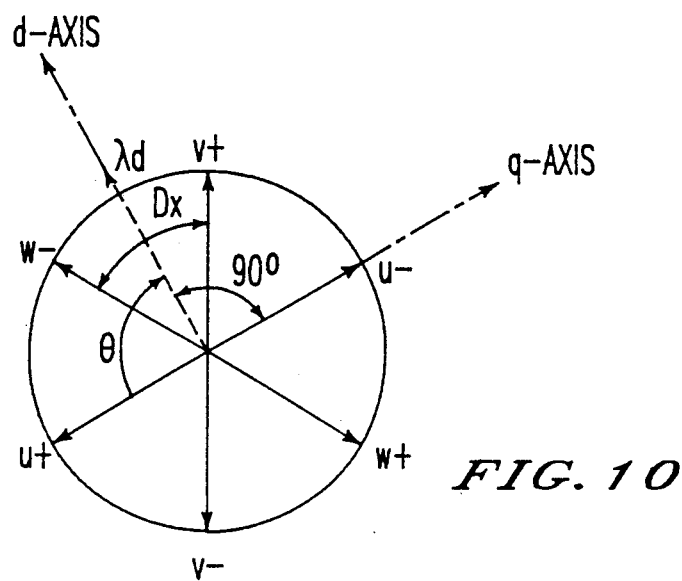
FIG. 10 is a view for explanation of control-phase computing means according to the sixteenth embodiment.

In the control-phase computing means, a direction toward a terminal of each phase with respect to winding axes of three phases is brought to a phase direction having a positive polarity. A reverse direction with respect to the terminal of each phase is brought to a phase direction of a negative polarity. A phase direction, which is most approximate to a direction advanced 90 degrees with respect to the rotational angle $\theta$ of the magnetic flux among the positive phase directions and the negative phase directions of all phases, is selected as a phase direction of the torque control. A phase corresponding to the phase direction of the torque control is brought to a torque-current control phase. The polarity of the phase direction of the torque control is brought to a polarity of the torque-current control phase. Two phases except for the torque-current control phase are brought respectively to reference potential phases. The polarity of the torque-current control phase and the polarity $C_{q2}$ of the torque-current control voltage $v_q$ are multiplied by each other, and the result of the multiplication is inverted to obtain a polarity which is brought to a polarity of the reference potential phase. That is, as indicated by u+ ~w— shown in FIG. 10, the phase direction and the polarity of the phase direction are defined. The phase direction, which is most approximate to the direction (q-axis) advanced 90 degrees with respect to the axis (d-axis: rotational angle $\theta$) of the magnetic flux $\lambda_d$ is selected among u+ ~w—, as the phase direction of the torque control. A phase corresponding to the phase direction of the torque control is brought to the torque-current control phase, and the polarity of the phase direction of the torque control is brought to a polarity of the torque-current control phase. In case of FIG. 10, the phase direction of the torque control is u—, the torque-current control phase is a u-phase, and the polarity of the torque-current control phase is —. Subsequently, two phases except for the torque-current control phase, that is, in this case, a v-phase and a w-phase are brought respectively to reference potential phases. The polarity of the torque-current control phase, in this case, and the polarity $C_{q2}$ of the torque-current control voltage $v_q$ are multiplied by each other, and the result of the multiplication is inverted to obtain a polarity which is brought to a polarity of the reference potential phase. Here, each of the signals expressed by $+/-$, positive/negative, HIGH/LOW or 1/0 is considered to be a signal of $1/-1$, and these signals are processed by multiplication. The subsequent multiplicative processing is similar to the above, unless otherwise specified. In case of FIG. 10, it is assumed that $C_{q2}$ is 1. Then, since $C_{q2}$ is processed multiplicatively as being 1, the polarity of the reference potential phase is $-(-1 \times 1) = 1$, that is, +. If $C_{q2}$ is 0, $C_{q2}$ is multiplicatively processed as being $-1$. Thus, the polarity of the reference potential phase is $-(-1 \times -1) = -1$, that is, —.

In the output-potential control means, a polarity obtained by multiplication of the torque-current PWM control signal $C_{q1}$ and the polarity of the torque-current control phase by each other is brought to a potential of the torque-current control phase, and the polarity of the reference potential phase is brought to a potential of the reference potential phase. In case where the potential of each phase is +, a transistor connected to the anode side of the direct-current power source of the inverter is turned on, while a transistor connected to a cathode side is turned off. Conversely, in case where the potential of each phase is —, the transistor connected to the anode side of the direct-current power source of the inverter is turned off, while the transistor connected to the cathode side is turned on. In this connection, when the result of multiplication of the polarity sign $i_q^*$ of the torque-current command and the polarity of the torque-current control phase by each other is +, the transistor connected to the cathode side of the direct-current power source of the torque-current control phase is always turned off. When the result of multiplication of the polarity of the torque-current command and the polarity of the torque-current control phase by each other is —, the transistor connected to the anode side of the direct-current power source of the torque-current control phase is always turned off.

If the polarity of the torque-current control phase, the polarity of the torque-current control voltage, the polarity of the reference potential phase, the torque-current PWM control signal and the potentials of the u-phase through w-phase are expressed by a table, a table 1 is formed. If the ON/OFF conditions of the transistors with respect to the table 1 are expressed by a table, a table 2 is formed. In this connection, ON/OFF in the table 2 is determined by a table 3.

Subsequently, an ON/OFF signal of each transistor obtained by the look-up table 73a is inputted to the $T_d$ circuits 73b through 73d. The $T_d$ circuit 73b is provided with a pair of AND gates $73b_1$ and $73b_4$ and a pair of shift registers $73b_2$ and $73b_3$. An ON/OFF signal of a transistor $T_{ru+}$ and an ON allowable signal of the transistor $T_{ru+}$ from the shift register $73b_3$ are inputted to the AND gate $73b_1$ to obtain a final ON/OFF signal of the transistor $T_{ru+}$. In the shift register $73b_2$, the final ON/OFF signal of the transistor $T_{ru+}$ and a signal, in which the final ON/OFF signal is inverted by an inverting circuit $73b_5$, are inputted respectively into a clear terminal and a data input terminal, so that data is shifted by timing of a clock signal from the oscillator 73e. The data of the highest rank is outputted as an ON allowable signal of a transistor $T_{ru-}$. Here, when the final ON/OFF signal of the transistor $T_{ru+}$ is 1, the ON allowable signal of the transistor $T_{ru-}$ is brought to 0 (zero) through the clear terminal. Further, when the final ON/OFF signal of the transistor $T_{ru+}$ is brought to 0 (zero), the ON allowable signal of the transistor $T_{ru-}$ is brought to 0 (zero) until a inverted signal of the final ON/OFF signal of the transistor $T_{ru+}$ is shifted to the highest rank. A period of time until the data is shifted to the highest rank is called dead time or an arm-short-circuit prevention period $T_d$ of the inverter.

Figure 11:
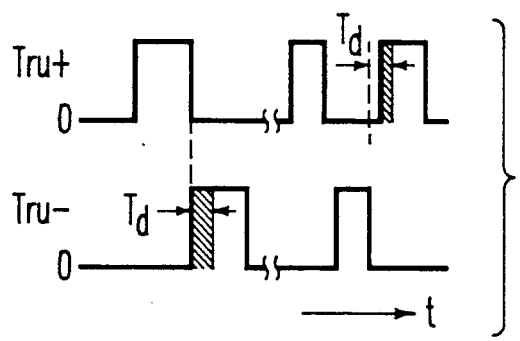
FIG. 11 is a view for explanation of a motion of a $T_d$ circuit.

The ON/OFF signal of the transistor $T_{ru-}$ and the ON allowable signal of the transistor $T_{ru-}$ from the shift register $73b_2$ are inputted to the AND gate $73b_4$ to obtain the final ON/OFF signal of the transistor $T_{ru-}$. In the shift register $73b_3$, the final ON/OFF signal of the transistor $T_{ru-}$ and the signal, in which the final ON/OFF signal is inverted by the inverting circuit $73b_6$, are inputted respectively to the clear terminal and the data input terminal to shift the data on the basis of timing of the clock signal from the oscillator 73e. The data of the highest rank is outputted as the ON allowable signal of the transistor $T_{ru+}$. Here, when the final ON/OFF signal of the transistor $T_{ru-}$ is 1, the ON allowable signal of the transistor $T_{ru+}$ is brought to 0 (zero) through the clear terminal. When the final ON/OFF signal of the transistor $T_{ru-}$ is brought to 0 (zero), the ON allowable signal of the transistor $T_{ru+}$ is brought to 0 (zero) until the inverted signal of the final ON/OFF signal is shifted to the highest rank. That is, as shown in FIG. 11, between the transistor on the anode side and the transistor on the cathode side of the u-phase, dead time is provided for one of the transistors for a predetermined period of time after the ON condition of the other transistor is changed to its OFF condition. Further, in case where one of the transistors is maintained at the OFF condition for a period of time equal to or more than the dead time, no dead time is provided for the other transistor. In this connection, the $T_d$ circuits 73c and 73d also function similarly to the $T_d$ circuit 73b.

The transformer comprises an adder 78a, a pair of multiplicative-type DA converters 78b and 78c and a look-up table 78d. The rotational angle $\theta$ of the magnetic flux is inputted to the look-up table 78d to output digital data of $-\sqrt{2}\sin(\theta-\pi/6)$ and $\sqrt{2}\cos\theta$. The phase current $i_u$ from the current detector 76 and the digital data $-\sqrt{2}\sin(\theta-\pi/6)$ from the look-up table 78d are inputted to the multiplicative-type DA coverter 78b to output the multiplicative result $-\sqrt{2}\sin(\theta-\pi/6)\cdot i_u$ of them. The phase current $i_v$ from the current detector 77 and the digital data $\sqrt{2}\cos\theta$ from the look-up table 78d are inputted to the multiplicative-type DA converter 78c to output the multiplicative result $\sqrt{2}\cos\theta\cdot i_v$ of them. The adder 78a adds $-\sqrt{2}\sin(\theta-\pi/6)\cdot i_u$ and $\sqrt{2}\cos\theta\cdot i_v$ to each other to output $-\sqrt{2}\sin(\theta-\pi/6)\cdot i_u+\sqrt{2}\cos\theta\cdot i_v$, that is, the torque current $i_q$.

In the sixteenth embodiment constructed as described above, when the output current of the inverter follows a desirable current command value, a torque current command is computed. Current in each phase is detected, and a detecting value thereof is transformed, to obtain the torque current. The torque-current command value and the torque-current detecting value are compared with each other to obtain the torque-current error. Subsequently, the polarity of the torque-current control voltage and the torque-current PWM control signal are obtained on the basis of the torque-current error. Further, the torque-current control phase and the polarity of the torque-current control phase, and the reference potential phase and the polarity of the reference potential phase are obtained on the basis of the rotational angle of the magnetic flux and the polarity of the torque-current control voltage. The output potential from the torque-current control phase is determined on the basis of the torque-current PWM control signal and the polarity of the torque-current control phase. The output potential from the reference potential phase is determined on the basis of the polarity of the reference potential phase.

In the manner described above, in the sixteenth embodiment, the output potential from the torque-current control phase is controlled on the basis of the torque-current error. The output potential from the remaining reference potential phase is fixed to any potentials on the basis of the polarity of the reference potential phase. Accordingly, the number of the phase PWM-controlled is a single phase. Thus, no interference occurs between the phases, unlike the conventional system. Further, since the torque current is controlled directly, no interference occurs also between the torque current and the exciting current, unlike control of each phase current. As a result, an improvement of the current control accuracy and control high in rapid response ability are made possible.

Moreover, since the torque-current control phase and the polarity of the torque-current control phase, and the reference potential phase and the polarity of the reference potential phase are obtained on the basis of the rotational angle of the magnetic flux and the polarity of the torque-current control voltage, it is possible to determine an optimum output potential continuously even under any conditions regardless of four phenomenon operations, that is, normal/reverse of the rotational direction and powering/regeneration of the load condition.

In the torque-current control computing means, the instantaneous value of the torque-current error is applied to the hysteresis comparator, whereby the torque-current PWM control signal is computed such that the instantaneous value of the torque-current error remains within the allowable value. Further, the polarity of the torque-current control voltage is also detected by application of the instantaneous value of the torque-current error to the hysteresis comparator. Accordingly, torque-current control high in rapid response ability and detection of the polarity of the torque-current control voltage less in delay are made possible. As a result, various gains such as speed control and so on can be set high, and the control accuracy is also improved.

Moreover, since the system can be composed only by the hysteresis comparator, a control circuit forming the torque-current control computing means can be made compact, and can be reduced in cost.

In the control-phase potential computing means, the control computing means and a part of the output-potential control means are constituted by the look-up table. Accordingly, control-phase potential computation can be made simple and easy extremely, and the control circuit can be made compact and can be reduced in cost.

Furthermore, in the control-phase potential computing means, of the upper and lower transistors of the torque-current control phase, the transistor on one side, through which current must not flow, is fixed always to the OFF condition. Accordingly, a danger of arm short circuit occurring due to the operational delay of the upper and lower transistors is eliminated so that the necessity of provision of dead time is dispensed with. As a result, the control accuracy and the response ability are improved. Further, an electric power for driving the transistors can also be reduced to half.

Moreover, in the control-phase potential computing means, between the transistor on the anode side and the transistor on the cathode side of each phase, dead time is provided for one of the transistors for a predetermined period of time after a change from turning-on to turning-off of the other transistor. In case where the other transistor is maintained at its OFF condition in a period of time equal to or more than the dead time, no dead time is provided for the one transistor. In this manner, of the upper and lower transistors of the arm in the inverter, in case where one of the transistors is maintained at its OFF condition for a period of time equal to or more than the dead time, no dead time is provided for the other transistor. Accordingly, control having no dead time is made possible. As a result, the control accuracy and the response ability are improved. Further, even if the OFF condition is not secured equal to or more than the period of time of the dead time, since dead time is provided for the other transistor for a predetermined period of time of a change from turning-on to turning-off. Accordingly, safety or security can always be secured.

A modification will be described in which the control-phase computing means in the sixteenth embodiment is modified to bring one of the two reference potential phases to an open condition.

Figure 12:
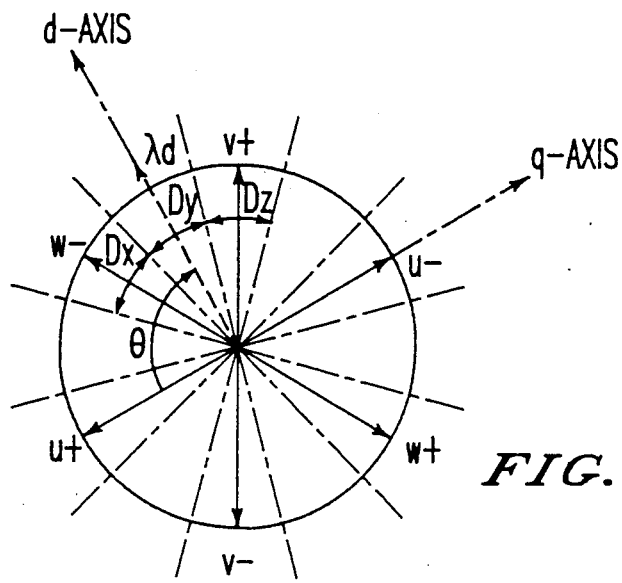
FIG. 12 is a view for explanation of a control phase of a modification according to the sixteenth embodiment.

In control-phase computing means of this modification, a direction toward a terminal of each phase with respect to winding axes of three phases is brought to a phase direction of a positive polarity. A reverse direction with respect to the terminal of each phase is brought to a phase direction of a negative polarity. A q-axis is defined in a direction advanced 90 degrees with respect to the rotational angle $\theta$ of the magnetic flux among the positive phase directions and the negative phase directions of various phases. A phase direction most approximate to the q-axis is selected as a phase direction of the torque control. A phase corresponding to the phase direction of the torque control is brought to a torque-current control phase. A polarity in the phase direction of the torque control is brought to a polarity of the torque-current control phase. Subsequently, in case where an angle defined between the q-axis and the phase direction of the torque control is larger than a threshold set within 30 degrees, a phase direction most approximate to the q-axis except the phase direction of the torque control is brought to a reference potential phase. The polarity of the torque-current control phase and the polarity $C_{q2}$ of the torque-current control voltage $v_q$ are multiplied by each other, and the result of multiplication is inverted to obtain a polarity which is brought to a polarity of the reference potential phase. Regarding the remaining one phase except for the torque-current control phase and the reference potential phase, the upper and lower transistors are fixed to the OFF condition, and the phase thereof is brought to the open condition. On the other hand, in case where the angle defined between the q-axis and the phase direction of the torque control is smaller than the threshold, two phases except for the torque-current control phase are brought to reference potential phases. The polarity of the torque-current control phase and the polarity $C_{q2}$ of the torque-current control voltage $v_q$ are multiplied by each other, and the result of the multiplication is inverted to obtain a polarity which is brought to the polarity of the reference potential phase. That is, the polarities of the phase direction and the phase direction are defined like u+ ~w— as shown in FIG. 12. A phase direction most approximate to the direction (q-axis) advanced 90 degrees with respect to the axis (d-axis: rotational angle $\theta$) of the magnetic flux is selected among u+ ~w—, as a phase direction of the torque control. A phase corresponding to the phase direction of the torque control is brought to the torque-current control phase, and the polarity in the phase direction of the torque control is brought to the polarity of the torque-current control phase. In case of FIG. 12, the phase direction of the torque control is u—. Accordingly, the torque-current control phase is the u-phase, and the polarity of the torque-current control phase is —. Subsequently, in case where the q-axis exists on the outside of the threshold indicated by the dotted lines on both sides of the phase direction of the torque control, the phase direction most approximate to the q-axis except the phase direction of the torque control is brought to the reference potential phase, and the remaining one phase is brought to the open condition. On the other hand, in case where the q-axis exists within the threshold, two phases (in this case, v-phase and w-phase) except for the torque-current control phase are brought to the reference potential phases. The polarity (in this case, —) of the torque-current control phase and the polarity $C_{q2}$ of the torque-current control voltage $v_q$ are multiplied by each other, and the result of the multiplication is inverted to obtain a polarity which is brought to the polarity of the reference potential phase. Here, signals expressed by +/—, positive/negative, HIGH/LOW or 1/0 are considered as signals of 1/—1, and are multiplicatively processed. Subsequent multiplicative processing is similar to the above, unless otherwise specified. In case of FIG. 12, if $C_{q2}$ is 1, the polarity of the reference potential phase is $-(-1 \times 1) = 1$, that is, +. If $C_{q2}$ is 0, the polarity of the reference potential phase is $-(-1 \times -1) = -1$, that is, —.

In case of the above arrangement, shift or deviation between the phase direction of the torque-current control phase and the q-axis is reduced as compared with the sixteenth embodiment. Accordingly, the control accuracy of the torque current and the response ability are improved. Further, since the voltage in the d-axis direction applied at that time is reduced as compared with the sixteenth embodiment, the current in the d-axis direction, which does not participate in the generated torque, is reduced so that the efficiency is improved. Moreover, the functional advantages obtained by the sixteenth embodiment are not damaged, so that a control circuit can be realized which is improved in current control accuracy and response ability, which is compact in construction and is reduced in cost, and which is high in safety and is less in an electric power for driving the transistors.

Figure 13:
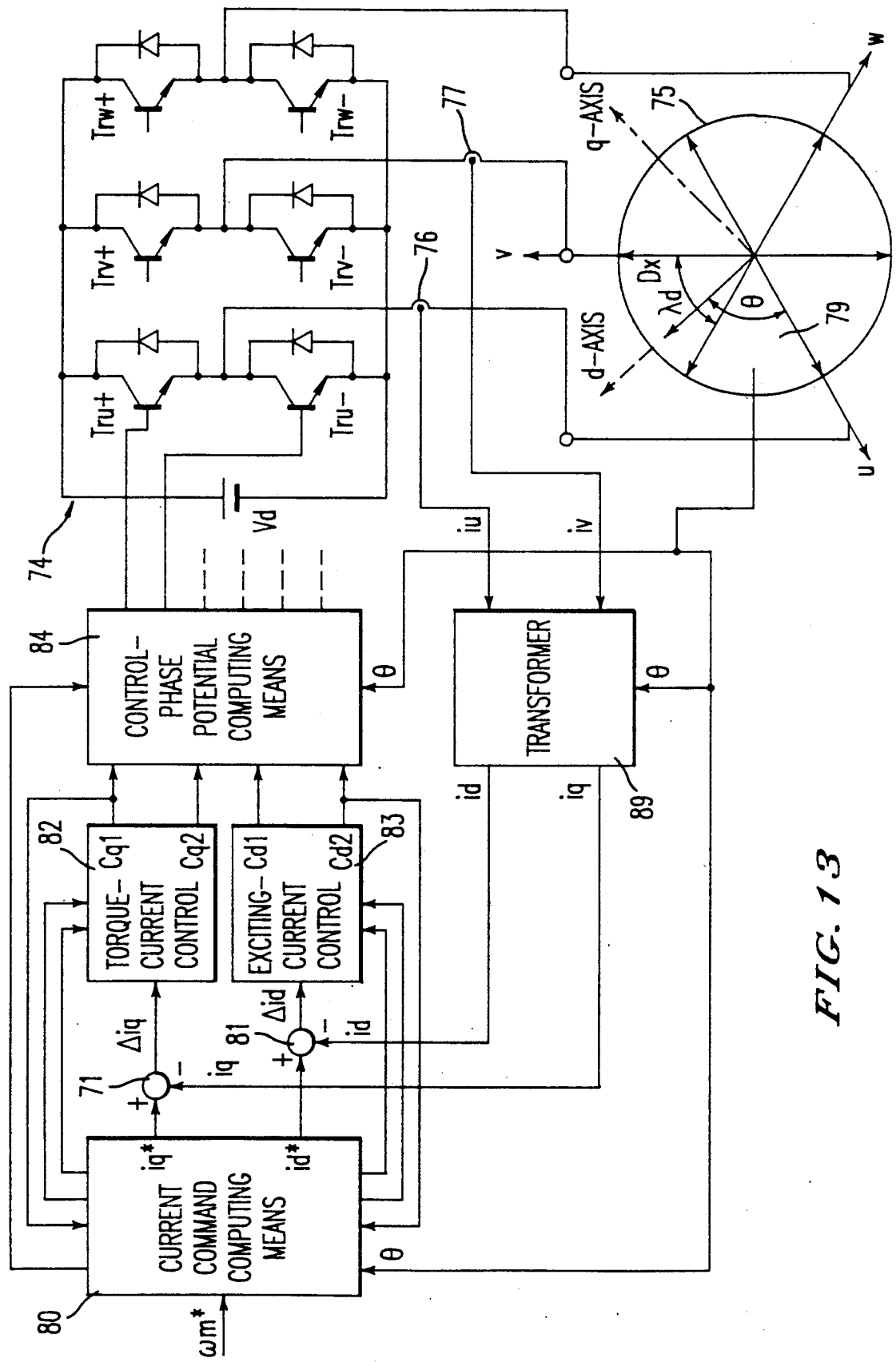
FIG. 13 is a view showing a circuit arrangement according to a seventeenth embodiment of the invention.

FIG. 13 shows a current control system for an inverter, according to a seventeenth embodiment of the invention, in which the third embodiment, the fourth embodiment, the fifth embodiment, the sixth embodiment, the ninth embodiment, the tenth embodiment, the eleventh embodiment, the twelfth embodiment, the fourteenth embodiment and the fifteenth embodiment are combined with each other. The seventeenth embodiment will be described below. In FIG. 13, components and parts like or similar to those illustrated in the previous figures are designated by the same or like reference numerals, and the description of the like or similar components and parts will be omitted to avoid repetition.

A rotational-speed command $\omega m^*$ and a motor rotational angle $\theta$ are inputted to current-command computing means 80. $\theta$ is differentiated to obtain rotational speed $\omega$. A pair of current commands $i_q^*$ and $i_d^*$ and a polarity sign $i_q^*$ of the torque-current command are computed and outputted on the basis of $\omega m^*$ and $\omega$. Further, a PWM frequency $f_q$ of the torque current is detected on the basis of a torque-current PWM control signal $C_{q1}$. The PWM frequency $f_q$ is computed on the basis of the following equations such that $f_q$ is brought to $f_q^*$, and the PWM frequency $f_q$ is outputted as gains $K_{q1}$ and $K_{q2}$ of a torque-current error:

$$K_{q1} = K_{p1}(f_q^* - f_q) + K_{i1}\int(f_q^* - f_q)dt \quad (3)$$
$$K_{q2} = K_{p2}(f_q^* - f_q) + K_{i2}\int(f_q^* - f_q)dt$$

Likewise, a PWM frequency $f_d$ of the exciting current is detected on the basis of a exciting-current PWM control signal $C_{d1}$. The PWM frequency $f_d$ of the exciting current is computed on the basis of the following equations such that $f_d$ is brought to a predetermined value $f_d^*$, and the PWM frequency $f_d$ of the exciting current is outputted as gains $K_{d1}$ and $K_{d2}$ of an exciting-current error:

$$K_{d1} = K_{p1}(f_d^* - f_d) + K_{i1}\int(f_d^* - f_d)dt \quad (4)$$

$$K_{d2} = K_{p2}(f_d^* - f_d) + K_{i2}\int(f_d^* - f_d)dt$$

In a torque-current error computing means 71, the torque-current command $i_q^*$ and the torque current $i_q$ are compared with each other to obtain a torque-current error current $\Delta i_q$.

In exciting-current error computing means 81, the exciting-current command $i_d^*$ and an exciting current $i_d$ are compared with each other to obtain an exciting-current error $\Delta i_d$.

The torque-current error $\Delta i_q$ is inputted to torque-current control computing means 82 to compute and output the torque-current PWM control signal $C_{q1}$ and a polarity $C_{q2}$ of a torque-current control voltage $v_q$.

The exciting-current error $\Delta i_d$ is inputted to exciting-current control computing means 83 to compute and output the exciting-current PWM control signal $C_{d1}$ and a polarity $C_{d2}$ of an exciting-current control voltage $v_d$.

The polarity sign $i_q^*$ of the torque-current command, the torque-current PWM control signal $C_{q1}$, the polarity $C_{q2}$ of the torque-current control voltage $v_q$, the exciting-current PWM control signal $C_{d1}$, the polarity $C_{d2}$ of the exciting-current control voltage $v_d$ and the magnetic-flux rotational angle $\theta$ are inputted to control-phase potential computing means 84, to output ON-/OFF signals of transistors $T_{ru+}$ through $T_{rw-}$ which form an inverter 74.

The inverter 74 is formed by a voltage-type inverter in which a direct-current electric power source of the voltage $V_d$ consists of a voltage source, to drive an alternating-current motor 75.

The alternating-current motor 75 is a synchronous motor having a permanent magnet mounted thereto.

The current detecting means is composed of a pair of current detectors 76 and 77 and a transformer 89. The current detecting means detects a pair of phase current $i_u$ and $i_v$, and obtains the torque current $i_q$ and the exciting current $i_d$ by transformation.

Magnetic-flux rotational-angle detecting means 79 detects the rotational angle $\theta$ of the magnetic flux by mounting a rotational-angle sensor to the alternating-current motor 75.

Figure 14:
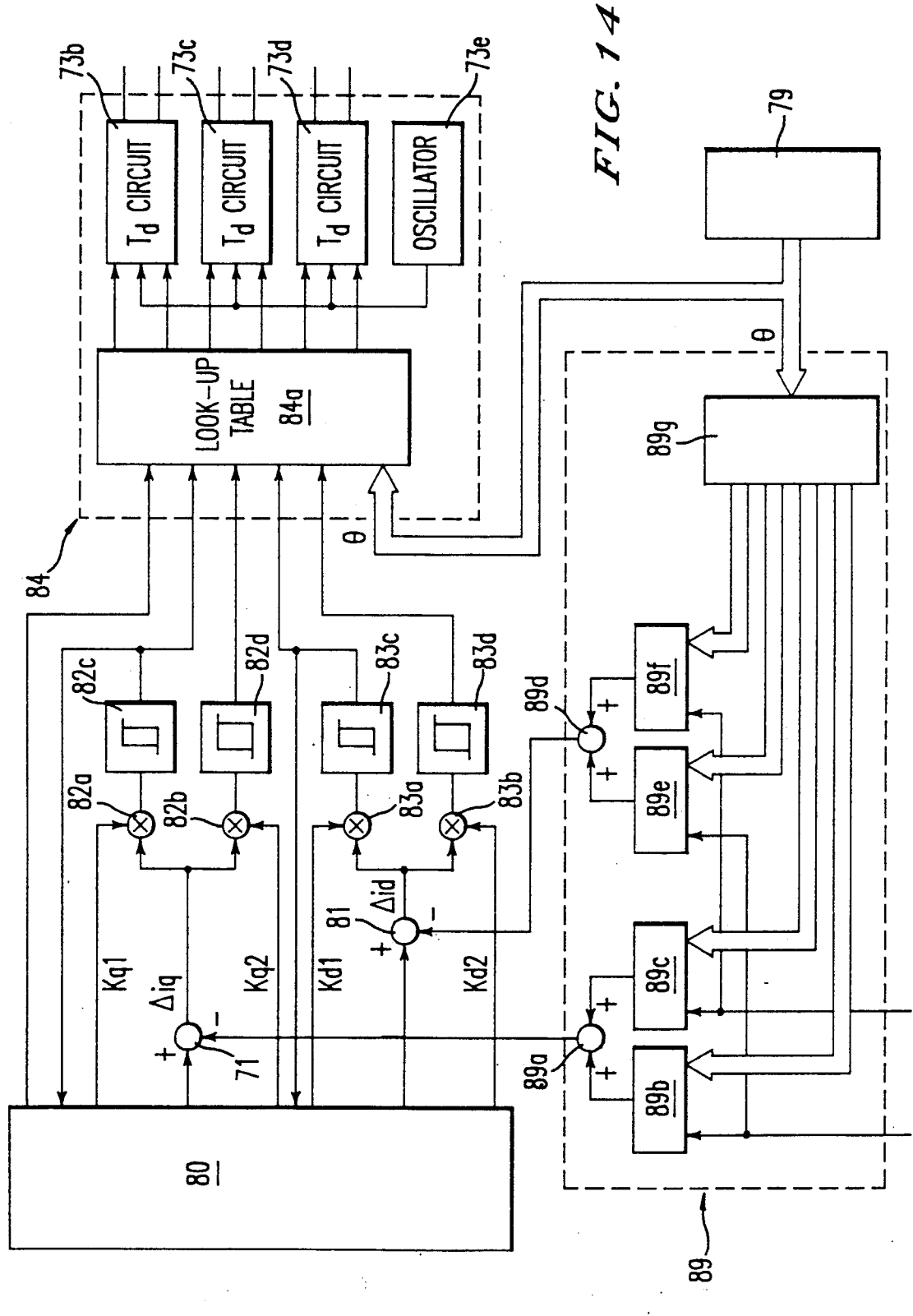
FIG. 14 is a view showing a detailed circuit arrangement according to the seventeenth embodiment.

FIG. 14 shows a detailed circuit arrangement of the system illustrated in FIG. 13. In FIG. 14, components and parts like or similar to those illustrated in FIG. 13 are designated by the same or like reference numerals, and the description of the like or similar components and parts will be omitted to avoid repetition.

The torque-current control computing means 82 comprises torque-current PWM control computing means and torque-voltage polarity computing means.

The torque-current PWM control computing means is composed of a multiplier 82a and a hysteresis comparator 82c whose hysteresis width is $2\Delta H_1$. The torque-current error current $\Delta i_q$ and the gain $K_{q1}$ of the torque-current error are inputted to the multiplier 82a to output a multiplicative result $K_{q1}\cdot\Delta i_q$ to the hysteresis comparator 82c. Subsequently, in the hysteresis comparator 82c, the torque-current PWM control signal $C_{q1}$ is computed such that $K_{q1}\cdot\Delta i_q$ remains within $-\Delta H_1 \sim \Delta H_1$.

That is, in case where the torque current $i_q$ is smaller than the threshold $i_q^* - \Delta H_1/K_{q1}$, the torque-current PWM control signal $C_{q1}$ is brought to 1 (HIGH level) in order to increase the torque current $i_q$. Conversely, in case where the torque current $i_q$ is larger than the threshold $i_q^* + \Delta H_1/K_{q1}$, the torque-current PWM control signal $C_{q1}$ is brought to 0 (zero) (LOW level) in order to reduce the torque current $i_q$. Here, the gain $K_{q1}$ of the torque-current error from the current-command computing means 80 functions to alter the hysteresis width $2\Delta H_1$.

The torque-voltage polarity computing means is composed of a multiplier 82b and a hysteresis comparator 82d whose hysteresis width is $2\Delta H_2$. The hysteresis width $2\Delta H_2$ is set larger than the hysteresis width $2\Delta H_1$ of the hysteresis comparator 82c. The torque-current error current $\Delta i_q$ and the gain $K_{q2}$ of the torque-current error are inputted to the multiplier 82b to output the multiplicative result $K_{q2}\cdot\Delta i_q$ to the hysteresis compartor 82d. Subsequently, in the hysteresis comparator 82d, the polarity $C_{q2}$ of the torque-current control voltage $v_q$ is computed such that $K_{q2}\cdot\Delta i_q$ remains within $-\Delta H_2 \sim \Delta H_2$. That is, in case where the torque current $i_q$ is smaller than the threshold $i_q^* - \Delta H_2/K_{q2}$, the polarity $C_{q2}$ of the torque-current control voltage $v_q$ is brought to 1 (HIGH level), in order to bring the torque-current control voltage $v_q$ to $+$. Conversely, in case where the torque current $i_q$ is larger than the threshold $i_q^* + \Delta H_2/K_{q2}$, the polarity $C_{q2}$ of the torque-current control voltage $v_q$ is brought to 0 (zero) (LOW level), in order to bring the torque-current control voltage $v_q$ to $-$. Here, the gain $K_{q2}$ of the torque-current error from the current-command computing means 80 functions to change or alter the hysteresis width $2\Delta H_2$, similarly to the hysteresis comparator 82c.

The exciting-current control computing means 83 comprises exciting-current PWM computing means and exciting-voltage polarity computing means.

The exciting-current PWM computing means is composed of a multiplier 83a and a hysteresis comparator 83c whose hysteresis width is $2\Delta H_1$. The exciting-current error current $\Delta i_d$ and the gain $K_{d1}$ of the exciting-current error are inputted to the multiplier 83a to output the multiplicative result $K_{d1}\cdot\Delta i_d$ to the hysteresis comparator 83c. Subsequently, in the hysteresis comparator 83c, the exciting-current PWM control signal $C_{d1}$ is computed such that $K_{d1}\Delta i_d$ remains within $-\Delta H_1 \sim \Delta H_1$. That is, in case where the exciting current $i_d$ is smaller than the threshold $i_d^* - \Delta H_1/K_{d1}$, the exciting-current PWM control signal $C_{d1}$ is brought to 1 (HIGH level), in order to increase the exciting current $i_d$. Conversely, in case where the exciting current $i_d$ is larger than the threshold $i_d^* + \Delta H_1/K_{d1}$, the exciting-current PWM control signal $C_{d1}$ is brought to 0 (zero) (LOW level), in order to reduce the exciting current $i_d$. Here, the gain $K_{d1}$ of the exciting-current error from the current-command computing means 80 functions to alter the hysteresis width $2\Delta H_1$.

The exciting-voltage polarity computing means is composed of a multiplier 83b and a hysteresis comparator 83d whose hysteresis width is $2\Delta H_2$. The hysteresis width $2\Delta H_2$ is set larger than the hysteresis width $2\Delta H_1$ of the hysteresis comparator 83c. The exciting-current error current $\Delta i_d$ and the gain $K_{d2}$ of the exciting-current error are inputted to the multiplier 83b to output the multiplicative result $K_{d2}\cdot\Delta i_d$ to the hysteresis comparator 83d. Subsequently, in the hysteresis comparator 83d, the polarity $C_{d2}$ of the exciting-current control voltage $v_d$ is computed such that $K_{d2}\cdot\Delta i_d$ remains within $-\Delta H_2 \sim \Delta H_2$. That is, in case where the exciting current $i_d$ is smaller than the threshold $i_d{}^* - \Delta H_2/K_{d2}$, the polarity $C_{d2}$ of the exciting-current control voltage $v_d$ is brought to 1 (HIGH level) in order to bring the exciting-current control voltage $v_d$ to $+$. Conversely, in case where the exciting current $i_d$ is larger than the threshold $i_d{}^* + \Delta H_2/K_{d2}$, the polarity $C_{d2}$ of the exciting-current control voltage $v_d$ is brought to 0 (zero) (LOW level) in order to bring the exciting-current control voltage $v_d$ to $-$. Here, the gain $K_{d2}$ of the exciting-current error from the current-command computing means 80 functions to alter the hysteresis width $2\Delta H_2$, similarly to the case of the hysteresis comparator 83c.

The control-phase potential computing means 84 is composed of a look-up table 84a, a plurality of $T_d$ circuits 73b~73d, and an oscillator 73e.

The look-up table 84a includes control-phase computing means for computing the torque-current control phase and the polarity of the torque-current control phase, the exciting-current control phase and the polarity of the exciting-current control phase, and the reference potential phase and the polarity of the reference potential phase, on the basis of the polarity of the torque-current control voltage $v_q$, the polarity of the exciting-current control voltage $v_d$ and the magnetic-flux rotational angle $\theta$, and a part of output-potential control means for deciding the potential of the torque-current control phase on the basis of the torque-current PWM control signal and the polarity of the torque-current control phase, for deciding the potential of the exciting-current control phase on the basis of the exciting-current PWM control signal and the polarity of the exciting-current control phase, and for deciding the potential of the reference potential phase on the basis of the polarity of the reference potential phase.

In the control-phase computing means, a direction toward a terminal in each phase with respect to winding axes of three phases is brought to a phase direction of a positive polarity. A reverse direction with respect to the terminal of each phase is brought to a phase direction of a negative polarity. A phase direction most approximate to a direction advanced 90 degrees with respect to the rotational angle of the magnetic flux among the positive phase directions and the negative phase directions of various phases is selected as a phase direction of the torque control. A phase corresponding to the phase direction of the torque control is brought to a torque-current control phase. A polarity in the phase direction of the torque control is brought to a polarity of the torque-current control phase. The polarity of the torque-current control phase and the polarity of the torque-current control voltage are multiplied by each other, and the multiplicative result is inverted to obtain a polarity which is brought to a polarity of the reference potential phase. Of two phases except for the torque-current control phase, a phase, in which the positive phase direction is more approximate to the positive direction of the magnetic flux, is brought to a phase in which the polarity of the exciting current is positive. The remaining one phase is brought to a phase in which the polarity of the exciting current is negative. In case where a result of multiplication between the polarity of the exciting-current control voltage and the polarity of the reference potential phase is positive, a phase, in which the polarity of the exciting current is positive, is brought to the reference potential phase. The remaining one phase is brought to the exciting-current control phase. In case where a result of multiplication between the polarity of the exciting-current control voltage and the polarity of the reference potential phase is negative, a phase, in which the polarity of the exciting current is positive, is brought to the exciting-current control phase. The remaining one phase is brought to the reference potential phase. The polarity of the exciting current in the exciting-current control phase is brought to the polarity of the exciting-current control phase. That is, the polarities in the phase direction and the phase direction are defined like u+ ~w— illustrated in FIG. 10. Of u+ ~w—, a phase direction, which is most approximate to the direction (q-axis) advanced 90 degrees with respect to the axis (d-axis: rotational angle $\theta$) of the magnetic flux, is selected as the phase direction of the torque control. The phase corresponding to the phase direction of the torque control is brought to the torque-current control phase. The polarity in the phase direction of the torque control is brought to the polarity of the torque-current control phase. In case of FIG. 10, the phase direction of the torque control is u—, the torque-current control phase is the u-phase, and the polarity of the torque-current control phase is —. Subsequently, the polarity (in this case, —) of the torque-current control phase and the polarity $C_{q2}$ of the torque-current control voltage $v_q$ are multiplied by each other, and the multiplicative result is inverted to obtain a polarity which is brought to the polarity of the reference potential phase. Here, signals expressed by $+/-$, positive/-negative, HIGH/LOW or 1/0 are considered as being signals of $1/-1$ similarly to the above, and are multiplicatively processed. The subsequent multiplicative processing is similar to the above unless otherwise specified. In case of FIG. 10, if $C_{q2}$ is 1, the polarity of the reference potential phase is $-(-1\times 1)=1$, that is, $+$. If $C_{q2}$ is 0 (zero), the polarity of the reference potential phase is $-(-1\times -1)=-1$, that is, $-$. Of the two phases (in this case, v-phase and w-phase) except for the torque-current control phase, the phase (in this case, the v-phase), in which the positive phase direction is more approximate to the positive direction of the magnetic flux, is brought to the phase in which the polarity of the exciting current is positive. The remaining one phase (in this case, the w-phase) is brought to the phase in which the polarity of the exciting current is negative. In case where the result of multiplication between the polarity $C_{d2}$ of the exciting-current control voltage $v_d$ and the polarity of the reference potential phase is positive, the phase (in this case, the v-phase), in which the polarity of the exciting current is positive, is brought to the reference potential phase. The remaining one phase (in this case, the w-phase) is brought to the exciting-current control phase. In case where the result of multiplication between the polarity of the exciting-current control voltage and the polarity of the reference potential phase is negative, the phase (in this case, the v-phase), in which the polarity of the exciting current is positive, is brought to the exciting-current control phase. The remaining one phase (in this case, the w-phase) is brought to the reference potential phase. The polarity of the exciting current in the exciting-current control phase is brought to the polarity of the exciting-current control phase.

In the output-potential control means, a polarity obtained by multiplication between the torque-current PWM control signal $C_{q1}$ and the polarity of the torque-current control phase is brought to a potential of the torque-current control phase. A polarity obtained by multiplication between the exciting-current PWM control signal and the polarity of the exciting-current control phase is brought to a potential of the exciting-current control phase. A polarity of the reference potential phase is brought to the potential of the reference potential phase. In this connection, when the output potential of the torque-current control phase is in agreement with the potential of the reference potential phase, the output potential of the exciting-current control phase is also made into agreement with the potential of the reference potential phase. In case where the potential of each phase is +, a transistor connected to the anode side of the direct-current power source of the inverter is turned on, while a transistor connected to the cathode side is turned off. Conversely, in case where the potential in each phase is −, the transistor connected to the anode side of the direct-current power source of the inverter is turned off, while the transistor connected to the cathode side is turned on. In this connection, when the result of multiplication between the polarity of the torque-current command and the polarity of torque-current control phase is +, the transistor connected to the cathode side of the direct-current power source of the torque-current control phase as well as the transistor connected to the anode side of the direct-current power source of the reference potential phase and the exciting-current control phase is always tuned off. When the result of multiplication between the polarity of the torque-current command and the polarity of the torque-current control phase is −, the transistor connected to the anode side of the direct-current power source of the torque-current control phase as well as the transistor connected to the cathode side of the direct-current power source of the reference potential phase and the exciting-current control phase is always turned off.

If the polarities of the aforesaid torque-current control phase, torque-current control voltage, exciting-current control voltage, exciting-current control phase and reference potential phase, the torque-current PWM control signal, the exciting-current PWM control signal, and the potentials of the respective u-phase∼w-phase are expressed by a table, a table 4 is formed. If ON/OFF conditions of the transistors with respect to the table 4 are expressed by a table, a table 5 is formed. In this connection, ON/OFF in the table 5 is determined by the table 3.

Subsequently, the ON/OFF signals of the respective transistors obtained by the look-up table 84a are inputted to the $T_d$ circuits $73b \sim 73d$. The $T_d$ circuits $73b \sim 73d$ function as follows. That is, between the transistor on the anode side and the transistor on the cathode side, dead time is provided for one of the transistors for a predetermined period of time after a change from turning-on to turning-off of the other transistor. Further, in case where the other transistor is maintained at its turning-off condition for a period of time equal to or more than the dead time, no dead time is provided for the one transistor. This is totally similar to the sixteenth embodiment, and the detailed description will be omitted.

The transformer 89 is composed of a pair of multipliers 89a and 89d, a plurality of multiplicative-type DA converters 89b, 89c, 89e and 89f, and a look-up table 89g. The rotational angle $\theta$ of the magnetic flux is inputted to the look-up table 89g to output digital data including $-\sqrt{2}\sin(\theta-\pi/6)$, $\sqrt{2}\cos\theta$, $\sqrt{2}\cos(\theta-\pi/6)$ and $\sqrt{2}\sin\theta$. The phase current $i_u$ is inputted to the multiplicative-type DA converter 89b from the current detector. The digital data $-\sqrt{2}\sin(\theta-\pi/6)$ is inputted to the multiplicative-type DA converter 89b from the look-up table 89g. The multiplicative-type DA converter 89b outputs a multiplicative result $-\sqrt{2}\sin(\theta-\pi/6)\cdot i_u$ of the phase current $i_u$ and the digital data $-\sqrt{2}\sin(\theta-\pi/6)$. The phase current $i_v$ from the current detector and the digital data $\sqrt{2}\cos\theta$ from the look-up table 89g are inputted to the multiplicative-type DA converter 89c which outputs a multiplicative result $\sqrt{2}\cos\theta\cdot i_v$ between them. The adder 89a adds $\sqrt{2}\sin(\theta-\pi/6)\cdot i_u$ and $\sqrt{2}\cos\theta i_v$ to each other to output $-\sqrt{2}\sin(\theta-\pi/6)\cdot i_u + \sqrt{2}\cos\theta i_v$, that is, the torque current $i_q$. The phase current $i_u$ from the current detector and the digital data $\sqrt{2}\cos(\theta-\pi/6)$ from the look-up table 89g are inputted to the multiplicative-type DA converter 89e which outputs a multiplicative result $\sqrt{2}\cos(\theta-\pi/6)\cdot i_u$ between them. The phase current $i_v$ from the current detector and the digital data $\sqrt{2}\sin\theta$ from the look-up table 89g are inputted to the multiplicative-type DA converter 89f which outputs a multiplicative result $\sqrt{2}\sin\theta i_v$ between them. The adder 89d adds $\sqrt{2}\cos(\theta-\pi/6)\cdot i_u$ to $\sqrt{2}\sin\theta i_v$ to output $\sqrt{2}\cos(\theta-\pi/6)\cdot i_u + \sqrt{2}\sin\theta i_v$, that is, the exciting current $i_d$.

In the seventeenth embodiment constructed as above, when the output current from the inverter follows a desirable current command, the torque-current command and the exciting-current command are computed. The current in each phase is detected, and the detecting value is transformed, thereby obtaining the torque current and the exciting current. The torque-current command value and the torque-current detecting value are compared with each other, thereby obtaining the torque-current error. The exciting-current command value and the exciting-current detecting value are compared with each other, thereby obtaining the exciting-current error. Subsequently, the polarity of the torque-current control voltage and the torque-current PWM control signal are obtained on the basis of the torque-current error, and the polarity of the exciting-current control voltage and the exciting-current PWM control signal are obtained on the basis of the exciting-current error. Further, the torque-current control phase and the polarity of the torque-current control phase, the exciting-current control phase and the polarity of the exciting-current control phase, and the reference potential phase and the polarity of the reference potential phase are obtained on the basis of the rotational angle of the magnetic flux, the polarity of the torque-current control voltage and the polarity of the exciting-current control voltage. The output potential of the torque-current control phase is determined on the basis of the torque-current PWM control signal and the polarity of the torque-current control phase. The output potential of the exciting-current control phase is determined on the basis of the exciting-current PWM control signal and the polarity of the exciting-current control phase. The output potential of the reference potential phase is determined on the basis of the polarity of the reference potential phase.

In this manner, in the seventeenth embodiment, the output potential of the torque-current control phase is controlled on the basis of the torque-current error. The output potential of the exciting-current control phase is controlled on the basis of the exciting-current error. The output potential of the remaining reference potential phase is fixed to any potentials on the basis of the polarity of the reference potential phase.

Accordingly, the number of the phases PWM-controlled is brought to two phases, and is in agreement with the number of independent variables. Thus, no interference occurs between the phase and the phase. Further, since the torque current and the exciting current are controlled independently of each other, no interference occurs also between the torque current and the exciting current.

As a result, an improvement in the current control accuracy and control high in rapid response ability are made possible.

Further, the torque-current control phase and the polarity of the torque-current control phase, the exciting-current control phase and the polarity of the exciting-current control phase, and the reference potential phase and the polarity of the reference potential phase are obtained on the basis of the rotational angle of the magnetic flux, the polarity of the torque-current control voltage and the polarity of the exciting-current control voltage. Accordingly, it is possible to decide an output potential continuously even under any conditions regardless of four phenomenon operations, that is, regardless of normal/reverse of the rotational direction, and powering/regeneration of the load condition.

In the torque-current control computing means, an instantaneous value of the torque-current error is applied to the hysteresis comparator, whereby the torque-current PWM control signal is computed such that an instantaneous value of the torque current remains within an allowable value. Further, the polarity of the torque-current control voltage is also detected by application of the instantaneous value of the torque-current error to the hysteresis comparator.

Accordingly, torque-current control high in rapid response ability and detection of the polarity of the torque-current control voltage less in delay are made possible. As a result, various gains such as speed control and so on can be set high, and the control accuracy is also improved.

Further, since the system can be constituted only by the simple hysteresis comparator, a control circuit forming the torque-current control computing means can be made compact, and can be reduced in cost.

In the exciting-current control computing means, an instantaneous value of the exciting-current error is applied to the hysteresis comparator, whereby the exciting-current PWM control signal is computed such that an instantaneous value of the exciting current remains within an allowable value. Moreover, the polarity of the exciting-current control voltage is also detected by application of the instantaneous value of the exciting-current error to the hysteresis comparator.

Accordingly, exciting-current control high in rapid response ability and detection of the polarity of the exciting-current control voltage less in delay are made possible. As a result, various gains such as speed control and so on can be set high, and the control accuracy is also improved.

Further, since the system is constructed only by the simple hysteresis comparator, a control circuit forming the exciting-current control computing means can be made compact, and can be reduced in cost.

In the torque-current control computing means, the PWM frequency of the torque current is detected, and the hysteresis width of the hysteresis comparator varies such that $f_q$ is brought to a predetermined value $f_q^*$.

As described above, since the hysteresis width of the hysteresis comparator in the torque-current control computation varies dependent upon the operational conditions, it is possible to freely set the switching frequency of the torque-current PWM control and the detecting speed of the polarity of the torque-current control voltage. Thus, the switching frequency is set to an upper-limit frequency of a semiconductor device forming the inverter, whereby it is possible to always secure control accuracy of a limit which is obtained in that system. Moreover, it is also possible to set the detecting speed of the polarity of the torque-current control voltage to an optimum value which is determined on the basis of that system.

In the exciting-current control computing means, a PWM frequency $f_d$ of the exciting current is detected, and the hysteresis width of the hysteresis comparator varies such that $f_d$ is brought to a predetermined value $f_d^*$. In this manner, since the hysteresis width of the hysteresis comparator in the exciting-current control computation varies dependent upon the operational conditions, it is possible to freely set the switching frequency of the exciting-current PWM control and the detecting speed of the polarity of the exciting-current control voltage. Thus, the switching frequency is set to an upper-limit frequency of a semiconductor device forming the inverter, whereby it is possible to always secure a control accuracy of a limit which is obtained in that system. Further, the detecting speed of the polarity of the exciting-current control voltage can also be set to an optimum value which is determined on the basis of that system.

In the control-phase potential computing means, the control-phase computing means and a part of the output-potential control means are constructed by the look-up table. Accordingly, control-phase potential computation is made easy and simple extremely, and a control circuit can be made compact and can be reduced in cost.

Moreover, in the control-phase potential computing means, of the upper and lower transistors in each phase, the transistor on one side, through which current must not flow, is always fixed to the OFF condition. Accordingly, a danger of arm short circuit occurring due to delay in operation of the upper and lower transistors is eliminated, and the necessity of provision of dead time is dispensed with. As a result, the control accuracy and the response ability can be improved. Further, an electric power for driving the transistors can be reduced to half.

Furthermore, in the control-phase potential computing means, of the transistor on the anode side and the transistor on the cathode side of each phase, dead time is provided for one of the transistors for a predetermined period of time of a change from turning-on to turning-off of the other transistor. In case where the other transistor is maintained at its OFF condition for a period of time equal to or more than the dead time, no dead time is provided for the one transistor. In this manner, of the upper and lower transistors of a single arm of the inverter, in case where one of the transistors is maintained at its OFF condition for a period of time equal to or more than the dead time, the dead time is not provided for the other transistor. Accordingly, control having no dead time is made possible. As a result, the control accuracy and the response ability can be improved. Further, if the OFF condition equal to or more than the dead time period of time is not secured, the dead time is provided for the other transistor for a predetermined period of time after a change from turning-on to turning-off. Thus, it is possible to always secure safety.

In the control-phase potential computation, when the output potential of the torque-current control phase is in agreement with the potential of the reference potential phase, the output potential of the exciting-current control phase is also in agreement with the potential of the reference potential phase. Accordingly, a period of time can increase in which zero voltage is applied to a motor. Moreover, when the output potential of the torque-current control phase is in agreement with the potential of the reference potential phase, not the output potential of the exciting-current control phase alone is different from the potential of the reference potential phase. Thus, prohibited is selection of the voltage vectors in which the phase is largely broken with respect to ideal voltage located substantially in a direction of the torque current. As a result, a change or variation in the current error is made gentle, and it is possible to improve the current control accuracy.

Figure 15:
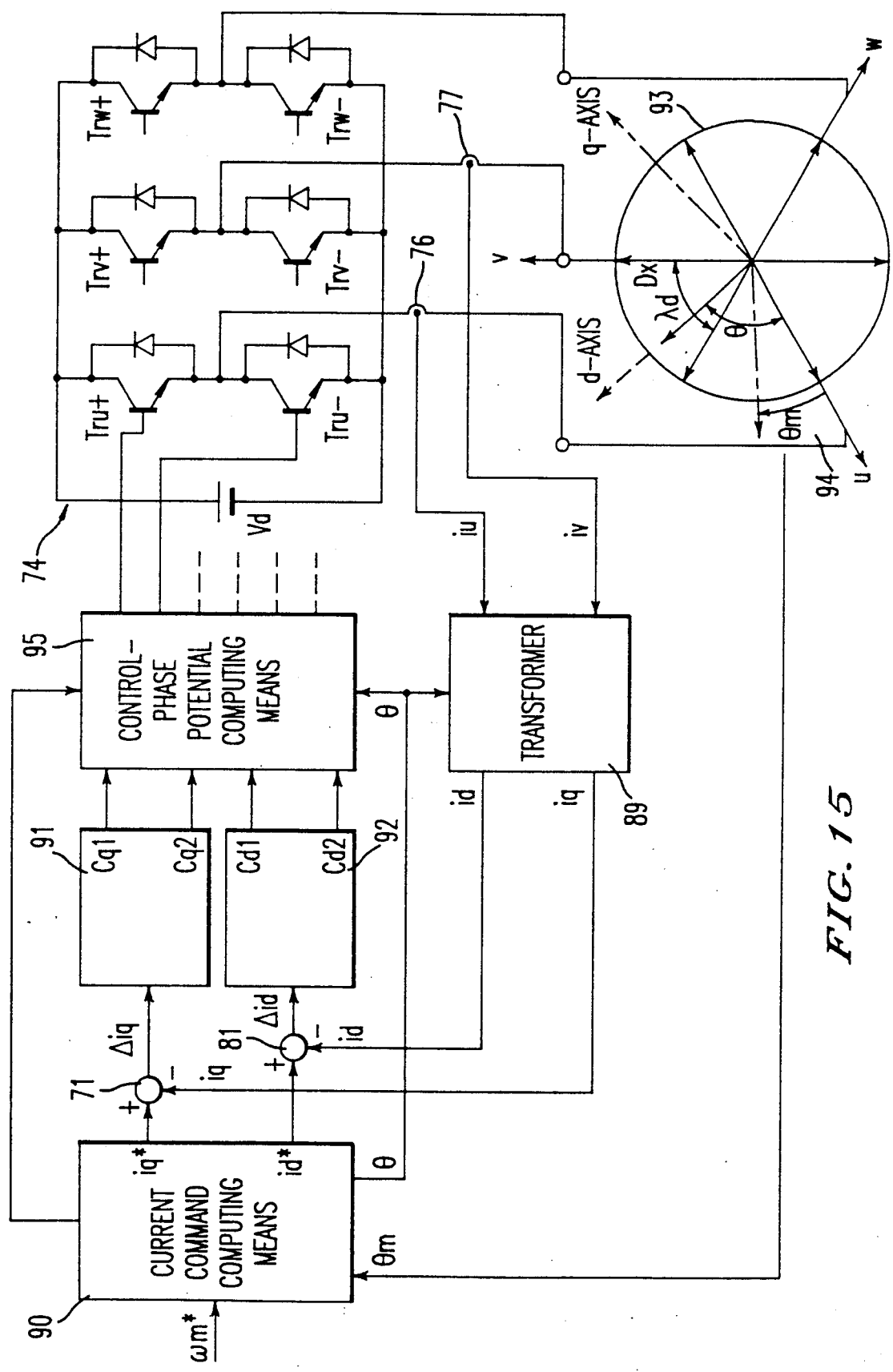
FIG. 15 is a view showing a circuit arrangement according to an eighteenth embodiment of the invention.

FIG. 15 shows a current control system for an inverter, according to an eighteenth embodiment of the invention, in which the third embodiment, the fourth embodiment, the seventh embodiment, the eighth embodiment, the ninth embodiment, the thirteenth embodiment and the fourteenth embodiment are combined with each other. The eighteenth embodiment will be described below. In FIG. 15, components and parts like or similar to those described with reference to the sixteenth and seventeenth embodiments are designated by the same or like reference numerals, and the description of such like or similar components and parts will therefore be omitted.

A rotational-speed command $\omega_m^*$ and a motor rotational angle $\theta_m$ are inputted to current-command computing means 90 which differentiates $\theta_m$ to obtain rotational speed $\omega$. The current-command means 90 computes and outputs a pair of current commands $i_q^*$ and $i_d^*$ and a polarity sign $i_q^*$ of a torque-current command on the basis of $\omega_m^*$ and $\omega$. This computation is generally called vector control for an induction motor. A rotational angle of exciting current $i_d$ obtained in the process of the computation is outputted as a rotational angle $\theta$ of a magnetic flux.

Torque-current error computing means 71 compares the torque-current command $i_q^*$ with torque-current command $i_q$ to obtain a torque-current error $\Delta i_q$.

Exciting-current error computing means 81 compares the exciting-current command $i_d^*$ with the exciting-current command $i_d$ to obtain an exciting-current error $\Delta i_d$.

The torque-current error $\Delta i_q$ is inputted to torque-current control computing means 91 which computes and outputs a torque-current PWM control signal $C_{q1}$ and a polarity $C_{q2}$ of torque-current control voltage $v_q$.

The exciting-current error $\Delta i_d$ is inputted to exciting-current control voltage means 92 which computes and outputs an exciting-current PWM control signal $C_{d1}$ and a polarity $C_{d2}$ of exciting-current control voltage $v_d$.

The polarity sign $i_q^*$ of the torque-current command, the torque-current PWM control signal $C_{q1}$, the polarity $C_{q2}$ of the torque-current control voltage $v_q$, the exciting-current PWM control signal $C_{d1}$ and the polarity $C_{d2}$ of the exciting-current control voltage $v_d$ are inputted to control-phase potential computing means 95 which outputs ON/OFF signals of transistors $T_{ru+} \sim T_{rw-}$ which form an inverter 74.

The inverter 74 is composed of a voltage-type inverter whose direct-current power source consists of a voltage source having voltage $V_d$. The inverter 74 drives an alternating-current motor 93. The alternating-current motor 93 is a squirrel-cage induction motor.

Current detecting means is composed of a pair of current detectors 76 and 77 and a transformer 89. The current detecting means detects phase currents $i_u$ and $i_v$ and transforms them to obtain the torque current $i_q$ and the exciting current $i_d$.

In rotational-angle detecting means 94, a rotational-angle sensor is mounted to the alternating-current motor 93 to detect the rotational angle $\theta_m$.

Figure 16:
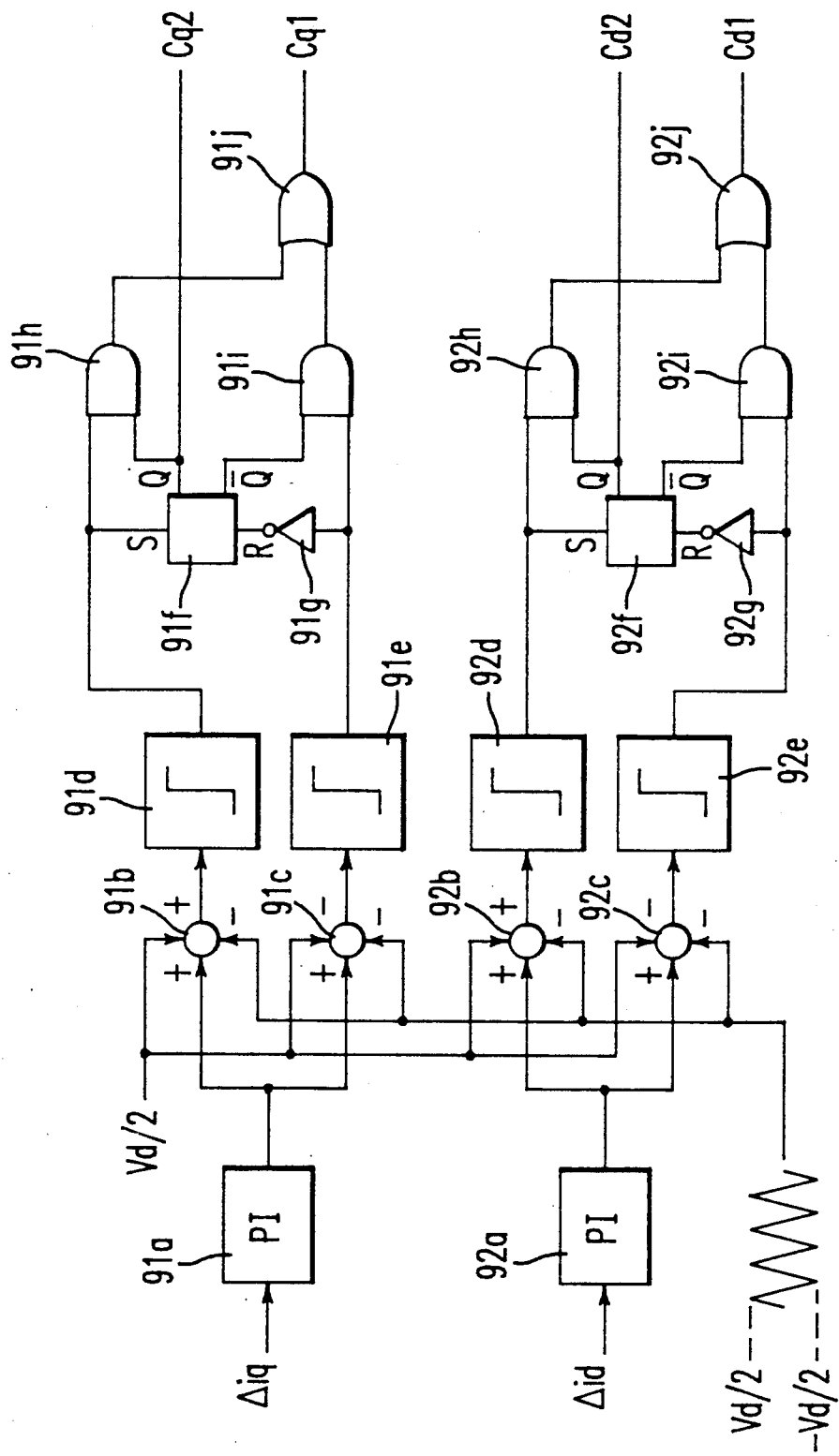
FIG. 16 is a view showing a detailed circuit arrangement according to the eighteenth embodiment.

FIG. 16 shows a detailed circuit arrangement of the torque-current control computing means 91 and the exciting-current control computing means 92.

The torque-current control computing means 91 is composed of a PI controller 91a, a pair of adder and subtracters 91b and 91c, a pair of comparators 91d and 91e, a flip-flop 91f, an inverter 91g, a pair of AND gates 91h and 91i and an OR gate 91j. These components form torque-current PWM computing means and torque-voltage polarity computing means.

The torque-current error $\Delta i_q$ is inputted to the PI controller 91a which performs the following equation to compute the torque-current control voltage command $v_q^*$:

$$v_q^* = K_{pq}\Delta i_q + K_{iq}\int \Delta i_q dt \qquad (5)$$

The torque-current control voltage command $v_q^*$, a constant $V_d/2$, and a triangular wave $e_t$ whose upper limit is $V_d/2$ and whose lower limit is $-V_d/2$ are inputted to the adder and subtracter 91b which computes and outputs $v_q^* + V_d/2 - e_t$. Subsequently, the comparator 91d compares $v_q^* + V_d/2 - e_t$ with a 0 (zero) level, to output 1 when the comparison is positive, and to output 0 (zero) when the comparison is negative. The function of the adder and subtracter 91b and the comparator 91d corresponds to comparison between the torque-current control voltage command $v_q^*$ and the negative triangular wave $e_t$ whose upper limit is 0 (zero) and whose lower limit is $V_d$. The torque-current control voltage command $v_q^*$, a constant $V_d/2$, and the triangular wave $e_t$ whose upper limit is $V_d/2$ and whose lower limit is $-V_d/2$ are inputted to the adder and subtracter 91c which computes and outputs $v_q^* - V_d/2 - e_t$. Subsequently, the comparator 91e compares $v_q^* - V_d/2 - e_t$ with the 0 (zero) level, to output 1 when the comparison is positive and to output 0 when the comparison is negative. The function of the adder and subtracter 91c and the comparator 91e corresponds to comparison between the torque-current control voltage command $v_q^*$ and the positive triangular wave $e_t$ whose upper limit is $V_d$ and whose lower limit is $-0$ (zero). An output from the comparator 91d is inputted to a set terminal S of the flip-flop 91f. A signal, in which an output from the comparator 91e is inverted by the inverter 91g, is inputted to a reset terminal R of the flip-flop 91f. The flip-flop 91f outputs a Q-output to the AND gate 91h, and a $\overline{Q}$ output to the AND gate 91i. Here, the Q-output corresponds to the polarity $C_{q2}$ of the torque-current control voltage $v_q$. The AND gate 91h computes, in an AND logic manner, the output from the comparator 91d and the Q-output from the flip-flop 91f, and outputs the computation result to the OR gate 91j. The AND gate 91i computes, in an AND logic manner, the output from the comparator 91e and the $\overline{Q}$ output from the flip-flop 91f, and outputs the computation result to the OR gate 91j. The OR gate 91j computes, in an OR logic manner, the outputs from the respective AND gates 91h and 91i, and outputs the computation result as the torque-current PWM control signal $C_{q1}$.

The exciting-current control computing means 92 is composed of a PI controller 92a, a pair of adder and subtracters 92b and 92c, a pair of comparators 92d and 92e, a flip-flop 92f, an inverter 92g, a pair of AND gates 92h and 92i, and an OR gate 92j. These components form exciting-current PWM computing means and exciting-voltage polarity computing means.

The exciting-current error $\Delta i_d$ is inputted to the PI controller 92a which performs the following PI computation to compute the exciting-current control voltage command $v_d^*$:

$$v_d^* = K_{pd}\Delta i_d + K_{id}\int \Delta i_d dt \qquad (6)$$

The exciting-current control voltage command $v_d^*$, the constant $V_d/2$ and the triangular wave $e_t$ whose upper limit is $V_d/2$ and whose lower limit is $-V_d/2$ are inputted to the adder and subtracter 92b which computes and outputs $v_d^* + V_d/2 - e_t$. Subsequently, the comparator 92d compares $v_d^* + V_d/2 - e_t$ with a 0 (zero) level, and outputs 1 when the comparison is positive and 0 when the comparison is negative. The function of the adder and subtracter 92b and the comparator 92d corresponds to comparison between the exciting-current control voltage command $v_d^*$ and the negative triangular wave $e_t$ whose upper limit is 0 (zero) and whose lower limit is $V_d$ (zero). The exciting-current control voltage command $v_d^*$, the constant $V_d/2$, and the triangular wave $e_t$ whose upper limit is $V_d/2$ and whose lower limit is $-V_d/2$ are inputted to the adder and subtracter 92c which computes and outputs $v_d^* - V_d/2 - e_t$. Subsequently, the comparator 92e compares $v_d^* - V_d/2 - e_t$ with a 0 (zero) level, and outputs 1 when the comparison is positive and 0 when the comparison is negative. The function of the adder and subtracter 92c and the comparator 92e corresponds to comparison between the exciting-current control voltage command $v_d^*$ and the positive triangular wave $e_t$ whose upper limit is $V_d$ and whose lower limit is 0 (zero). An output from the comparator 92d is inputted to a set terminal S of the flip-flop 92f. A signal, in which an output from the comparator 92e is inverted through the inverter 92g, is inputted to a reset terminal R of the flip-flop 92f. A Q-output is outputted to the AND gate 92h, and a $\overline{Q}$ output is outputted to the AND gate 92i. Here, the Q-output corresponds to the polarity $C_{d2}$ of the exciting-current control voltage $v_d$. The AND gate 92h computes, in an AND logic manner, the output from the comparator 92d and the Q-output from the flip-flop 92f. The AND-logic computation result is outputted to the OR gate 92j. The AND gate 92i computes, in an AND logic manner, the output from the comparator 92e and the $\overline{Q}$ output from the flip-flop 92f. The AND-logic computation result is outputted to the OR gate 92j. The OR gate 92j computes, in an OR logic manner, the outputs from the respective AND gates 92h and 92i. The OR-logic computation result is outputted as the exciting-current PWM control signal $C_{d1}$.

The polarity sign $i_q^*$ of the torque-current command, the torque-current PWM control signal $C_{q1}$, the polarity $C_{q2}$ of the torque-current control voltage $v_q$, the exciting-current PWM control signal $C_{d1}$ and the polarity $C_{d2}$ of the exciting-current control voltage $v_d$ are inputted to the control-phase potential computing means 95 which outputs ON/OFF signals of transistors $T_{ru+} \sim T_{rw-}$ which form the inverter 74.

The procedure for determining the potential of each phase is slightly different from the seventeenth embodiment in that the tenth embodiment and the fifteenth embodiment are not adopted or used.

That is, in the output-potential computing means, a polarity obtained by multiplication between the torque-current PWM control signal $C_{q1}$ and the polarity of the torque-current control phase is brought to a potential of the torque-current control phase. A polarity obtained by multiplication between the exciting-current PWM control signal and the polarity of the exciting-current control phase is brought to the potential of the exciting-current control phase. The polarity of the reference potential phase is brought to the potential of the reference potential phase. When the output potential of the torque-current control phase is in agreement with the potential of the reference potential phase, however, no operation is conducted in which the output potential of the exciting-current control phase is also made into agreement with the potential of the reference potential phase. In case where the potential of each phase is +, the transistor connected to the anode side of the direct-current power source of the inverter is turned on, while the transistor connected to the cathode side is turned off. Conversely, when the potential in each phase is −, the transistor connected to the anode side of the direct-current power source of the inverter is turned off, while the transistor connected to the cathode side is turned on. In this connection, as far as the case where an absolute value of the torque current is larger than ½ of an absolute value of the exciting current, when the result of multiplication between the polarity of the torque current command and the polarity of the torque-current control phase is +, the transistor connected to the cathode side of the direct-current power source of the torque-current control phase is always turned off, while, when the result of multiplication between the polarity of the torque-current command and the polarity of the torque-current control phase is −, the transistor connected to the anode side of the direct-current power source of the torque-current control phase is always turned off. In this connection, a condition that is |torque current| > |exciting current/2| is a condition in which current of the torque-current control phase flows only through the transistor on one side of the upper and lower transistors.

If the polarities of the respective torque-current control phase, torque-current control voltage, exciting-current control phase, exciting-current control voltage and reference potential phase, the torque-current PWM control signal, the exciting-current PWM control signal, and the potentials of the u-phase∼w-phase are expressed in a table, a table 6 is formed. Further, if the ON/OFF conditions of the transistors with respect to the table 6 are expressed in a table, the table 2 is formed when |torque current| > |exciting current/2|, and a table 7 is formed when |torque current| ≦ |exciting current/2|. In this connection, ON/OFF in the table 2 or the table 7 is determined by the table 3.

The transformer 89 is wholly identical with that in the embodiment of the table 2, and the detailed description of the transformer 89 will be omitted.

In the eighteenth embodiment constructed as above, when the output current of the inverter follows a desirable current command value, the torque-current command and the exciting-current command are computed. The current in each phase is detected, and the detected value is transformed. Thus, the torque current and the exciting current are obtained. The torque-current command value and the torque-current detecting value are compared with each other to obtain the torque-current error. The exciting-current command value and the exciting-current detecting value are compared with each other to obtain the exciting-current error. Subsequently, the polarity of the torque-current control voltage and the torque-current PWM control signal are obtained on the basis of the torque-current error. The polarity of the exciting-current control voltage and the exciting-current PWM control signal are obtained on the basis of the exciting-current error. Further, the torque-current control phase and the polarity of the torque-current control phase, the exciting-current control phase and the polarity of the exciting-current control phase, and the reference potential phase and the polarity of the reference potential phase are obtained on the basis of the rotational angle of the magnetic flux, the polarity of the torque-current control voltage, and the polarity of the exciting-current control voltage. The output potential of the torque-current control phase is determined on the basis of the torque-current PWM control signal and the polarity of the torque-current control phase. The output potential of the exciting-current control phase is determined on the basis of the exciting-current PWM control signal and the polarity of the exciting-current control phase. The output potential of the reference potential phase is determined on the basis of the polarity of the reference potential phase.

In this manner, in the eighteenth embodiment, the output potential of the torque-current control phase is controlled on the basis of the torque-current error. The output potential of the exciting-current control phase is controlled on the basis of the exciting-current error. The output potential of the remaining reference potential phase is fixed to any potentials on the basis of the polarity of the reference potential phase.

Accordingly, the number of the phases PWM-controlled is brought to two phases, and is in agreement with the number of independent variables. Thus, no interference occurs between the phase and the phase. Further, since the torque current and the exciting current are controlled independently of each other, no interference occurs also between the torque current and the exciting current.

As a result, an improvement in the current control accuracy and control high in rapid response ability are made possible.

Further, the torque-current control phase and the polarity of the torque-current control phase, the exciting-current control phase and the polarity of the exciting-current control phase, and the reference potential phase and the polarity of the reference potential phase are obtained on the basis of the rotational angle of the magnetic flux, the polarity of the torque-current control voltage and the polarity of the exciting-current control voltage. Accordingly, it is possible to determine an optimum output potential continuously even under any conditions regardless of four phenomenon operations, that is, normal/reverse of the rotational direction and powering/regeneration of the load condition.

In the torque-current control computing means, the torque-current error is computed in a proportional and integral (P−I) control manner. The computation result of the proportional and integral control computation is compared with the positive triangular wave whose minimum value is zero and with the negative triangular wave whose maximum value is zero. In case where the result of the proportional and integral control computation is larger than the positive triangular wave, the polarity of the torque-current control voltage is brought to a positive one, while, in case where the result of the proportional and integral control computation is smaller than the negative triangular wave, the polarity of the torque-current control voltage is brought to a negative one. In case where the result of the proportional and integral control computation is equal to or smaller than the positive triangular wave and equal to or larger than the negative triangular wave, the polarity of the torque-current control voltage is maintained at its polarity until now. Further, when the polarity of the torque-current control voltage is positive, the comparison result between the result of the proportional and integral control computation and the positive triangular wave is brought to the torque-current PWM control signal. When the polarity of the torque-current control voltage is negative, the comparison result between the result of the proportional and integral control computation and the negative triangular wave is brought to the torque-current PWM control signal.

As described above, in the eighteenth embodiment, the torque-current PWM control signal is obtained on the basis of the comparison result between the result of the proportional and integral control computation and the triangular wave. Accordingly, the switching frequency of the torque-current PWM control is in agreement with the frequency of the triangular wave. Thus, control or management of the switching frequency of the inverter can be made easy. If setting is made to an upper-limit frequency of the transistor which forms the inverter, it is possible to always secure the control accuracy of a limit obtained by that system.

Moreover, since the proportional and integral control computation of the torque-current error have an effect of filtering, there is also provided such an advantage that the proportional and integral control computation are strong for noises.

In the exciting-current control computing means, the exciting-current error is computed in a proportional and integral (P−I) control manner. The result of the proportional and integral control computation is compared with the positive triangular wave whose minimum value is zero, and with the negative triangular wave whose maximum value is zero. In case where the result of the proportional and integral control computation is larger than the positive triangular wave, the polarity of the exciting-current control voltage is brought to a positive one, while, in case where the result of the proportional and integral control computation is smaller than the negative triangular wave, the polarity of the exciting-current control voltage is brought to a negative one. In case where the result of the proportional and integral control computation is equal to or smaller than the positive triangular wave, and equal to or larger than the negative triangular wave, the polarity of the exciting-current control voltage is maintained at one until now. Further, when the polarity of the exciting-current control voltage is positive, the comparison result between the result of the proportional and integral control computation and the positive triangular wave is brought to the exciting-current PWM control signal. When the polarity of the exciting-current control voltage is negative, the comparison result between the result of the proportional and integral control computation and the negative triangular wave is brought to the exciting-current PWM control signal.

As described above, in the eighteenth embodiment, the exciting-current PWM control signal is obtained on the basis of the comparison result between the result of the proportional and integral control computation and the triangular wave. Accordingly, a switching frequency of the exciting-current PWM control is in agreement with a frequency of the triangular wave. Accordingly, control or management of the switching frequency of the inverter can be made easy. If setting is made to an upper-limit frequency of the transistor which forms the inverter, it is possible to always secure the control accuracy of a limit which is obtained in that system.

Moreover, since the proportional and integral control computation of the exciting-current error have an effect of filtering, there is also provided such an advantage that the proportional and integral control computation are strong for noises.

In the control-phase potential computing means, the control computing means and a part of the output-potential control means are formed by the look-up table. Accordingly, the control-phase potential computation can be made simple and easy extremely, and it is realized that a control circuit can be made compact and can be reduced in cost.

Furthermore, in the control-phase potential computing means, of the upper and lower transistors of the torque-current control phase, the transistor on one side, through which current must not flow, is always fixed to an OFF condition. Accordingly, a danger of arm short circuit occurring due to operational delay of the upper and lower transistors is eliminated so that the necessity of provision of dead time is dispensed with. As a result, the control accuracy and the response ability are improved. Further, an electric power for driving the transistors can be reduced to half.

Moreover, in the control-phase potential computing means, of a transistor on the anode side of each phase and a transistor on the cathode side, dead time is provided for one of the transistors for a predetermined period of time after a change of the other transistor from turning-on to turning-off. In case where the other transistor is maintained at an OFF condition for a period of time equal to or more than the dead time, the dead time is not provided for the one transistor.

As described above, of the upper and lower transistors of a single arm of the inverter, in case where one of the transistors is maintained at the OFF condition for a period of time equal to or more than the dead time, the dead time is not provided for the other transistor. Accordingly, control having no dead time is made possible. As a result, the control accuracy and the response ability are improved. Furthermore, if the OFF condition equal to or more than the dead time is not secured, dead time is provided for one of the transistors for a predetermined period of time after a change from turning-on to turning-off. Thus, safety or security can always be secured.

Further, in the magnetic-flux rotational-angle detecting means, an exciting-current rotational angle of the vector control in the induction motor is brought to a magnetic-flux rotational angle.

In this manner, the current control system for the inverter, according to the invention, can be applied to a motor, in which the magnetic-flux rotational angle is not determined on the basis of the rotational angle of a rotor, or to a motor, in which it is impossible to detect the magnetic-flux rotational angle, for example, to a linear motor.

In connection with the above, in each of the embodiments, the circuitry comprises the analog circuit and the logic circuit. However, the circuitry may be formed using a microcomputer.

The inverter may also be formed using an FET and a SIT, other than the transistors.

Moreover, the q-axis and the d-axis defined in this invention are introduced for description of a principle of the invention. There may be a way of other selection of axes. For instance, in case where the q-axis is selected in a direction retarded 90 degrees with respect to the phase angle of the magnetic flux, the invention can be realized by inversion of all of the polarities regarding the q-axis current control phase.

Furthermore, in the embodiments, it has been described that the phase angle of the q-axis with respect to the d-axis is advanced 90 degrees in an electric motor in which the magnetic flux is distributed in a sine-wave manner. The invention should not be limited to this. That is, it is possible to optionally select the q-axis, the d-axis and an angle defined therebetween, in accordance with a distribution condition of the magnetic flux. Further, the winding is assumed to one distributed in a sine-wave manner. In other cases, however, a transformation equation for obtaining $i_q$ and $i_d$ is changed or altered to compute torque current in proportion to the actual torque, whereby it is possible to realize control having no torque ripple.

Moreover, the first through fifteenth embodiments may also be combined in the way other than those which have been described with reference to the sixteenth through eighteenth embodiments.

TABLE 1

| PHASE ANGLE OF MAGNETIC FLUX (DEG) | TORQUE CURRENT CONTROL PHASE | POLARITY OF TORQUE CURRENT CONTROL PHASE | REFERENCE POTENTIAL PHASE | POLARITY OF TORQUE CURRENT CONTROL VOLTAGE | POLARITY OF REFERENCE POTENTIAL PHASE | TORQUE CURRENT PWM CONTROL SIGNAL | POTENTIAL OF u-PHASE | POTENTIAL OF v-PHASE | POTENTIAL OF w-PHASE |
|---|---|---|---|---|---|---|---|---|---|
| 0~60 | v | 1 | u, w | 1 | −1 | 1 | −1 | 1 | −1 |
|  |  |  |  |  |  | −1 | −1 | −1 | −1 |
|  |  |  |  | −1 | 1 | 1 | 1 | 1 | 1 |
|  |  |  |  |  |  | −1 | 1 | −1 | 1 |
| 60~120 | u | −1 | v, w | 1 | 1 | 1 | −1 | 1 | 1 |
|  |  |  |  |  |  | −1 | 1 | 1 | 1 |
|  |  |  |  | −1 | −1 | 1 | −1 | −1 | −1 |
|  |  |  |  |  |  | −1 | 1 | −1 | −1 |
| 120~180 | w | 1 | u, v | 1 | −1 | 1 | −1 | −1 | 1 |
|  |  |  |  |  |  | −1 | −1 | −1 | −1 |

TABLE 1-continued

| PHASE ANGLE OF MAGNETIC FLUX (DEG) | TORQUE CURRENT CONTROL PHASE | POLARITY OF TORQUE CURRENT CONTROL PHASE | REFERENCE POTENTIAL PHASE | POLARITY OF TORQUE CURRENT CONTROL VOLTAGE | POLARITY OF REFERENCE POTENTIAL PHASE | TORQUE CURRENT PWM CONTROL SIGNAL | POTENTIAL OF u-PHASE | POTENTIAL OF v-PHASE | POTENTIAL OF w-PHASE |
|---|---|---|---|---|---|---|---|---|---|
| | | | | −1 | 1 | 1 | 1 | 1 | 1 |
| | | | | | | −1 | 1 | 1 | −1 |
| 180~240 | v | −1 | u, w | 1 | 1 | 1 | 1 | −1 | 1 |
| | | | | | | −1 | 1 | 1 | 1 |
| | | | | −1 | −1 | 1 | −1 | −1 | −1 |
| | | | | | | −1 | −1 | 1 | −1 |
| 240~300 | u | 1 | v, w | 1 | −1 | 1 | 1 | −1 | −1 |
| | | | | | | −1 | −1 | −1 | −1 |
| | | | | −1 | 1 | 1 | 1 | 1 | 1 |
| | | | | | | −1 | −1 | 1 | 1 |
| 300~360 | w | −1 | u, v | 1 | 1 | 1 | 1 | 1 | −1 |
| | | | | | | −1 | 1 | 1 | 1 |
| | | | | −1 | −1 | 1 | −1 | −1 | −1 |
| | | | | | | −1 | −1 | −1 | 1 |

TABLE 2

| PHASE ANGLE OF MAGNETIC FLUX (DEG) | POLARITY OF TORQUE-CURRENT COMMAND (sign $i_q^*$) | TRANSISTOR $T_{ru+}$ | TRANSISTOR $T_{ru-}$ | TRANSISTOR $T_{rv+}$ | TRANSISTOR $T_{rv-}$ | TRANSISTOR $T_{rw-}$ | TRANSISTOR $T_{rw+}$ |
|---|---|---|---|---|---|---|---|
| 0~60 | + | ON/OFF | ON/OFF | ON/OFF | OFF | ON/OFF | ON/OFF |
| | − | ON/OFF | ON/OFF | OFF | ON/OFF | ON/OFF | ON/OFF |
| 60~120 | + | OFF | ON/OFF | ON/OFF | ON/OFF | ON/OFF | ON/OFF |
| | − | ON/OFF | OFF | ON/OFF | ON/OFF | ON/OFF | ON/OFF |
| 120~180 | + | ON/OFF | ON/OFF | ON/OFF | ON/OFF | ON/OFF | OFF |
| | − | ON/OFF | ON/OFF | ON/OFF | ON/OFF | OFF | ON/OFF |
| 180~240 | + | ON/OFF | ON/OFF | OFF | ON/OFF | ON/OFF | ON/OFF |
| | − | ON/OFF | ON/OFF | ON/OFF | OFF | ON/OFF | ON/OFF |
| 240~300 | + | ON/OFF | OFF | ON/OFF | ON/OFF | ON/OFF | ON/OFF |
| | − | OFF | ON/OFF | ON/OFF | ON/OFF | ON/OFF | ON/OFF |
| 300~360 | + | ON/OFF | ON/OFF | ON/OFF | ON/OFF | OFF | ON/OFF |
| | − | ON/OFF | ON/OFF | ON/OFF | ON/OFF | ON/OFF | OFF |

In connection with the above, ON/OFF is determined on the basis of the table 3, and "OFF" is always "OFF".

TABLE 3

| POTENTIAL OF u-PHASE | POTENTIAL OF v-PHASE | POTENTIAL OF w-PHASE | TRANSISTOR $T_{ru+}$ | $T_{ru-}$ | $T_{rv+}$ | $T_{rv-}$ | $T_{rw+}$ | $T_{rw-}$ |
|---|---|---|---|---|---|---|---|---|
| 1 | x | x | ON | OFF | — | — | — | — |
| −1 | x | x | OFF | ON | — | — | — | — |
| x | 1 | x | — | — | ON | OFF | — | — |
| x | −1 | x | — | — | OFF | ON | — | — |
| x | x | 1 | — | — | — | — | ON | OFF |
| x | x | −1 | — | — | — | — | OFF | ON | x: either desirable
—: indefiniteness

TABLE 4

| PHASE ANGLE OF MAGNETIC FLUX (DEG) | TORQUE-CURRENT CONTROL PHASE | POLARITY OF TORQUE-CURRENT CONTROL PHASE | POLARITY OF TORQUE-CURRENT CONTROL VOLTAGE | POLARITY OF EXCITING CURRENT CONTROL VOLTAGE | EXCITING CURRENT CONTROL PHASE | POLARITY OF EXCITING CURRENT CONTROL PHASE | REFERENCE POTENTIAL PHASE |
|---|---|---|---|---|---|---|---|
| 0~60 | v | 1 | 1 | 1 | u | 1 | w |
| | | | 1 | −1 | w | −1 | u |
| | | | −1 | 1 | w | −1 | u |
| | | | −1 | −1 | u | 1 | w |
| 60~120 | u | −1 | 1 | 1 | w | −1 | v |
| | | | 1 | −1 | v | 1 | w |
| | | | −1 | 1 | v | 1 | w |
| | | | −1 | −1 | w | −1 | v |
| 120~180 | w | 1 | 1 | 1 | v | 1 | u |
| | | | 1 | −1 | u | −1 | v |
| | | | −1 | 1 | u | −1 | v |
| | | | −1 | −1 | v | 1 | u |
| 180~240 | v | −1 | 1 | 1 | u | −1 | w |
| | | | 1 | −1 | w | 1 | u |

TABLE 4-continued

| | | | −1 | 1 | w | 1 | u |
|---|---|---|---|---|---|---|---|
| | | | −1 | −1 | u | −1 | w |
| 240~300 | u | 1 | 1 | 1 | w | 1 | v |
| | | | 1 | −1 | v | −1 | w |
| | | | −1 | 1 | v | −1 | w |
| | | | −1 | −1 | w | 1 | v |
| 300~360 | w | −1 | 1 | 1 | v | −1 | u |
| | | | 1 | −1 | u | 1 | v |
| | | | −1 | 1 | u | 1 | v |
| | | | −1 | −1 | v | −1 | u |

| PHASE ANGLE OF MAGNETIC FLUX (DEG) | POLARITY OF REFERENCE POTENTIAL PHASE | TORQUE CURRENT PWM CONTROL SIGNAL | EXCITING CURRENT PWM CONTROL SIGNAL | POTENTIAL OF u-PHASE | POTENTIAL OF v-PHASE | POTENTIAL OF w-PHASE |
|---|---|---|---|---|---|---|
| 0~60 | −1 | 1 | 1 | 1 | 1 | −1 |
| | | 1 | −1 | −1 | 1 | −1 |
| | | −1 | 1 | −1 | −1 | −1 |
| | | −1 | −1 | −1 | −1 | −1 |
| | −1 | 1 | 1 | −1 | 1 | −1 |
| | | 1 | −1 | −1 | 1 | 1 |
| | | −1 | 1 | −1 | −1 | −1 |
| | | −1 | −1 | −1 | −1 | −1 |
| | 1 | 1 | 1 | 1 | 1 | 1 |
| | | 1 | −1 | 1 | 1 | 1 |
| | | −1 | 1 | 1 | −1 | −1 |
| | | −1 | −1 | 1 | −1 | 1 |
| | 1 | 1 | 1 | 1 | 1 | 1 |
| | | 1 | −1 | 1 | 1 | 1 |
| | | −1 | 1 | 1 | −1 | 1 |
| | | −1 | −1 | −1 | −1 | 1 |
| 60~120 | 1 | 1 | 1 | −1 | 1 | −1 |
| | | 1 | −1 | −1 | 1 | 1 |
| | | −1 | 1 | 1 | 1 | 1 |
| | | −1 | −1 | 1 | 1 | 1 |
| | 1 | 1 | 1 | 1 | 1 | 1 |
| | | 1 | −1 | −1 | 1 | 1 |
| | | −1 | 1 | 1 | 1 | 1 |
| | | −1 | −1 | 1 | 1 | 1 |
| | −1 | 1 | 1 | −1 | −1 | −1 |
| | | 1 | −1 | −1 | −1 | −1 |
| | | −1 | 1 | 1 | 1 | −1 |
| | | −1 | −1 | 1 | −1 | −1 |
| | −1 | 1 | 1 | −1 | −1 | −1 |
| | | 1 | −1 | −1 | −1 | −1 |
| | | −1 | 1 | 1 | −1 | −1 |
| | | −1 | −1 | 1 | −1 | 1 |
| 120~180 | −1 | 1 | 1 | −1 | 1 | 1 |
| | | 1 | −1 | −1 | −1 | 1 |
| | | −1 | 1 | −1 | −1 | −1 |
| | | −1 | −1 | −1 | −1 | −1 |
| | −1 | 1 | 1 | −1 | −1 | 1 |
| | | 1 | −1 | 1 | −1 | 1 |
| | | −1 | 1 | −1 | −1 | −1 |
| | | −1 | −1 | −1 | −1 | −1 |
| | 1 | 1 | 1 | 1 | 1 | 1 |
| | | 1 | −1 | 1 | 1 | 1 |
| | | −1 | 1 | −1 | 1 | −1 |
| | | −1 | −1 | −1 | 1 | −1 |
| | 1 | 1 | 1 | 1 | 1 | 1 |
| | | 1 | −1 | 1 | 1 | 1 |
| | | −1 | 1 | 1 | 1 | −1 |
| | | −1 | −1 | 1 | −1 | −1 |
| 180~240 | 1 | 1 | 1 | −1 | −1 | 1 |
| | | 1 | −1 | −1 | −1 | 1 |
| | | −1 | 1 | 1 | 1 | 1 |
| | | −1 | −1 | 1 | 1 | 1 |
| | 1 | 1 | 1 | 1 | −1 | 1 |
| | | 1 | −1 | 1 | −1 | 1 |
| | | −1 | 1 | 1 | 1 | 1 |
| | | −1 | −1 | 1 | 1 | 1 |
| | −1 | 1 | 1 | −1 | −1 | −1 |
| | | 1 | −1 | −1 | −1 | −1 |
| | | −1 | 1 | −1 | 1 | 1 |
| | | −1 | −1 | −1 | 1 | −1 |
| | −1 | 1 | 1 | −1 | −1 | −1 |
| | | 1 | −1 | −1 | −1 | −1 |
| | | −1 | 1 | −1 | 1 | −1 |
| | | −1 | −1 | 1 | 1 | −1 |
| 240~300 | −1 | 1 | 1 | 1 | −1 | 1 |
| | | 1 | −1 | 1 | −1 | −1 |

TABLE 4-continued

|   |   |    |    |    |    |    |
|---|---|----|----|----|----|----|
|   |   | −1 |  1 | −1 | −1 | −1 |
|   |   | −1 | −1 | −1 | −1 | −1 |
|   | −1 |  1 |  1 |  1 | −1 | −1 |
|   |   |  1 | −1 |  1 |  1 | −1 |
|   |   | −1 |  1 | −1 | −1 | −1 |
|   |   | −1 | −1 | −1 | −1 | −1 |
|   |  1 |  1 |  1 |  1 |  1 |  1 |
|   |   |  1 | −1 |  1 |  1 |  1 |
|   |   | −1 |  1 | −1 | −1 |  1 |
|   |   | −1 | −1 | −1 |  1 |  1 |
|   |  1 |  1 |  1 |  1 |  1 |  1 |
|   |   |  1 | −1 |  1 |  1 |  1 |
|   |   | −1 |  1 | −1 |  1 |  1 |
|   |   | −1 | −1 | −1 |  1 |  1 |
| 300~360 | 1 | 1 | 1 | 1 | −1 | −1 |
|   |   |  1 | −1 |  1 | −1 | −1 |
|   |   | −1 |  1 |  1 |  1 |  1 |
|   |   | −1 | −1 |  1 |  1 |  1 |
|   |  1 |  1 |  1 |  1 | −1 | −1 |
|   |   |  1 | −1 |  1 | −1 | −1 |
|   |   | −1 |  1 |  1 |  1 |  1 |
|   |   | −1 | −1 |  1 |  1 |  1 |
|   | −1 |  1 |  1 | −1 | −1 | −1 |
|   |   |  1 | −1 | −1 | −1 | −1 |
|   |   | −1 |  1 |  1 | −1 |  1 |
|   |   | −1 | −1 | −1 | −1 |  1 |
|   | −1 |  1 |  1 | −1 | −1 | −1 |
|   |   |  1 | −1 | −1 | −1 | −1 |
|   |   | −1 |  1 | −1 | −1 |  1 |
|   |   | −1 | −1 | −1 |  1 |  1 |

TABLE 5

| PHASE ANGLE OF MAGNETIC FLUX (DEG) | POLARITY OF TORQUE-CURRENT COMMAND (sign $i_q^*$) | TRANSISTOR $T_{ru+}$ | TRANSISTOR $T_{ru-}$ | TRANSISTOR $T_{rv+}$ | TRANSISTOR $T_{rv-}$ | TRANSISTOR $T_{rw-}$ | TRANSISTOR $T_{rw+}$ |
|---|---|---|---|---|---|---|---|
| 0~60 | + | OFF | ON/OFF | ON/OFF | OFF | OFF | ON/OFF |
|      | − | ON/OFF | OFF | OFF | ON/OFF | ON/OFF | OFF |
| 60~120 | + | OFF | ON/OFF | ON/OFF | OFF | ON/OFF | OFF |
|        | − | ON/OFF | OFF | OFF | ON/OFF | OFF | ON/OFF |
| 120~180 | + | OFF | ON/OFF | OFF | ON/OFF | ON/OFF | OFF |
|         | − | ON/OFF | OFF | ON/OFF | OFF | OFF | ON/OFF |
| 180~240 | + | ON/OFF | OFF | OFF | ON/OFF | ON/OFF | OFF |
|         | − | OFF | ON/OFF | ON/OFF | OFF | OFF | ON/OFF |
| 240~300 | + | ON/OFF | OFF | OFF | ON/OFF | OFF | ON/OFF |
|         | − | OFF | ON/OFF | ON/OFF | OFF | ON/OFF | OFF |
| 300~360 | + | ON/OFF | OFF | ON/OFF | OFF | OFF | ON/OFF |
|         | − | OFF | ON/OFF | OFF | ON/OFF | ON/OFF | OFF |

In connection with the above, ON/OFF is determined on the basis of the table 3, and "OFF" is always "OFF".

TABLE 6

| PHASE ANGLE OF MAGNETIC FLUX (DEG) | TORQUE-CURRENT CONTROL PHASE | POLARITY OF TORQUE-CURRENT CONTROL PHASE | POLARITY OF TORQUE-CURRENT CONTROL VOLTAGE | POLARITY OF EXCITING CURRENT CONTROL VOLTAGE | EXCITING CURRENT CONTROL PHASE | POLARITY OF EXCITING CURRENT CONTROL PHASE | REFERENCE POTENTIAL PHASE |
|---|---|---|---|---|---|---|---|
| 0~60 | v | 1 | 1 | 1 | u | 1 | w |
|      |   |   | 1 | −1 | w | −1 | u |
|      |   |   | −1 | 1 | w | −1 | u |
|      |   |   | −1 | −1 | u | 1 | w |
| 60~120 | u | −1 | 1 | 1 | w | −1 | v |
|        |   |   | 1 | −1 | v | 1 | w |
|        |   |   | −1 | 1 | v | 1 | w |
|        |   |   | −1 | −1 | w | −1 | v |
| 120~180 | w | 1 | 1 | 1 | v | 1 | u |
|         |   |   | 1 | −1 | u | −1 | v |
|         |   |   | −1 | 1 | u | −1 | v |
|         |   |   | −1 | −1 | v | 1 | u |
| 180~240 | v | −1 | 1 | 1 | u | −1 | w |
|         |   |   | 1 | −1 | w | 1 | u |
|         |   |   | −1 | 1 | w | 1 | u |
|         |   |   | −1 | −1 | u | −1 | w |
| 240~300 | u | 1 | 1 | 1 | w | 1 | v |
|         |   |   | 1 | −1 | v | −1 | w |
|         |   |   | −1 | 1 | v | −1 | w |

TABLE 6-continued

| | | | | | | |
|---|---|---|---|---|---|---|
| 300~360 | w | −1 | −1 | −1 | w | 1 | v |
| | | | 1 | 1 | v | −1 | u |
| | | | 1 | −1 | u | 1 | v |
| | | | −1 | 1 | u | 1 | v |
| | | | −1 | −1 | v | −1 | u |

| PHASE ANGLE OF MAGNETIC FLUX (DEG) | POLARITY OF REFERENCE POTENTIAL PHASE | TORQUE CURRENT PWM CONTROL SIGNAL | EXCITING CURRENT PWM CONTROL SIGNAL | POTENTIAL OF u-PHASE | POTENTIAL OF v-PHASE | POTENTIAL OF w-PHASE |
|---|---|---|---|---|---|---|
| 0~60 | −1 | 1 | 1 | 1 | 1 | −1 |
| | | 1 | −1 | −1 | 1 | −1 |
| | | −1 | 1 | 1 | −1 | −1 |
| | | −1 | −1 | −1 | −1 | −1 |
| | −1 | 1 | 1 | −1 | 1 | −1 |
| | | 1 | −1 | −1 | 1 | 1 |
| | | −1 | 1 | −1 | −1 | −1 |
| | | −1 | −1 | −1 | −1 | 1 |
| | 1 | 1 | 1 | 1 | 1 | −1 |
| | | 1 | −1 | 1 | 1 | 1 |
| | | −1 | 1 | 1 | −1 | −1 |
| | | −1 | −1 | 1 | −1 | 1 |
| | 1 | 1 | 1 | 1 | 1 | 1 |
| | | 1 | −1 | −1 | 1 | 1 |
| | | −1 | 1 | 1 | −1 | 1 |
| | | −1 | −1 | −1 | −1 | 1 |
| 60~120 | 1 | 1 | 1 | −1 | 1 | −1 |
| | | 1 | −1 | −1 | 1 | 1 |
| | | −1 | 1 | 1 | 1 | −1 |
| | | −1 | −1 | 1 | 1 | 1 |
| | 1 | 1 | 1 | −1 | 1 | 1 |
| | | 1 | −1 | −1 | −1 | 1 |
| | | −1 | 1 | 1 | 1 | 1 |
| | | −1 | −1 | 1 | −1 | 1 |
| | −1 | 1 | 1 | −1 | 1 | −1 |
| | | 1 | −1 | −1 | −1 | −1 |
| | | −1 | 1 | 1 | 1 | −1 |
| | | −1 | −1 | 1 | −1 | −1 |
| | −1 | 1 | 1 | −1 | −1 | −1 |
| | | 1 | −1 | −1 | −1 | −1 |
| | | −1 | 1 | 1 | −1 | −1 |
| | | −1 | −1 | 1 | −1 | −1 |
| 120~180 | −1 | 1 | 1 | −1 | 1 | 1 |
| | | 1 | −1 | −1 | −1 | 1 |
| | | −1 | 1 | −1 | 1 | −1 |
| | | −1 | −1 | −1 | −1 | −1 |
| | −1 | 1 | 1 | −1 | 1 | −1 |
| | | 1 | −1 | −1 | 1 | 1 |
| | | −1 | 1 | −1 | −1 | −1 |
| | | −1 | −1 | −1 | −1 | −1 |
| | 1 | 1 | 1 | −1 | 1 | 1 |
| | | 1 | −1 | 1 | 1 | 1 |
| | | −1 | 1 | −1 | −1 | −1 |
| | | −1 | −1 | 1 | −1 | −1 |
| | 1 | 1 | 1 | 1 | 1 | −1 |
| | | 1 | −1 | 1 | 1 | −1 |
| 180~240 | 1 | 1 | −1 | −1 | −1 | −1 |
| | | 1 | −1 | 1 | −1 | 1 |
| | | −1 | 1 | −1 | 1 | 1 |
| | | −1 | −1 | −1 | 1 | 1 |
| | 1 | 1 | 1 | 1 | −1 | 1 |
| | | 1 | −1 | 1 | −1 | −1 |
| | | −1 | 1 | 1 | 1 | 1 |
| | | −1 | −1 | 1 | 1 | −1 |
| | −1 | 1 | 1 | −1 | −1 | 1 |
| | | 1 | −1 | −1 | −1 | 1 |
| | | −1 | 1 | −1 | 1 | 1 |
| | | −1 | −1 | −1 | 1 | −1 |
| | −1 | 1 | 1 | −1 | −1 | −1 |
| | | 1 | −1 | −1 | −1 | −1 |
| | | −1 | 1 | −1 | 1 | −1 |
| | | −1 | −1 | −1 | 1 | −1 |
| 240~300 | −1 | 1 | 1 | 1 | −1 | 1 |
| | | 1 | −1 | 1 | −1 | −1 |
| | | −1 | 1 | −1 | −1 | −1 |
| | | −1 | −1 | −1 | −1 | −1 |
| | −1 | 1 | 1 | 1 | −1 | −1 |
| | | 1 | −1 | 1 | −1 | −1 |
| | | −1 | 1 | −1 | −1 | −1 |

TABLE 6-continued

| Phase | | | | | | |
|---|---|---|---|---|---|---|
| | | -1 | -1 | -1 | 1 | -1 |
| | 1 | 1 | 1 | 1 | -1 | 1 |
| | | 1 | -1 | 1 | 1 | 1 |
| | | -1 | 1 | -1 | -1 | 1 |
| | | -1 | -1 | -1 | 1 | 1 |
| | 1 | 1 | 1 | 1 | 1 | 1 |
| | | 1 | -1 | 1 | 1 | -1 |
| | | -1 | 1 | -1 | 1 | 1 |
| | | -1 | -1 | -1 | 1 | -1 |
| 300~360 | 1 | 1 | 1 | 1 | -1 | -1 |
| | | 1 | -1 | 1 | 1 | -1 |
| | | -1 | 1 | 1 | -1 | 1 |
| | | -1 | -1 | 1 | 1 | 1 |
| | 1 | 1 | 1 | 1 | 1 | -1 |
| | | 1 | -1 | -1 | 1 | -1 |
| | | -1 | 1 | 1 | 1 | 1 |
| | | -1 | -1 | -1 | 1 | 1 |
| | -1 | 1 | 1 | 1 | -1 | -1 |
| | | 1 | -1 | -1 | -1 | -1 |
| | | -1 | 1 | 1 | -1 | 1 |
| | | -1 | -1 | -1 | -1 | 1 |
| | -1 | 1 | 1 | -1 | -1 | -1 |
| | | 1 | -1 | -1 | 1 | -1 |
| | | -1 | 1 | -1 | -1 | 1 |
| | | -1 | -1 | -1 | 1 | 1 |

TABLE 7

| PHASE ANGLE OF MAGNETIC FLUX (DEG) | POLARITY OF TORQUE-CURRENT COMMAND (sign $i_q^*$) | TRANSISTOR $T_{ru+}$ | TRANSISTOR $T_{ru-}$ | TRANSISTOR $T_{rv+}$ | TRANSISTOR $T_{rv-}$ | TRANSISTOR $T_{rw-}$ | TRANSISTOR $T_{rw+}$ |
|---|---|---|---|---|---|---|---|
| 0~60 | + | ON/OFF | ON/OFF | ON/OFF | ON/OFF | ON/OFF | ON/OFF |
| | − | ON/OFF | ON/OFF | ON/OFF | ON/OFF | ON/OFF | ON/OFF |
| 60~120 | + | ON/OFF | ON/OFF | ON/OFF | ON/OFF | ON/OFF | ON/OFF |
| | − | ON/OFF | ON/OFF | ON/OFF | ON/OFF | ON/OFF | ON/OFF |
| 120~180 | + | ON/OFF | ON/OFF | ON/OFF | ON/OFF | ON/OFF | ON/OFF |
| | − | ON/OFF | ON/OFF | ON/OFF | ON/OFF | ON/OFF | ON/OFF |
| 180~240 | + | ON/OFF | ON/OFF | ON/OFF | ON/OFF | ON/OFF | ON/OFF |
| | − | ON/OFF | ON/OFF | ON/OFF | ON/OFF | ON/OFF | ON/OFF |
| 240~300 | + | ON/OFF | ON/OFF | ON/OFF | ON/OFF | ON/OFF | ON/OFF |
| | − | ON/OFF | ON/OFF | ON/OFF | ON/OFF | ON/OFF | ON/OFF |
| 300~360 | + | ON/OFF | ON/OFF | ON/OFF | ON/OFF | ON/OFF | ON/OFF |
| | − | ON/OFF | ON/OFF | ON/OFF | ON/OFF | ON/OFF | ON/OFF |

In connection with the above, ON/OFF is determined on the basis of the table 3, and "OFF" is always "OFF".

What is claimed is:

1. A current control system for an inverter having a plurality of series circuits formed by series-connecting electric valves each formed by connecting a semiconductor device and a diode in an inverted parallel relation to each other, each of said series circuits having both its ends connected respectively to a positive side and a negative side of a direct-current power source, wherein an inductive load is connected to the series connecting point of said electric valves, and current flowing through said inductive load is controlled in a pulse-width-modulation manner, said current control system comprising:

current-command computing means for computing a q-axis current command in accordance with an operational command with respect to the load;

current detecting means for detecting an actual q-axis current flowing through the load;

q-axis-current error computing means for computing a q-axis current error which is a difference between said q-axis current command and said q-axis-current detecting value;

q-axis-current control computing means for performing pulse-width-modulation control computation of the q-axis current on the basis of said q-axis current error;

magnetic-flux phase-angle detecting means for detecting or computing a phase angle of a magnetic flux; and control-phase potential computing means for determining a q-axis-current control phase and a reference potential phase on the basis of a computation result of said q-axis-current control computing means and a magnetic-flux rotational angle, to control a potential in each phase, wherein, in connection with the above, a direction, in which the phase angle is different by a predetermined reference angle from the magnetic flux occurring in the load, is defined as the q-axis, and a current component in the q-axis direction is defined as the q-axis current.

2. A current control system for an inverter having a plurality of series circuits formed by series-connecting electric valves each formed by connecting a semiconductor device and a diode in an inverted parallel relation to each other, each of said series circuits having both its ends connected respectively to a positive side and a negative side of a direct-current power source, wherein an inductive load is connected to the series connecting point of said electric valves, and current flowing through said inductive load is controlled in a pulse-width-modulation manner, said current control system comprising:
- current-command computing means for computing a q-axis current command and a d-axis current command in accordance with an operational command with respect to the load;
- current detecting means for detecting an actual q-axis current and an actual d-axis current which flow through the load;
- q-axis-current error computing means for computing a q-axis current error which is a difference between said q-axis-current command and said q-axis-current detecting value;
- d-axis-current error computing means for computing a d-axis current error which is a difference between said d-axis-current command and said d-axis-current detecting value;
- q-axis-current control computing means for performing pulse-width-modulation control computation of the q-axis current on the basis of said q-axis current error:
- d-axis-current control computing means for performing pulse-width-modulation control computation of d-axis current on the basis of said d-axis current error:
- magnetic-flux phase-angle detecting means for detecting or computing a phase angle of a magnetic flux; and
- control-phase potential computing means for determining a q-axis-current control phase, a d-axis-current control phase and a reference potential phase on the basis of a computation result of said q-axis-current control computing means, a computation result of said d-axis-current control computing means and a magnetic-flux phase angle, to control a potential in each phase, wherein, in connection with the above, a direction, in which the phase angle is different by a predetermined reference angle from the magnetic flux occurring in the load, is defined as the q-axis, and a current component in the q-axis direction is defined as the q-axis current, and wherein a direction of the magnetic flux occurring in said load is defined as a d-axis, and a current component in the d-axis direction is defined as the d-axis current.

3. The current control system for the inverter, according to claim 1, wherein,
said q-axis-current control computing means comprises q-axis-voltage polarity computing means for computing a polarity of q-axis-current control voltage on the basis of said q-axis current error, and q-axis-current pulse-width-modulation computing means for computing a pulse-width-modulation control signal of the q-axis current on the basis of said q-axis current error, and
said control-phase potential computing means comprises control-phase computing means for computing the q-axis-current control phase, a polarity of the q-axis-current control phase, the reference potential phase and a polarity of the reference potential phase, on the basis of the polarity of the q-axis-current control voltage and the magnetic-flux phase angle, and output-potential control means for controlling a potential of the q-axis-current control phase on the basis of the q-axis-current pulse-width-modulation control signal and the polarity of the q-axis-current control phase, and for controlling a potential of the reference potential phase on the basis of the polarity of the reference potential phase.

4. The current control system for the inverter, according to claim 2, wherein,
said q-axis-current control computing means comprises q-axis-voltage polarity computing means for computing a polarity of q-axis-current control voltage on the basis of said q-axis current error, and q-axis-current pulse-width-modulation computing means for computing a pulse-width-modulation control signal of the q-axis current on the basis of said q-axis current error.
said d-axis-current control computing means comprises d-axis-voltage polarity computing means for computing a polarity of d-axis-current control voltage on the basis of said d-axis current error, and d-axis-current pulse-width-modulation computing means for computing a pulse-width-modulation control signal of the d-axis current on the basis of said d-axis current error, and
said control-phase potential computing means comprises control-phase computing means for computing a q-axis-current control phase, a polarity of the q-axis-current control phase, a d-axis-current control phase, the polarity of the d-axis-current control phase, a reference potential phase and a polarity of the reference potential phase, on the basis of the polarity of the q-axis-current control voltage, the polarity of the d-axis-current control voltage and the magnetic-flux phase angle, and output-potential control means for controlling a potential of the q-axis-current control phase on the basis of the q-axis-current pulse-width-modulation control signal and a polarity of the q-axis-current control phase, for controlling a potential of the d-axis-current control phase on the basis of the d-axis-current pulse-width-modulation control signal and the polarity of the d-axis-current control phase, and for controlling a potential of the reference potential phase on the basis of the polarity of the reference potential phase.

5. The current control system for the inverter, according to claim 1, wherein said control-phase potential computing means comprises:
control-phase computing means wherein
various amounts including voltage, current and a magnetic flux that are amounts of condition expressing an operational condition of the load are treated as vectors on a complex plane.
a unit vector is assumed on the complex plane,
a direction of said unit vector, in which a coordinate value of a specific phase becomes maximum, is brought to a phase direction of a positive polarity of said specific phase,
a direction of said unit vector, in which the coordinate value of the specific phase becomes minimum, is brought to a phase direction of a negative polarity of said specific phase,
a phase direction, which is most approximate to the direction of said q-axis is selected as a phase direction of the q-axis control among the positive phase directions and the negative phase directions of all phases,
a phase corresponding to the phase direction of said q-axis control is brought to a q-axis-current control phase, a polarity in the phase direction of the q-axis control is brought to a polarity of the q-axis-current control phase, two sets of phases except for the q-axis-current control phase are brought to reference potential phases, and the polarity of the q-axis-current control phase and the polarity of the q-axis-current control voltage are multiplied by each other, and a polarity obtained by inversion of a result of the multiplication is brought to the polarity of the reference potential phase; and output-potential control means, wherein the q-axis-current pulse-width-modulation control signal and the polarity of the q-axis-current control phase are multiplied by each other to obtain the potential of the q-axis-current control phase, and the potential of the reference potential phase is obtained on the basis of the polarity of the reference potential phase, to control the potential of each phase.

6. The current control system for the inverter, according to claim 2, wherein said control-phase potential computing means comprises:

control-phase computing means wherein various amounts including voltage, current and magnetic flux that are amounts of condition expressing an operational condition of the load are treated as vectors on a complex plane, a unit vector is assumed on the complex plane, a direction of said unit vector, in which a coordinate value of a specific phase becomes maximum, is brought to a phase direction of a positive polarity of said specific phase, a direction of said unit vector, in which the coordinate value of the specific phase becomes minimum, is brought to a phase direction of a negative polarity of said specific phase, a phase direction, which is most approximate to the direction of said q-axis is selected as a phase direction of the q-axis control among the positive phase directions and the negative phase directions of all phases, a phase corresponding to the phase direction of said q-axis control is brought to a q-axis-current control phase, a polarity in the phase direction of the q-axis control is brought to a polarity of the q-axis-current control phase, the polarity of the q-axis-current control phase and the polarity of the q-axis-current control voltage are multiplied, and a polarity obtained by inversion of a result of the multiplication is brought to a polarity of the reference potential phase, a phase, in which, of two phases except for the q-axis-current control phase, the positive phase direction is more approximate to the positive direction of the magnetic flux, is brought to a phase in which the polarity of the d-axis current is positive, and the remaining one phase is brought to a phase in which the polarity of the d-axis current is negative, in case where a result of multiplication between the polarity of the d-axis-current control voltage and the polarity of the reference potential phase is positive, a phase, in which the polarity of the d-axis current is positive is brought to a reference potential phase, and the remaining one phase is brought to the d-axis-current control phase.

in case where a result of multiplication between the polarity of the d-axis-current control voltage and the polarity of the reference potential phase is negative, a phase, in which the polarity of the d-axis current is positive, is brought to the d-axis-current control phase, and the remaining one phase is brought to the reference potential phase, and the polarity of the d-axis current in the d-axis current control phase is brought to the polarity of the d-axis-current control phase; and output-potential control means wherein the q-axis-current pulse-width-modulation control signal and the polarity of the q-axis-current control phase are multiplied by each other to obtain the potential of the q-axis-current control phase, the d-axis-current pulse-width-modulation control signal and the polarity of the d-axis-current control phase are multiplied by each other to obtain the potential of the d-axis-current control phase, and the potential of the reference potential phase is obtained on the basis of the polarity of the reference potential phase, to control the potential of each phase.

7. The current control system for the inverter, according to claim 1, wherein said q-axis-current control computing means comprises q-axis-voltage polarity computing means for computing the polarity of the q-axis-current control voltage by application of said q-axis-current error to a hysteresis comparator, and q-axis-current pulse-width-modulation computing means for computing a pulse-width-modulation control signal of the q-axis current by application of said q-axis-current error to a hysteresis comparator smaller in hysteresis width than the first-mentioned hysteresis comparator.

8. The current control system for the inverter, according to claim 2, wherein said d-axis-current control computing means comprises d-axis-voltage polarity computing means for computing the polarity of the d-axis-current control voltage by application of said d-axis-current error to a hysteresis comparator, and d-axis-current pulse-width-modulation computing means for computing a pulse-width-modulation control signal of the d-axis current by application of said d-axis-current error to a hysteresis comparator smaller in hysteresis width than the first-mentioned hysteresis comparator.

9. The current control system for the inverter, according to claim 8, wherein said q-axis-current control computing means comprises q-axis-voltage polarity computing means for computing the polarity of the q-axis-current control voltage by application of said q-axis-current error to a hysteresis comparator, and q-axis-current pulse-width-modulation computing means for computing a pulse-width-modulation control signal of the q-axis current by application of said q-axis-current error to a hysteresis comparator smaller in hysteresis width than the first-mentioned hysteresis comparator.

10. The current control system for the inverter, according to claim 1, wherein said q-axis-current control computing means comprises:

q-axis-voltage polarity computing means wherein said q-axis-current error is computed in a proportional and integral control manner, a result of the proportional and integral control computation is compared with a positive triangular wave whose minimum value is zero and a negative triangular wave whose maximum value is zero, in case where the result of the proportional and integral control computation is larger than the positive triangular wave, the polarity of the q-axis-current control voltage is brought to a positive one, in case where the result of said proportional and integral control computation is smaller than the negative triangular wave, the polarity of the q-axis-current control voltage is brought to a negative one, and in case where said result of the proportional and integral control computation is at most the positive triangular wave and at least the negative triangular wave, the polarity of the q-axis-current control voltage is maintained at a polarity until now; and q-axis-current pulse-width-modulation computing means wherein when the polarity of the q-axis-current control voltage is positive, a comparison result between the result of the proportional and integral control computation and the positive triangular wave is brought to the q-axis-current pulse-width-modulation control signal, and when the polarity of the q-axis-current voltage is negative, a comparison result between the result of the proportional and integral control computation and the negative triangular wave is brought to the q-axis-current pulse-width-modulation control signal.

11. The current control system for the inverter, according to claim 2, wherein said d-axis-current control computing means comprises:

d-axis-voltage polarity computing means wherein said d-axis-current error is computed in a proportional and integral control manner, a result of the proportional and integral control computation is compared with a positive triangular wave whose minimum value is zero and a negative triangular wave whose maximum value is zero, in case where the result of the proportional and integral control computation is larger than the positive triangular wave, the polarity of the d-axis-current control voltage is brought to a positive one, in case where the result of the proportional and integral control computation is smaller than the negative triangular wave, the polarity of the d-axis-current control voltage is brought to a negative one, and in case where said result of the proportional and integral control computation is at most the positive triangular wave and at least the negative triangular wave, the polarity of the d-axis-current control voltage is maintained at a polarity until now; and d-axis-current pulse-width-modulation computing means wherein when the polarity of the d-axis-current control voltage is positive, a comparison result between the result of the proportional and integral control computation and the positive triangular wave is brought to the d-axis-current pulse-width-modulation control signal, and when the polarity of the d-axis-current voltage is negative, a comparison result between the result of the proportional and integral control computation and the negative triangular wave is brought to the d-axis-current pulse-width-modulation control signal.

12. The current control system for the inverter, according to claim 11, wherein said q-axis-current control computing means comprises:

q-axis-voltage polarity computing means wherein said q-axis-current error is computed in a proportional and integral control manner, a result of the proportional and integral control computation is compared with a positive triangular wave whose minimum value is zero and a negative triangular wave whose maximum value is zero, in case where the result of the proportional and integral control computation is larger than the positive triangular wave, the polarity of the q-axis-current control voltage is brought to a positive one, in case where the result of the proportional and integral control computation is smaller than the negative triangular wave, the polarity of the q-axis-current control voltage is brought to a negative one, and in case where said result of the proportional and integral control computation is at most the positive triangular wave and at least the negative triangular wave, the polarity of the q-axis-current control voltage is maintained at a polarity until now; and q-axis-current pulse-width-modulation computing means wherein when the polarity of the q-axis-current control voltage is positive, a comparison result between the result of the proportional and integral control computation and the positive triangular wave is brought to the q-axis-current pulse-width-modulation control signal, and when the polarity of the q-axis-current voltage is negative, a comparison result between the result of the proportional and integral control computation and the negative triangular wave is brought to the q-axis-current pulse-width-modulation control signal.

13. The current control system for the inverter, according to claim 1, wherein said control-phase potential computing means is provided with output-potential control means in which, when the q-axis-current command is positive and when the polarity of the q-axis-current control phase is positive, a switching element connected to the cathode side of a direct-current power source of the q-axis-current control phase is always turned off, in which, when the q-axis-current command is positive and when the polarity of the q-axis-current control phase is negative, a switching element connected to an anode side of the direct-current power source of the q-axis-current control phase is always turned off, in which, when the q-axis-current command is negative and when the polarity of the q-axis-current control phase is positive, a switching element connected to the anode side of the direct-current power source of the q-axis-current control phase is always turned off, and in which, when the q-axis-current command is negative and when the polarity of the q-axis-current control phase is negative, a switching element connected to the cathode side of the direct current power source of the q-axis-current control phase is always turned off.

14. The current control system for the inverter, according to claim 2, wherein said control-phase potential computing means is provided with output-potential control means in which, when the q-axis-current command is positive and when the polarity of the q-axis-current control phase is positive, a switching element connected to an anode side of a direct-current power source of the reference potential phase and the d-axis-current control phase is always turned off, in which, when the q-axis-current command is positive and when the polarity of the q-axis-current control phase is negative, a switching element connected to a cathode side of the direct-current power source of the reference potential phase and the d-axis-current control phase is always turned off, in which, when the q-axis-current command is negative and when the polarity of the q-axis-current control phase is positive, a switching element connected to the cathode side of the direct-current power source of the reference potential phase and the d-axis-current control phase is always turned off, and in which, when the q-axis-current command is negative and when the polarity of the q-axis-current control phase is negative, a switching element connected to the anode side of the direct-current power source of the reference potential phase and the d-axis-current control phase is always turned off.

15. The current control system for the inverter, according to claim 7, wherein the hysteresis width of the hysteresis comparator in said q-axis-current control computing means varies dependent upon an operational condition.

16. The current control system for the inverter, according to claim 8, wherein the hysteresis width of the hysteresis comparator in said d-axis-current control computing means varies dependent upon an operational condition.

17. The current control system for the inverter, according to claim 9, wherein the hysteresis width of the hysteresis comparator in each of said q-axis-current control computing means and said d-axis-current control computing means varies dependent upon the operational condition.

18. The current control system for the inverter, according to claim 1, wherein said inductive load is an induction motor, and the phase angle of said magnetic flux is an exciting-current rotational angle in vector control of the induction motor.

19. The current control system for the inverter, according to claim 2, wherein said inductive load is an induction motor, and the phase angle of said magnetic flux is an exciting-current rotational angle in vector control of the induction motor.

20. The current control system for the inverter, according to claim 1, wherein said control-phase potential computing means is provided with a dead-time circuit in which, of he semiconductor device on the anode side and the semiconductor device on the cathode side in each phase, dead time is provided with respect to one of the semiconductor devices for a predetermined period of time after a change from turning-on to turning-off of the other semiconductor device, and in which, in case where one of the semiconductor devices is maintained at its OFF condition for a period of time at least the dead time, no dead time is provided for the other semiconductor device.

21. The current control system for the inverter, according to claim 2, wherein said control-phase potential computing means is provided with a dead-time circuit in which, of the semiconductor device on the anode side and the semiconductor device on the cathode side in each phase, dead time is provided with respect to one of the semiconductor devices for a predetermined period of time after a change from turning-on to turning-off of the other semiconductor device, and in which, in case where one of the semiconductor devices is maintained at its OFF condition for a period of time at least the dead time, no dead time is provided for the other semiconductor device.

22. The current control system for the inverter, according to claim 2, wherein said control-phase potential computing means determines the q-axis-current control phase, the d-axis-current control phase and the reference potential phase such that, when the output potential of the q-axis-current control phase is in agreement with the potential of the reference potential phase, the output potential of the d-axis-current control phase is also in agreement with the potential of the reference potential phase, to control the potential in each phase.

23. A current control system for an inverter having a plurality of series circuits formed by series connecting electric valves each formed by connecting a semiconductor device and a diode in an inverted parallel relation to each other, each of said series circuits having both its ends connected respectively to a positive side and a negative side of a direct-current power source, wherein an alternating-current motor is connected to the series connecting point of said electric valves, and current flowing through said alternating-current motor is controlled in a pulse-width-modulation manner, said current control system comprising:
 current-command computing means for computing a torque-current command;
 current detecting means for detecting a torque current;
 torque-current error computing means for computing a torque-current error between said torque-current command and said torque current;
 torque-current control computing means for computing, in a pulse-width-modulation manner, the torque current on the basis of said torque-current error;
 magnetic-flux rotational-angle detecting means for detecting a rotational angle of a magnetic flux; and
 control-phase potential computing means for determining the torque-current control phase and the reference potential phase on the basis of a result of the torque-current control computation and the magnetic-flux rotational angle, to control a potential in each phase.

* * * * *